(12) United States Patent
Baum et al.

(10) Patent No.: US 7,315,554 B2
(45) Date of Patent: *Jan. 1, 2008

(54) SIMPLE PEERING IN A TRANSPORT NETWORK EMPLOYING NOVEL EDGE DEVICES

(75) Inventors: Robert T. Baum, Gaithersburg, MD (US); Eric A. Voit, Bethesda, MD (US)

(73) Assignee: Verizon Communications Inc., Arlington, VA (US)

( * ) Notice: Subject to any disclaimer, the term of this patent is extended or adjusted under 35 U.S.C. 154(b) by 1262 days.

This patent is subject to a terminal disclaimer.

(21) Appl. No.: 09/834,573

(22) Filed: Apr. 12, 2001

(65) Prior Publication Data

US 2002/0024964 A1   Feb. 28, 2002

Related U.S. Application Data

(63) Continuation-in-part of application No. 09/652,822, filed on Aug. 31, 2000, now Pat. No. 6,771,673, and a continuation-in-part of application No. 09/652,750, filed on Aug. 31, 2000, now Pat. No. 6,850,495, and a continuation-in-part of application No. 09/652,095, filed on Aug. 31, 2000, now Pat. No. 6,993,026.

(51) Int. Cl.
*H04L 12/66* (2006.01)
*H04L 12/56* (2006.01)

(52) U.S. Cl. ............... 370/469; 370/463; 370/419; 370/420

(58) Field of Classification Search ................ 370/409, 370/410, 474, 468, 399, 535, 228–235, 394, 370/412, 498, 429, 493, 286, 205–207, 524, 370/401, 469, 402, 403, 404, 437, 224, 453–455, 370/389–414, 347–358, 442, 256, 447–449, 370/419, 463, 395.43, 352, 349, 395.52; 714/4

See application file for complete search history.

(56) References Cited

U.S. PATENT DOCUMENTS

| 4,663,748 | A |   | 5/1987 | Karbowiak et al. |
| 5,088,090 | A |   | 2/1992 | Yacoby |
| 5,550,816 | A | * | 8/1996 | Hardwick et al. .......... 370/397 |
| 5,566,170 | A |   | 10/1996 | Bakke et al. |
| 5,600,644 | A |   | 2/1997 | Chang et al. |
| 5,610,905 | A |   | 3/1997 | Murthy et al. |
| 5,638,448 | A |   | 6/1997 | Nguyen |

(Continued)

OTHER PUBLICATIONS

Fox, B., et al; "Virtual Private Network Identifier"; IETF, RFC 2685; Sep. 1999; pp. 1-6.*

(Continued)

*Primary Examiner*—Wing Chan
*Assistant Examiner*—Robert C Scheibel

(57) ABSTRACT

Simple peering is provided in a novel network in which transport technology is independent of network access technology. An out-of-band network may be used to carry advertisements to an update facility. The update facility may use layer 3 destination address information and at least a part of context information (to identify customers uniquely) to determine a layer 3 address of an edge device of the transport network associated with an addressed customer device. Virtual private networks are supported, as context information is used to distinguish different customers with overlapping layer 3 addresses.

24 Claims, 36 Drawing Sheets

U.S. PATENT DOCUMENTS

| | | | |
|---|---|---|---|
| 5,644,713 A * | 7/1997 | Makishima | 709/242 |
| 5,758,285 A | 5/1998 | Chavez et al. | |
| 5,774,640 A | 6/1998 | Kurio | |
| 5,805,801 A | 9/1998 | Holloway et al. | |
| 5,867,494 A * | 2/1999 | Krishnaswamy et al. | 370/352 |
| 5,880,446 A | 3/1999 | Mori et al. | |
| 5,920,566 A | 7/1999 | Hendel et al. | |
| 5,946,313 A * | 8/1999 | Allan et al. | |
| 5,954,829 A | 9/1999 | McLain, Jr. et al. | |
| 5,959,989 A | 9/1999 | Gleeson et al. | |
| 5,963,543 A | 10/1999 | Rostoker et al. | |
| 5,988,497 A | 11/1999 | Wallace | |
| 5,991,300 A | 11/1999 | Tappan | |
| 5,999,525 A * | 12/1999 | Krishnaswamy et al. | 370/352 |
| 6,035,405 A | 3/2000 | Gage et al. | |
| 6,049,528 A | 4/2000 | Hendel et al. | |
| 6,058,429 A | 5/2000 | Ames et al. | |
| 6,094,435 A | 7/2000 | Hoffman et al. | |
| 6,097,720 A | 8/2000 | Araujo et al. | |
| 6,104,700 A | 8/2000 | Haddock et al. | |
| 6,147,995 A * | 11/2000 | Dobbins et al. | 370/392 |
| 6,154,839 A * | 11/2000 | Arrow et al. | 713/154 |
| 6,181,695 B1 | 1/2001 | Curry et al. | |
| 6,230,194 B1 | 5/2001 | Frailong et al. | |
| 6,243,379 B1 | 6/2001 | Veerina et al. | |
| 6,256,314 B1 * | 7/2001 | Rodrig et al. | 370/401 |
| 6,262,976 B1 | 7/2001 | McNamara | |
| 6,304,901 B1 * | 10/2001 | McCloghrie et al. | 709/221 |
| 6,314,106 B1 | 11/2001 | King et al. | |
| 6,335,927 B1 * | 1/2002 | Elliott et al. | 370/352 |
| 6,377,987 B1 | 4/2002 | Kracht | |
| 6,421,343 B1 | 7/2002 | Jun et al. | |
| 6,442,162 B1 | 8/2002 | O'Neill et al. | |
| 6,456,597 B1 * | 9/2002 | Bare | 370/252 |
| 6,473,403 B1 * | 10/2002 | Bare | 370/236 |
| 6,493,318 B1 * | 12/2002 | Bare | 370/238 |
| 6,539,011 B1 | 3/2003 | Keenan et al. | |
| 6,546,001 B1 | 4/2003 | Semper et al. | |
| 6,553,029 B1 * | 4/2003 | Alexander | 370/389 |
| 6,556,541 B1 * | 4/2003 | Bare | 370/235 |
| 6,556,574 B1 | 4/2003 | Pearce et al. | |
| 6,574,240 B1 | 6/2003 | Tzeng | |
| 6,577,600 B1 * | 6/2003 | Bare | 370/238 |
| 6,577,653 B1 | 6/2003 | Rochberger et al. | |
| 6,580,715 B1 * | 6/2003 | Bare | 370/396 |
| 6,618,381 B1 | 9/2003 | Miyamoto et al. | |
| 6,633,571 B1 | 10/2003 | Sakamoto et al. | |
| 6,636,516 B1 | 10/2003 | Yamano | |
| 6,640,251 B1 * | 10/2003 | Wiget et al. | 709/238 |
| 6,643,287 B1 | 11/2003 | Callon et al. | |
| 6,674,756 B1 * | 1/2004 | Rao et al. | 370/395.21 |
| 6,674,769 B1 | 1/2004 | Viswanath | |
| 6,701,361 B1 * | 3/2004 | Meier | 709/224 |
| 6,731,625 B1 * | 5/2004 | Eastep et al. | 370/352 |
| 6,751,220 B1 * | 6/2004 | Li | 370/390 |
| 6,754,181 B1 * | 6/2004 | Elliott et al. | 370/252 |
| 6,757,281 B1 | 6/2004 | Irish | |
| 6,765,866 B1 * | 7/2004 | Wyatt | 370/229 |
| 6,771,673 B1 * | 8/2004 | Baum et al. | 370/535 |
| 6,826,195 B1 * | 11/2004 | Nikolich et al. | 370/465 |
| 6,850,495 B1 | 2/2005 | Baum et al. | |
| 6,850,531 B1 * | 2/2005 | Rao et al. | 370/401 |
| 6,993,026 B1 | 1/2006 | Baum et al. | |
| 2002/0027906 A1 * | 3/2002 | Athreya et al. | 370/386 |

OTHER PUBLICATIONS

Fox B. et al. Virtual Private Networks Identifier The Internet Society 1999 pp. 1-4.

Valencia et al., "Cisco Layer Two Forwarding (Protocol) 'L2F'", May 1998, pp. 1-29.

"Data Link Layer", Oct. 14, 1997, http://ww.cs.panam.edu/~meng/Course/CS6345/Notes/chpt-4/node2.html.

Piers O'Hanlon, "Note from the 47th IETF Meeting" (Adelaide, Australia, Mar. 26-31, 2000) (13 pgs.) downloaded from—http://www.cs.ucl.ac.uk/staff/p.ohanlon/papers/ietf47.html.

* cited by examiner

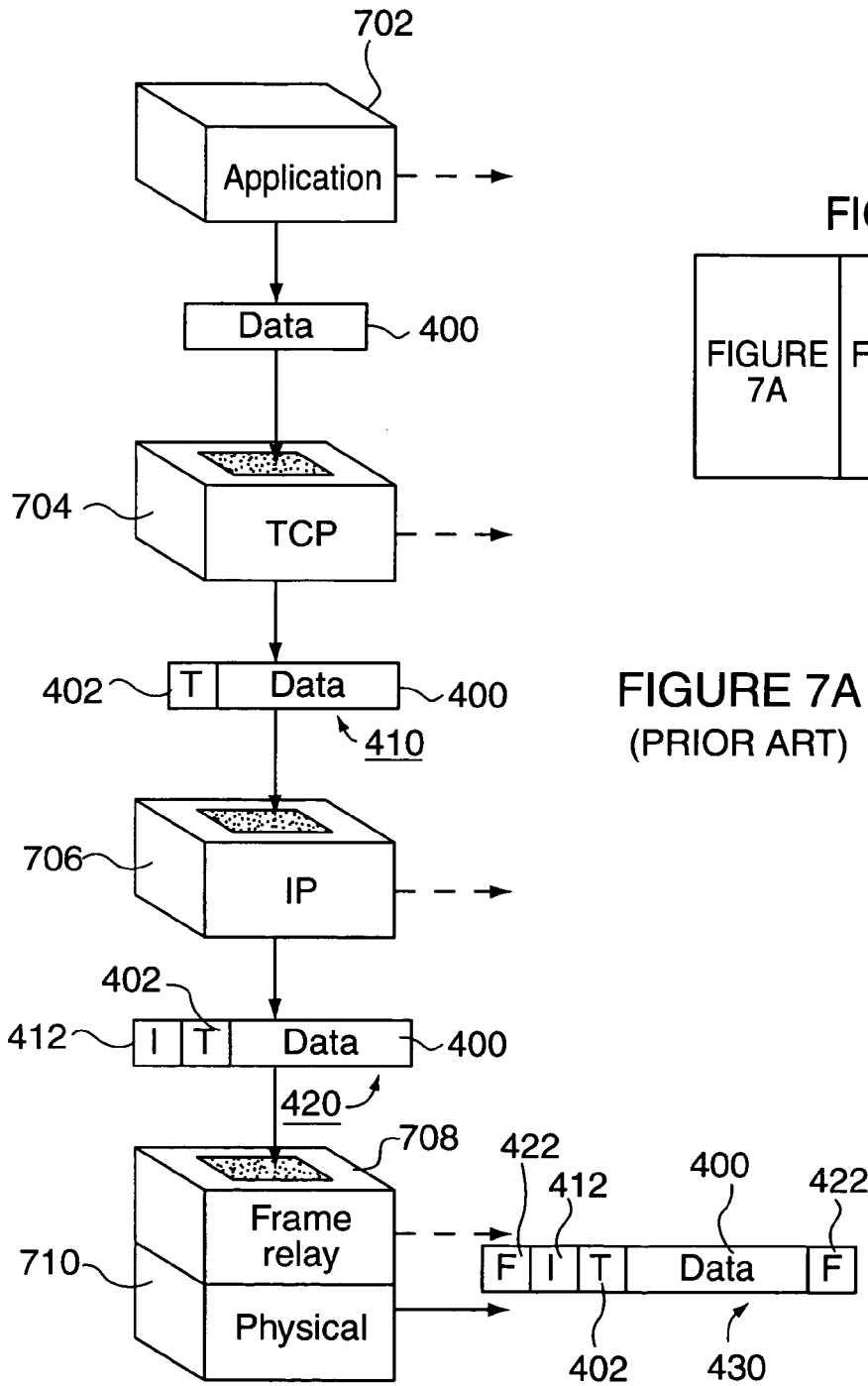
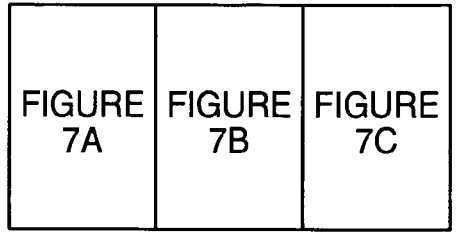
FIGURE 7A
(PRIOR ART)

FIGURE 12

ADDRESS RESOLUTION TABLE (AU) — 1020'

| LOGICAL INTERFACE ID | (LAYER 2) ADDRESS OF CUSTOMER DEVICE ASSOCIATED WITH LOGICAL INTERFACE |
|---|---|
|  | (LAYER 2) ADDRESS OF CUSTOMER DEVICE ASSOCIATED WITH LOGICAL INTERFACE — 1210a |
|  | (LAYER 2) ADDRESS OF CUSTOMER DEVICE ASSOCIATED WITH LOGICAL INTERFACE — 1210b |
| ... | ... |
| LOGICAL INTERFACE ID | (LAYER 2) ADDRESS OF CUSTOMER DEVICE ASSOCIATED WITH LOGICAL INTERFACE — 1210c |

LOGICAL INTERFACE - CONTEXT INFORMATION ASSOCIATION TABLE — 1026'

| LOGICAL INTERFACE | CONTEXT INFORMATION ASSOCIATED WITH LOGICAL INTERFACE |
|---|---|
|  | CONTEXT INFORMATION ASSOCIATED WITH LOGICAL INTERFACE — 1310a |
|  | CONTEXT INFORMATION ASSOCIATED WITH LOGICAL INTERFACE — 1310b |
| ... | ... |
| LOGICAL INTERFACE | CONTEXT INFORMATION ASSOCIATED WITH LOGICAL INTERFACE — 1310c |

CARRIER INFORMATION TABLE — 1036'

| AT LEAST A PART OF THE CONTEXT INFORMATION + (LAYER 3) DESTINATION ADDRESS | EGRESS ACCESS ROUTER LAYER 3 ADDRESS — 1410a |
|---|---|
| AT LEAST A PART OF THE CONTEXT INFORMATION + (LAYER 3) DESTINATION ADDRESS | EGRESS ACCESS ROUTER LAYER 3 ADDRESS — 1410b |
| ... | ... — 1410c |
| AT LEAST A PART OF THE CONTEXT INFORMATION + (LAYER 3) DESTINATION ADDRESS | EGRESS ACCESS ROUTER LAYER 3 ADDRESS |

ADDRESS RESOLUTION TABLE (AR) — 1058'

| AT LEAST A PART OF THE CONTEXT INFORMATION + (LAYER 3) DESTINATION ADDRESS | EFFECTIVE LOGICAL INTERFACE ADDRESS — 1510a |
|---|---|
| AT LEAST A PART OF THE CONTEXT INFORMATION + (LAYER 3) DESTINATION ADDRESS | EFFECTIVE LOGICAL INTERFACE ADDRESS — 1510b |
| ... | ... — 1510c |
| AT LEAST A PART OF THE CONTEXT INFORMATION + (LAYER 3) DESTINATION ADDRESS | EFFECTIVE LOGICAL INTERFACE ADDRESS |

CARRIER INFORMATION TABLE

| VPN-ID-OUI | VPN-ID-INDEX | CLIENT NETWORK ADDRESS | SUBNET MASK | EGRESS AR ADDRESS | ORIGINATING AR ADDRESS | STATUS FLAG |
|---|---|---|---|---|---|---|
| ... | ... | ... | ... | ... | ... | ... |

CONTEXT-BASED ADDRESS RESOLUTION TABLE

| VPN-ID-OUI | VPN-ID-INDEX | CLIENT NETWORK ADDRESS | SUBNET MASK | CLIENT LAYER 2 (MAC) ADDRESS |
|---|---|---|---|---|
| ... | ... | ... | ... | ... |

NETWORK EDGE INFORMATION

| INGRESS AR ADDRESS | VPN-OUI | VPN-INDEX | CLIENT LAYER 3 ADDRESS | QoS | CoS | LOGICAL INGRESS PORT |
|---|---|---|---|---|---|---|
| ... | ... | ... | ... | ... | ... | ... |

3410  3420  3430  3440  3450  2820'  3460  3470

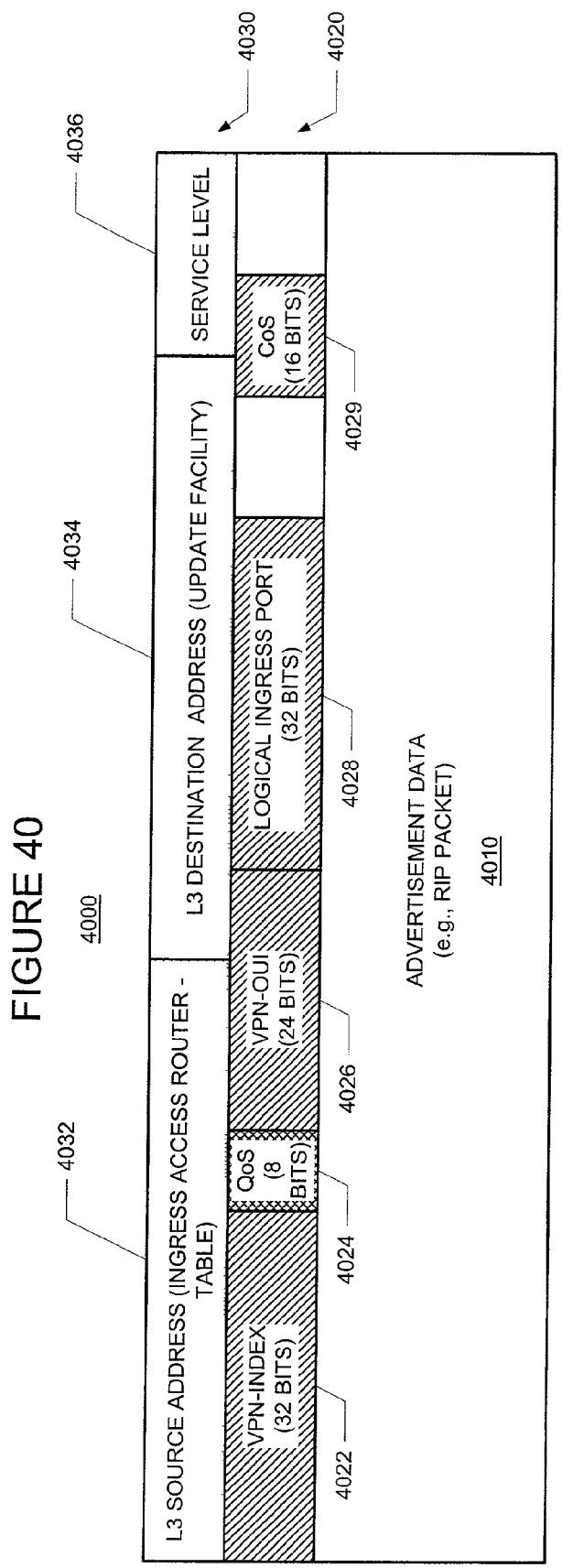

SIMPLE PEERING IN A TRANSPORT NETWORK EMPLOYING NOVEL EDGE DEVICES

§ 0. RELATED APPLICATIONS

The present invention is a continuation-in-part of each of the following applications: (i) U.S. patent application Ser. No. 09/652,822, now U.S. Pat. No. 6,771,673, entitled "METHODS, APPARATUS AND DATA STRUCTURES FOR PROVIDING ACCESS TO AN EDGE ROUTER OF A NETWORK", by Robert T. Baum and Eric A. Voit filed on Aug. 31, 2000; (ii) U.S. patent application Ser. No. 09/652,750, now U.S. Pat. No. 6,850,495, entitled "METHODS, APPARATUS AND DATA STRUCTURES FOR SEGMENTING CUSTOMERS USING AT LEAST A PORTION OF A LAYER 2 ADDRESS HEADER OR BITS IN THE PLACE OF A LAYER 2 ADDRESS HEADER", by Robert T. Baum and Eric A. Voit filed on Aug. 31, 2000; and (iii) U.S. patent application Ser. No. 09/652,095, now U.S. Pat. No. 6,993,026, entitled "METHODS, APPARATUS AND DATA STRUCTURES FOR PRESERVING ADDRESS AND SERVICE LEVEL INFORMATION IN A VIRTUAL PRIVATE NETWORK", by Robert T. Baum and Eric A. Voit filed on Aug. 31, 2000. Priority to these applications is claimed under 35 U.S.C. § 120, and each of these applications is incorporated herein by reference.

§ 1. BACKGROUND OF THE INVENTION

§ 1.1 Field of the Invention

The present invention concerns methods, apparatus and data structures for providing a transport network employing technologies that are independent of technologies used to access it, that supports various applications, and that supports the provision of various service levels. The present invention also concerns facilitating simple peering over such a transport network. More specifically, the present invention concerns maintaining routing information.

§ 1.2 Related Art

The description of art in this section is not, and should not be interpreted to be, an admission that such art is prior art to the present invention. Basic communications terminology is introduced in § 1.2.1 below for the reader's convenience. Then, known transport network technologies are introduced in § 1.2.2 below. Thereafter, limitations of such known transport network technologies are introduced in § 1.2.3 below. Finally, various goals of the present invention are introduced in § 1.2.4 below.

§ 1.2.1 Basic Communications Terminology

Although networking software and network reference models are known to those skilled in the art, they are introduced in §§ 1.2.1.1 and 1.2.1.2 below for the reader's convenience.

§ 1.2.1.1 Communications Protocol Stack

To reduce their complexity, networks may be organized as a series of layers, each one built upon the one below it as shown in FIG. 1. Each layer functions to offer certain services to the higher layer, thereby shielding those higher layers from the details of how the offered services are actually implemented. The entities comprising the corresponding layers on different machines are called "peers". Such peers use rules and conventions, also referred to as the layer n protocol, to communicate with each other as depicted by the dashed lines in FIG. 1. Actually, no data are directly transferred from layer n on one machine to layer n on another machine. Rather, in the machine transmitting the data, each layer passes data and control information to the layer immediately below it, until the lowest layer (layer 1) is reached. Below layer 1, is a physical medium 110 through which actual communications take place. At the machine receiving the data, each layer passes data and control information to the layer immediately above it until the highest layer is reached. Thus, referring to FIG. 1, actual communications take place via the solid lines and the physical medium 110, while virtual peer-to-peer communications occur via the dashed lines.

Still referring to FIG. 1, interfaces are arranged between adjacent layers. Each of these interfaces defines primitive operations and services that the lower layer offers to the upper layer.

The set of layers and protocols may be referred to as a "network architecture". A list of protocols used by a system, one protocol per layer, may be referred to as a "protocol stack" or "protocol suite".

§ 1.2.1.2 Network Architecture Reference Models

FIG. 2 illustrates a comparison of the Open Systems Interconnection (or "OSI") reference model 210 for network architectures and the transfer control protocol/Internet protocol (or "TCP/IP") reference model 220 for network architectures. Although those skilled in the art will be familiar with both reference models, each is introduced below for the reader's convenience.

§ 1.2.1.2.1 The OSI Reference Model

As shown in FIG. 2, the OSI reference model 210 has seven (7) distinct layers; namely, (i) a physical layer 211, (ii) a data link layer 212, (iii) a network layer 213, (iv) a transport layer 214, (v) a session layer 215, (vi) a presentation layer 216, and (vii) an application layer 217. Each layer is briefly introduced below.

The physical layer 211 deals with transmitting raw bits over a communications channel. Thus, the physical layer is typically concerned with mechanical, electrical, optical, and procedural interfaces, as well as the physical transmission medium (e.g., twisted copper pair, co-axial cable, optical fiber, etc.) that lies below the physical layer.

The data link layer 212 functions to transform a raw communications facility into a line that appears free from undetected transmission errors to the network layer 213. The data link layer 212 does this by having the sending host segment its data into "data frames", transmitting these frames to the receiving host, and processing "acknowledgement frames" sent back from the receiver.

The network layer 213 functions to control the operation of a subnetwork between the hosts and controls the routing of packets between the hosts.

The transport layer 214 functions to accept data from the session layer 215 and segment this data into smaller units, if necessary, for use by the network layer 213. The transport layer 214 also determines a type of service (e.g., error-free, point-to-point) to provide to the session layer 215. Further, the transport layer 214 controls the flow of data between hosts. The transport layer 214 is a true "end-to-end" layer, from source host to destination host, since a program on the source machine converses with a similar program on the destination machine, using message headers and control messages.

The session layer 215 functions to allow different machines to establish sessions between them. The session layer 215 may manage dialog control and maintain synchronization.

The presentation layer 215 concerns the syntax and semantics of information transmitted.

The application layer 216 may function to define network virtual terminals that editors and other programs can use, and to transfer files.

§ 1.2.1.2.2 The TCP/IP Model

In recent decades, and in the past five (5) to ten (10) years in particular, computers have become interconnected by networks by an ever increasing extent; initially, via local area networks (or "LANs"), and more recently via LANs, wide area networks (or WANs) and the Internet. In 1969, the Advanced Research Projects Agency (ARPA) of the U.S. Department of Defense (DoD) deployed ARPANET as a way to explore packet-switching technology and protocols that could be used for cooperative, distributed, computing. Early on, ARPANET was used by the TELNET application that permitted a single terminal to work with different types of computers, and by the file transfer protocol (or "FTP") which permitted different types of computers to transfer files from one another. In the early 1970s', electronic mail became the most popular application which used ARPA-NET.

This packet switching technology was so successful, that the ARPA applied it to tactical radio communications (Packet Radio) and to satellite communications (SATNET). However, since these networks operated in very different communications environments, certain parameters, such as maximum packet size for example, were different in each case. Thus, methods and protocols were developed for "internetworking" these different packet switched networks. This work lead to the transmission control protocol (or "TCP") and the internet protocol (or "IP") which became the TCP/IP protocol suite. Although the TCP/IP protocol suite, which is the foundation of the Internet, is known to those skilled in the art, it is briefly described below for the reader's convenience.

As shown in FIG. 2, the TCP/IP reference model 220 includes a physical layer 221, a network access layer 222, an internet layer 223, a transport layer 224, and an application layer 225. Each of these layers is briefly introduced below.

The physical layer 221 defines the interface between a data transmission device (e.g., a computer) and a transmission medium (e.g., twisted pair copper wires, co-axial cable, optical fiber, etc.). It specifies the characteristics of the transmission medium, the nature of the signals, the data rate, etc.

The network access layer 222 defines the interface between an end system and the network to which it is attached. It concerns access to, and routing data across, a network. Frame relay is an example of a network access layer.

The internet layer 223 functions to permit hosts to inject packets into any network and have them travel independently to the destination machine (which may be on a different network). Since these packets may travel independently, they may arrive in an order other than the order in which they were sent. Higher layers can be used to reorder the packets. Thus, the main function of the internet layer 320 is to deliver (e.g., route) IP packets to their destination.

The transport layer 224 is an end-to-end protocol. For example, the transmission control protocol (or "TCP") is a reliable connection-oriented protocol that allows a byte stream originating on one machine to be delivered, without error, on any other machine on the Internet. More specifically, the TCP protocol fragments an incoming data stream into discrete messages, each of which is passed to the internet layer 223. At the destination, the TCP protocol reassembles the received messages into an output stream.

The TCP/IP model 220 does not have session and presentation layers. Instead, an application layer 225 contains all of the higher-level protocols that are used to support various types of end use applications (e.g., the simple mail transfer protocol (or "SMTP") for e-mail, the file transfer protocol (or "FTP"), etc.).

The TCP/IP model does not define what occurs below the internet layer 223, other than to note that the host has to connect to the network using some protocol so that it can send IP packets over it. This protocol varies from host to host and network to network.

Basically, each of the layers encapsulates, or converts, data in a higher layer. For example, referring to FIG. 4, user data 400 as a byte stream is provided with a TCP header 402 to form a TCP segment 410. The TCP segment 410 is provided with an IP header 412 to form an IP datagram 420. The IP datagram 420 is provided with a network header 422 to define a network-level packet 430. The network-level packet 430 is then converted to radio, electrical, optical (or other) signals sent over the transmission medium at a specified rate with a specified type of modulation.

The TCP header 402, as illustrated in FIG. 5, includes at least twenty (20) octets (i.e., 160 bits). Fields 502 and 504 identify ports at the source and destination systems, respectively, that are using the connection. Values in the sequence number 506, acknowledgement number 508 and window 516 files are used to provide flow and error control. The value in the checksum field 518 is used to detect errors in the TCP segment 410.

FIGS. 6A and 6B illustrate two (2) alternative IP headers 412 and 412', respectively. Basically, FIG. 6A depicts the IP protocol (Version 4) that has been used. FIG. 6B depicts a next generation IP protocol (Version 6) that, among other things, provides for more source and destination addresses.

More specifically, referring to FIG. 6A, the four (4) bit version field 602 indicates the version number of the IP, in this case, version 4. The 4-bit Internet header length field 604 identifies the length of the header 412 in 32-bit words. The 8-bit type of service field 606 indicates the service level that the IP datagram 420 should be given. The 16-bit total length field 608 identifies the total length of the IP datagram 420 in octets. The 16-bit identification field 610 is used to help reassemble fragmented user data carried in multiple packets. The 3-bit flags field 612 is used to control fragmentation. The 13-bit fragment offset field 614 is used to reassemble a datagram 420 that has become fragmented. The 8-bit time to live field 616 defines a maximum time that the datagram is allowed to exist within the network it travels over. The 8-bit protocol field 618 defines the higher-level protocol to which the data portion of the datagram 420 belongs. The 16-bit header checksum field 620 permits the integrity of the IP header 412 to be checked. The 32-bit source address field 322 contains the IP address of the sender of the IP datagram 420 and the 32-bit destination address field contains the IP address of the host to which the IP datagram 120 is being sent. FIG. 3 illustrates IP address formats. Options and padding 626 may be used to describe special packet processing and/or to ensure that the header 412 is a complete multiple of 32-bit words.

Referring to FIG. 6B, the four (4) bit version field 602 indicates the version number of the IP, in this case, version 6. The 4-bit priority field 628 enables a sender to prioritize packets sent by it. The 24-bit flow label field 630 is used by a source to label packets for which special handling is requested. The 16-bit payload length field 632 identifies the size of data carried in the packet. The 8-bit next header field 634 is used to indicate whether another header is present and if so, to identify it. The 8-bit hop limit field 636 serves to discard the IP datagram 420 if a hop limit (e.g., the number of times the packet is routed) is exceeded. Also provided are 128-bit source and destination address fields 322' and 324', respectively.

Having described the TCP/IP protocol stack 220, the routing of a TCP/IP packet is now described.

A TCP/IP packet is communicated over the Internet (or any internet or intranet) via routers. Basically, routers in the Internet use destination address information (Recall fields 624 and 624'.) to forward packets towards their destination. Routers interconnect different networks. More specifically, routers accept incoming packets from various connected networks, use a look-up table to determine a network upon which the packet should be placed, and routes the packet to the determined network.

FIG. 7, which includes FIGS. 7A through 7C, illustrates the communication of data from a sender, to a receiver, using the TCP/IP protocol stack. Referring first to FIG. 7A, an application protocol 702 prepares a block of data (e.g., an e-mail message (SMTP), a file (FTP), user input (TELNET), etc.) 400 for transmission. Before the data 400 are sent, the sending and receiving applications agree on a format and encoding and agree to exchange data (Recall, e.g., the peer-to-peer communications depicted with dashed lines in FIG. 1.). If necessary, the data are converted (character code, compression, encryption, etc.) to a form expected by the destination device.

The TCP layer 704 may segment the data block 400, keeping track of the sequence of segments. Each TCP segment 410 includes a header 402 containing a sequence number (recall field 506) and a frame check sequence to detect errors. A copy of each TCP segment is made so that if a segment is lost or damaged, it can be retransmitted. When an acknowledgement of safe receipt is received from the receiver, the copy of the segment is erased.

The IP layer 706 may break the TCP segment into a number of datagrams 420 to meet size requirements of networks over which the data will be communicated. Each datagram includes the IP header 412.

A network layer 708, such as frame relay for example, may apply a header and trailer 422 to frame the datagram 420. The header may include a connection identifier and the trailer may contain a frame check sequence for example. Each frame 430 is then transmitted, by the physical layer 710, over the transmission medium as a sequence of bits.

FIG. 7B illustrates the operation of the TCP/IP protocol stack at a router in the network. The physical layer 712 receives the incoming signal 430 from the transmission medium and interprets it as a frame of bits. The network (e.g., frame relay) layer 714 then removes the header and trailer 422 and processes them. A frame check sequence may be used for error detection. A connection number may be used to identify the source. The network layer 714 then passes the IP datagram 420 to the IP layer 718.

The IP layer examines the IP header 412 and makes a routing decision (Recall the destination address 324, 324'). A local line control (or "LLC") layer 720 uses a simple network management protocol (or "SNMP") and adds a header 750 that contains a sequence number and address information. Another network layer 722 (e.g., media access control (or "MAC")) adds a header and trailer 760. The header may contain address information and the trailer may contain a frame check sequence. The physical layer 724 then transmits the frame 450 over another transmission medium.

FIG. 7C illustrates the operation of the TCP/IP protocol stack at a receiver. The physical layer 732 receives the signals from the transmission medium and interprets them as a frame of bits. The network layer 734 removes the header and trailer 760 and processes them. For example, the frame check sequence in the trailer may be used for error detection. The resulting packet 440 is passed to the transport layer 736, which processes the header 750 for flow and error control. The resulting IP datagram 420 is passed to the IP layer 738, which removes the header 412. Frame check sequence and other control information may be processed at this point.

The TCP segment 410 is then passed to the TCP layer 740, which removes the header 402 and may check the frame check sequence. (In the event of a match, the match is acknowledged and in the event of a mismatch, the packet is discarded.) The TCP layer 740 then passes the data 400 to the application layer 742. If the user data was segmented (or fragmented), the TCP layer 740 reassembles it. Finally, the application layer 742 performs any necessary transformations, such as decompression and decryption for example, and directs the data to an appropriate area of the receiver, for use by the receiving application.

§ 1.2.2 Known Transport Network Technologies

For many entities (such as businesses, universities, etc.), local area networks (or "LANs") suffice for intra-entity communications. Indeed, LANs are quite popular since they are relatively inexpensive to deploy, operate, and manage, and are based on mature, well-developed technology (e.g., Ethernet). The LANs' (by definition) compact geographic scope limits wiring expenses. The use of mature technologies and the fact that most LANs support limited numbers of hosts simplifies operations and management. Unfortunately, however, most entities need to communicate (voice and/or data) with their own facilities, or others, beyond their immediate location. Thus, wide area networks (or "WANs") are needed. Very often, entities want at least some privacy or security attached to their communications.

Presently, private long-haul communications can take place over networks that can be generally classified into two types—dedicated WANs that facilitate communications among multiple sites, and public transport networks that allow one or more sites of a private network to communicate. Both of these types of networks is introduced below.

Dedicated wide area networks (WANs) are typically implemented using leased lines or dedicated circuits to connect multiple sites. Customer premise equipment (or "CPE") routers or switches at theses sites connect these leased lines or dedicated circuits together to facilitate connectivity between each site of the network. Most private networks with a relatively large number of sites will not have "fully meshed" networks (i.e., direct connections between each of the sites) due to the cost of leased lines or dedicated circuits and to the complexity of configuring and managing customer premises equipment. Rather, some form of hierarchical network topology is typically employed in such instances.

Public transport networks, which are typically deployed by regional bell operating companies (or "RBOCs"), are often used to allow remote users to connect to an enterprise network using the public-switched telephone network (or "PSTN"), an integrated services digital network (or "ISDN"), or some other type of transport network technology. (Note that the word "public" in the phrase "public transport network" connotes the fact that more than one entity may use it, even though it may be privately owned and managed, and not available to the general public.) Such remote access may be facilitated by deploying network access servers (or NASs) at one or more central cites. When users connect to (e.g., dial into) a NAS, it works with authentication, authorization and accounting (or "AAA") servers to verify the identity of the user and to check which services that user is authorized to use.

Unfortunately, both dedicated WANs and existing transport networks have a number of limitations, at least some of which are introduced in § 1.2.3 below.

§ 1.2.3 Limitations of Known Transport Networks

As can be appreciated, private dedicated WANs are beyond the financial reach of most entities. Accordingly, so-called public transport networks have become quite popular. Unfortunately, however, various kinds of incompatible public transport networks have been introduced over the years in response to the then perceived needs to support various applications. Examples of such public transport network technologies include switched multimegabit data service (or "SMDS"), X.25 packet switched networks, frame relay, broadband ISDN, and asynchronous transport mode (or "ATM").

Briefly stated, SMDS was designed to connect together multiple LANs, typically those at the branch offices and factories of a given company. SMDS is switched, is not connection-oriented, has a normal speed of 45 Mbps, supports a maximum payload of 9188 bytes, and supports multicasting but not permanent virtual circuits. X.25 was designed to provide an interface between public packet-switched networks and their customers. X.25 is connection-oriented, is switched, has a normal speed of 64 Kbps, supports a maximum payload of 128 bytes, and supports permanent virtual channels, but not multicasting. Frame relay was designed to provide an absolute bare-bones connection-oriented way to move bits at reasonable speed and low cost. Frame relay is connection-oriented, is not switched, has a normal speed of 1.5 Mbps, supports a maximum payload of 1600 bytes, and supports permanent virtual circuits, but not multicasting. Finally, ATM is connection-oriented, is switched, has a normal speed of 155 Mbps, has a variable payload, and supports both permanent virtual circuits and multicasting.

It is important to reiterate that these public transport networks are incompatible. This fact has two onerous implications for communications companies. First, technologies with which customers access the transport network (referred to as "access technologies") must be compatible with the technology used in the transport network (unless there is a handoff between networks, which is expensive). Thus, customers are locked into a technology from end-to-end. Further, as illustrated in FIG. 8, such dependencies between access technologies and transport network technologies have forced public transport network owners, typically RBOCs, to support, maintain and administer (See administrations 820.) separate networks 810.

Second, various applications and potential applications of communications networks, such as voice, video-on-demand, audio-on-demand, e-mail, voice-mail, video conferencing, multicasting, broadcasting, Internet access, billing, authorization, authentication, and accounting, caching, fire-walling, etc., have different network requirements, such as requirements related to maximum permissible latency, data loss, delay jitter, bandwidth, network security, etc. Consequently, customers are expected to demand various levels of service offered at various prices. Unfortunately, some of the above-referenced public transport network technologies cannot support all of the aforementioned applications. For example, they may not offer adequate bandwidth, security, and/or adequate quality of service measures to support the aforementioned applications. Even if the various public transport network technologies did provide such quality of service support, supporting various service levels and types, globally, across a number of different transport networks greatly exacerbates the problem of supporting multiple networks. Indeed, the inventors believe that such global quality of service across a number of different networks hasn't even been attempted.

It is important to note that regarding the TCP/IP protocol, introduced in § 1.2.1.2.2 above, a number of packet forwarding and routing protocols, ostensibly supporting the provision of various service levels, have been proposed. Such protocols include multi-protocol label switching (or "MPLS"), resource reservation protocol (or "RSVP"), and differentiated services (or "DiffServ"). Unfortunately, presently, very few people have expertise with these protocols. Indeed, many are still evolving and are largely undefined. Further, it is unclear whether or not these protocols will scale well in networks supporting a large number of customers, particularly if they are "stateful" (i.e., require the state of the network, where the state is coherent across all or many nodes of the network). It is also unclear how these protocols will deal with issues of separately owned and operated networks (i.e., autonomous systems).

Thus, a better public transport network is needed.

§ 1.2.4 Goals

It is an object of the present invention to support various applications, such as video-on-demand, audio-on-demand, voice communications, data communications, e-mail, voice-mail, video conferencing, multicasting, broadcasting, Internet access, billing, virtual private networks, caching, fire-walling, etc. Since these various applications have different network requirements, it is a further goal of the present invention to provide a mechanism that may be used to support various levels and types of service.

It is a further object of the invention to provide a public transport network employing technologies that are independent of the technologies used to access it. In this way, the transport network can use a single technology to support various different access technologies and services. Such independence would allow communications companies, such as RBOCs for example, to use any transport network technology they chose. Further, in this way, network management is simplified since only a single technology is needed to support the public transport network. Advantageously, this also simplifies the process of providing various service levels and service types, by the communications companies.

The technology used in the public transport network should be proven, robust, and scalable.

It is yet another object of the present invention to permit customers to dynamically update customer addressing (e.g., routing) information, using any standard (e.g., routing) protocol, in a secure and transparent manner. Such updates should not require the customer to have extensive network expertise, such as knowledge of exterior gateway protocols like BGP-4. Thus, it is an object of the invention to permit a customer to simply plug in a device and start using it (within a short time) to communicate with other of their devices via the transport network.

Assuming that a communications company, such as an RBOC for example, chooses to base its public transport network on the internet protocol (or "IP"), a number of advantages are had. More specifically, there are a great number of commodity products support IP, there is a large labor base with knowledge of IP, and there are a large number of IP tools available. Further, quality of service and virtual private routed networks over IP are supported. However, using IP in a public transport network introduces a number of challenges.

First, many IP commodity products, such as routers for example, have large bandwidth capacity, but limited numbers of physical ports. Therefore aggregation is needed. Such aggregation may be achieved in two ways. First, virtual channels can be used to preserve addressing. Alternatively, customers can be uniquely identified in some way so that trunking may be used.

Presently, digital subscriber line access multiplexers (or "DSLAMs") may be used to concentrate traffic in asynchronous digital subscriber line (or "ADSL") implementations by using time division multiplexing. Basically, a DSLAM can accept twisted copper pairs supporting ADSL service and provide them on virtual channels on a shared common communications medium, such as an OC3 (e.g., 155.52 Mbps) fiber channel. However, an asynchronous transfer mode (or "ATM") switch is needed to switch these physical connections to virtual channels, thereby necessitating an ATM switch port for each customer connection. Aside from physically requiring a lot of space, using a DSLAM for this purpose is expensive on a per port basis.

Thus, improved techniques are needed to aggregate physical connections, for example, for presentation to an access router at the edge of a public transport network. In this regard, it is an object of the present invention to aggregate a large number of physical connections, for presentation to a small number of high bandwidth ports.

Second, in the context of virtual private networks, a layer 3 (e.g., IP) address is not necessarily globally unique. Thus, it is a further object of the present invention to enable proper end-to-end data (e.g., packet) forwarding, even in instances where it cannot be assumed that layer 3 addresses are globally unique.

Finally, it is an object of the present invention to provide a transport network in which customer data is private and secure.

§ 2 SUMMARY OF THE INVENTION

The present invention meets at least some of the foregoing objects by isolating the public transport network from the technologies used to access it. The present invention may do so by modifying data (e.g., packets) at the edge of the public transport network to remove information related to (layer 2) access technologies and to include information related to (i) forwarding data to customer devices and/or (ii) providing various service levels and types (e.g., quality of service, access control, etc.). The present invention may then encapsulate such modified data with carrier information. Such carrier information is used to have the modified data traverse the public transport network. This normalization, adding of information related to forwarding and service levels and types, and encapsulation helps to isolate the public transport network technology from the technologies used to access the public transport network.

The information added to (and/or over) the data may be referred to as "context information". This context information may be appended and/or prepended to the data, and/or may replace at least a part of the data. For example, if the data is in the form of an Ethernet frame, the context information, which may include a unique logical port (or logical interface) identifier, virtual private network identifiers, and service level information, may replace layer 2 source and destination information. This is because the layer 2 source information is no longer needed and layer 2 destination information is not needed if the next device operates in the so-called "promiscuous" mode (i.e., accepts all packets, even those not addressed to it).

The carrier information may be based on at least a part of the context information, in addition to destination address (e.g., layer 3 network address) information, and may be used to forward the data to a proper egress edge device of the public transport network.

The present invention may generate context-based address information, thereby permitting customers to dynamically update routing information in a transparent manner, which requires little or no networking expertise. This may be done by forwarding advertisements (emitted as a matter of course from many customer devices), via an out-of-band network, to a centralized edge information update facility where carrier information tables (e.g., that associate customer device layer 3 destination addresses and customer identification information with a layer 3 address of an egress access router) are determined. The (updated) carrier information tables may then be disseminated (e.g., via the out-of-band network) to the data forwarding devices (e.g., routers) at the edge of the public transport network.

§ 3. BRIEF DESCRIPTION OF THE DRAWINGS

FIG. 1 illustrates the way in which network communications schemes may be described by a stack of protocols.

FIG. 2 compares the OSI reference model and the TCP/IP protocol suite.

FIGS. 7A through 7C illustrate the transmission of data over a network in accordance with the TCP/IP protocol suite.

FIG. 12 illustrates an exemplary address resolution table that may be maintained and used by an exemplary aggregation unit in accordance with the present invention.

FIG. 13 illustrates an exemplary logical interface-context information association table that may be maintained and used by an exemplary aggregation unit in accordance with the present invention.

FIG. 14 is an exemplary data forwarding table that may be used by an exemplary access router in accordance with the present invention.

FIG. 15 is an exemplary address resolution table that may be used by an exemplary access router in accordance with the present invention.

FIG. 32 is an exemplary data structure of a context-based carrier information table.

FIG. 33 is an exemplary data structure of a context-based address resolution table.

FIG. 34 illustrates an exemplary data structure of network edge information.

FIG. 40 illustrates an exemplary advertisement with context information and as encapsulated, for forwarding to an edge information update facility.

§ 4. DETAILED DESCRIPTION

The present invention involves novel methods, apparatus and data structures for providing a transport network, for permitting customers to access the novel transport network, for permitting data to be properly forwarded across the novel transport network and to a destination customer device, and to help provide certain services. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the following disclosed methods, apparatus and data structures and any other patentable subject matter.

In the following, an exemplary environment in which the invention may operate is described in § 4.1. Then, functions that may be performed by the present invention are introduced in § 4.2. Thereafter, processes related to those functions, as well as structures, methods and data structures that may be used to effect those functions, are described in § 4.3. Thereafter, the end-to-end processing of an IP-in-Ethernet packet in a system including exemplary aggregation units and access routers is described in § 4.4. Finally, some conclusions regarding various aspects of the present invention are provided in § 4.5.

§ 4.1 Exemplary Environment in Which the Present Invention May Operate

Figure 1:
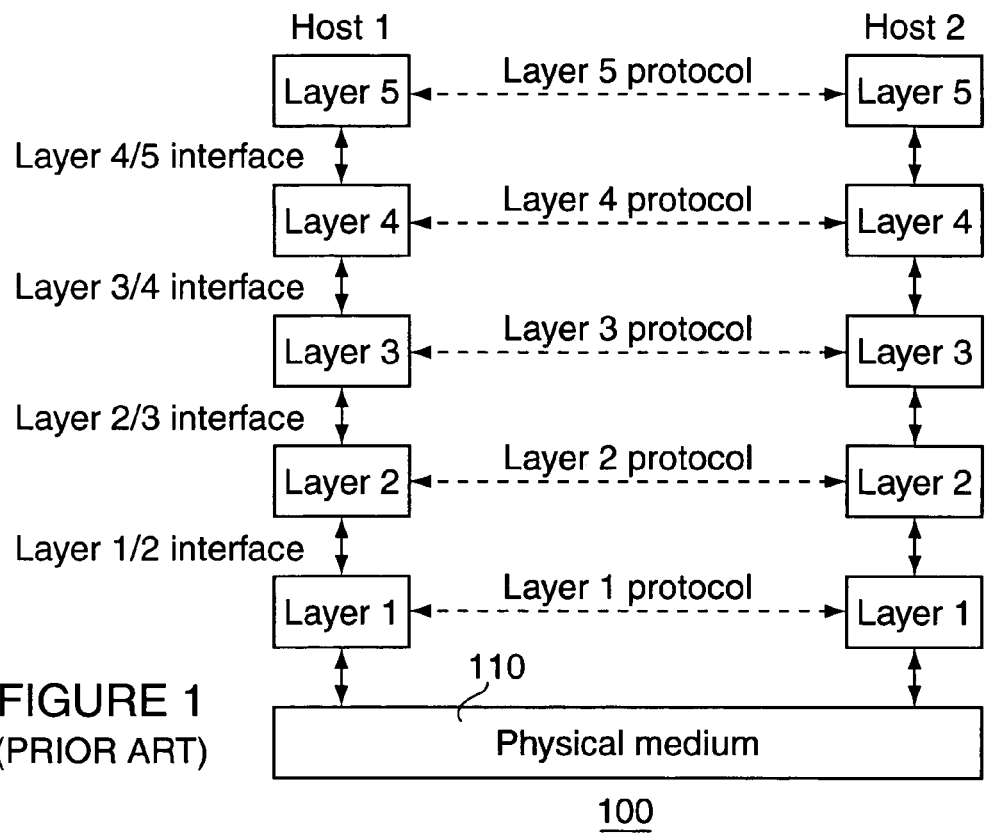
Figure 2:
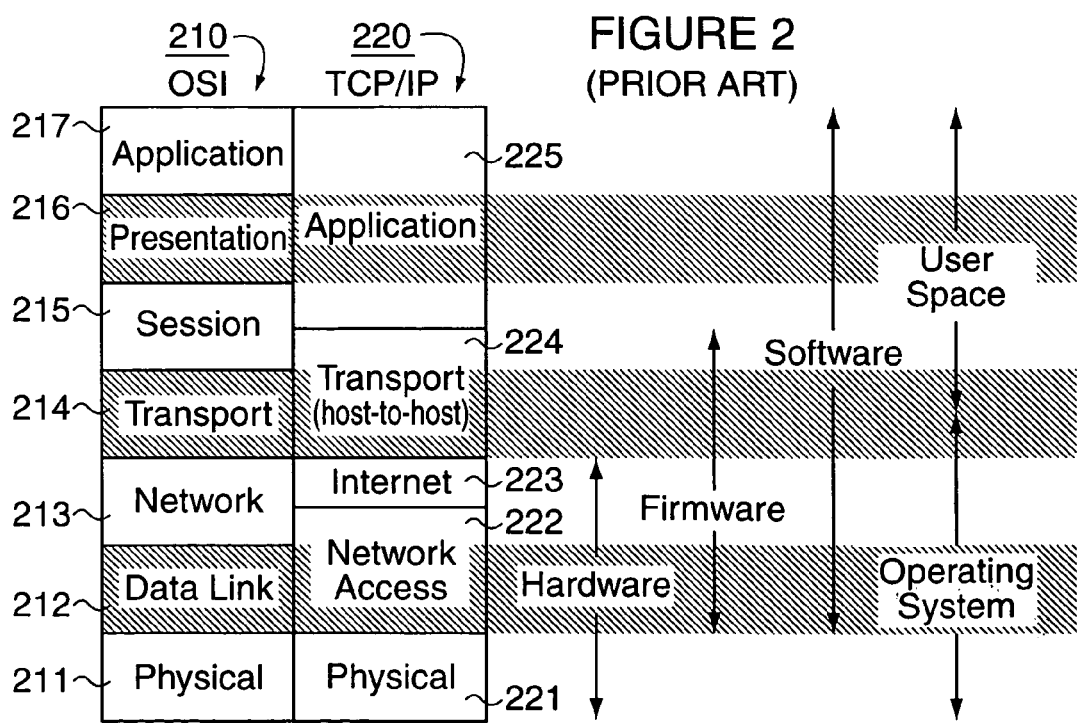
Figure 3:
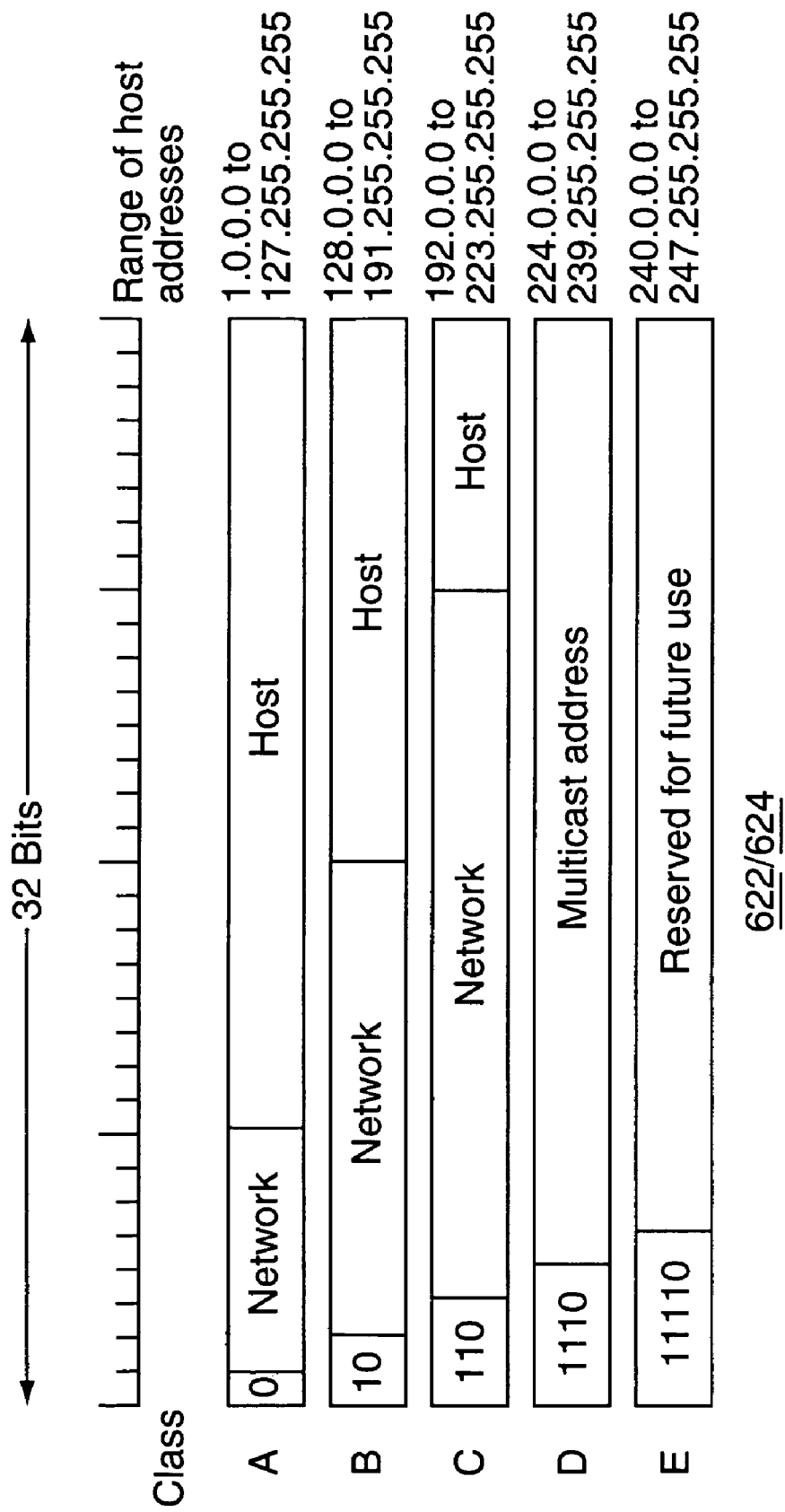
FIG. 3 illustrates internet protocol (or "IP") global addressing.
Figure 4:
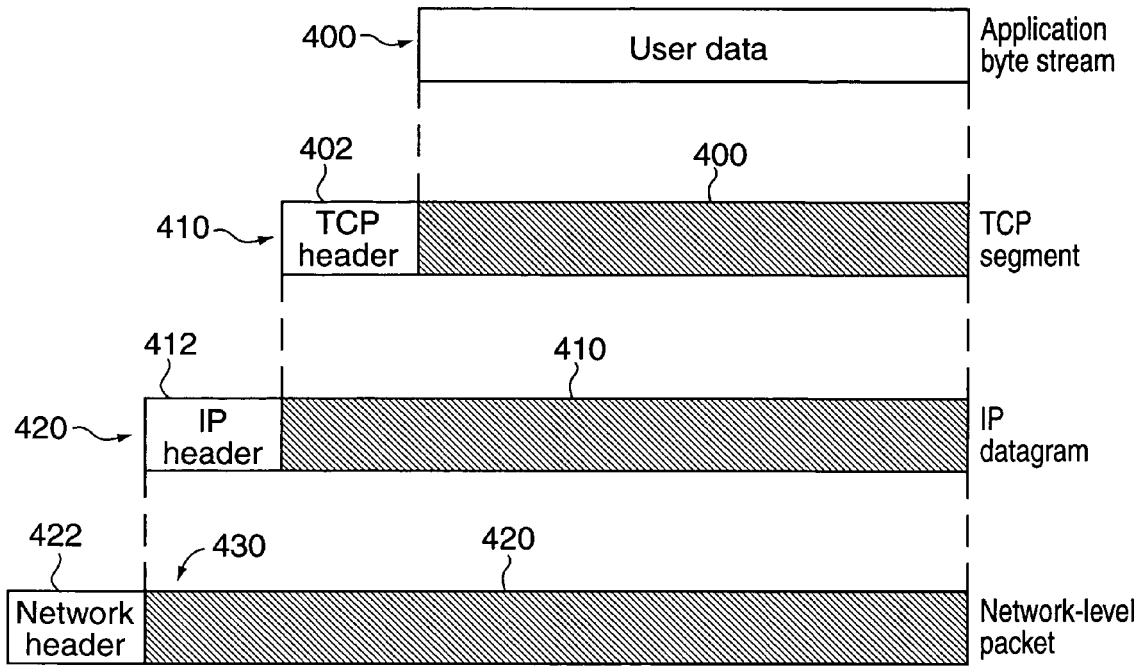
FIG. 4 illustrates the manner in which data is encapsulated by a TCP header, an IP header, and a network header in accordance with the TCP/IP protocol suite.
Figure 5:
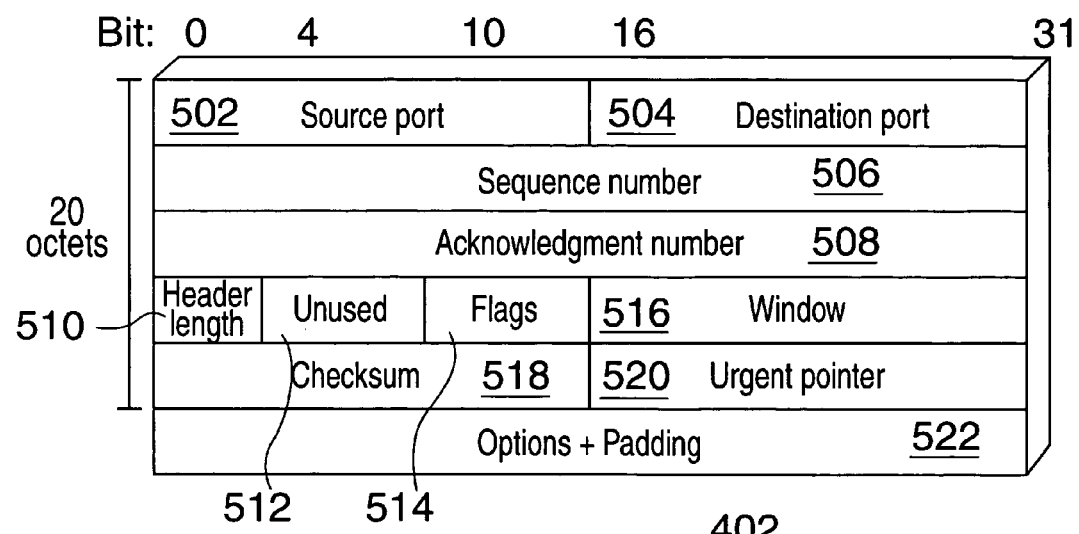
FIG. 5 illustrates the fields of a TCP header.
Figure 6A:
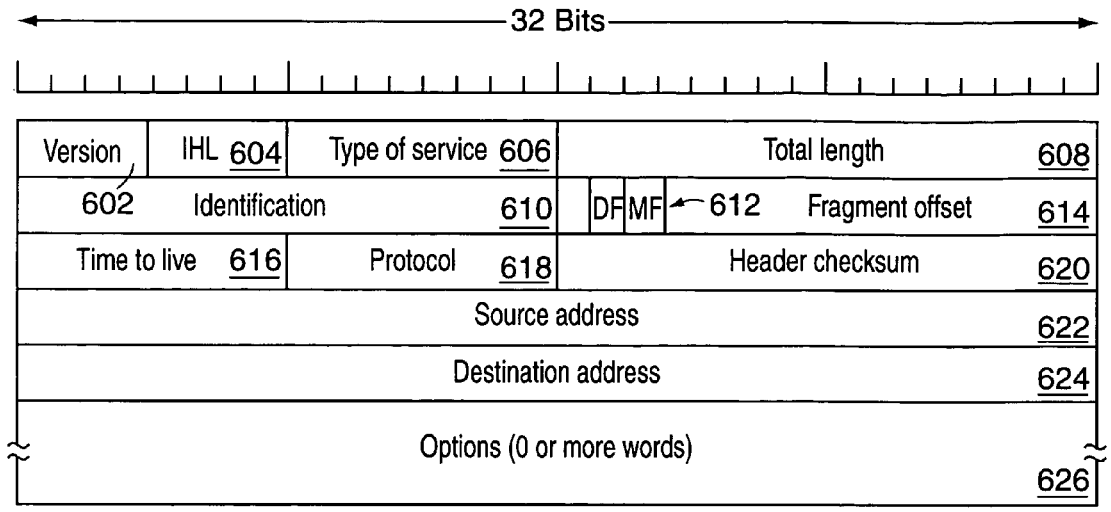
FIGS. 6A and 6B illustrate the fields of Version 4 and Version 6, respectively, of the IP header.
Figure 6B:
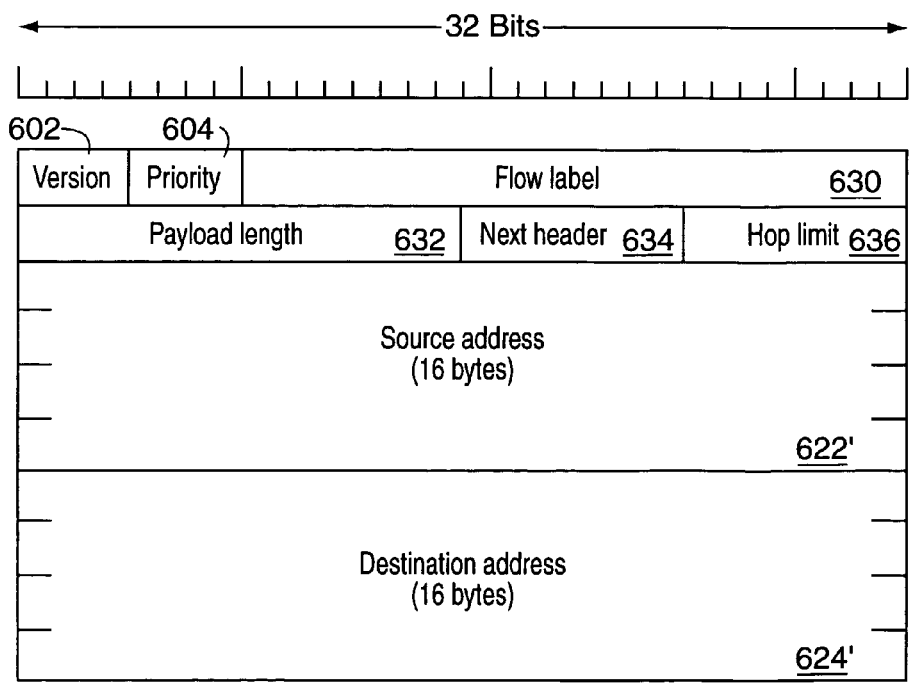
Figure 7B:
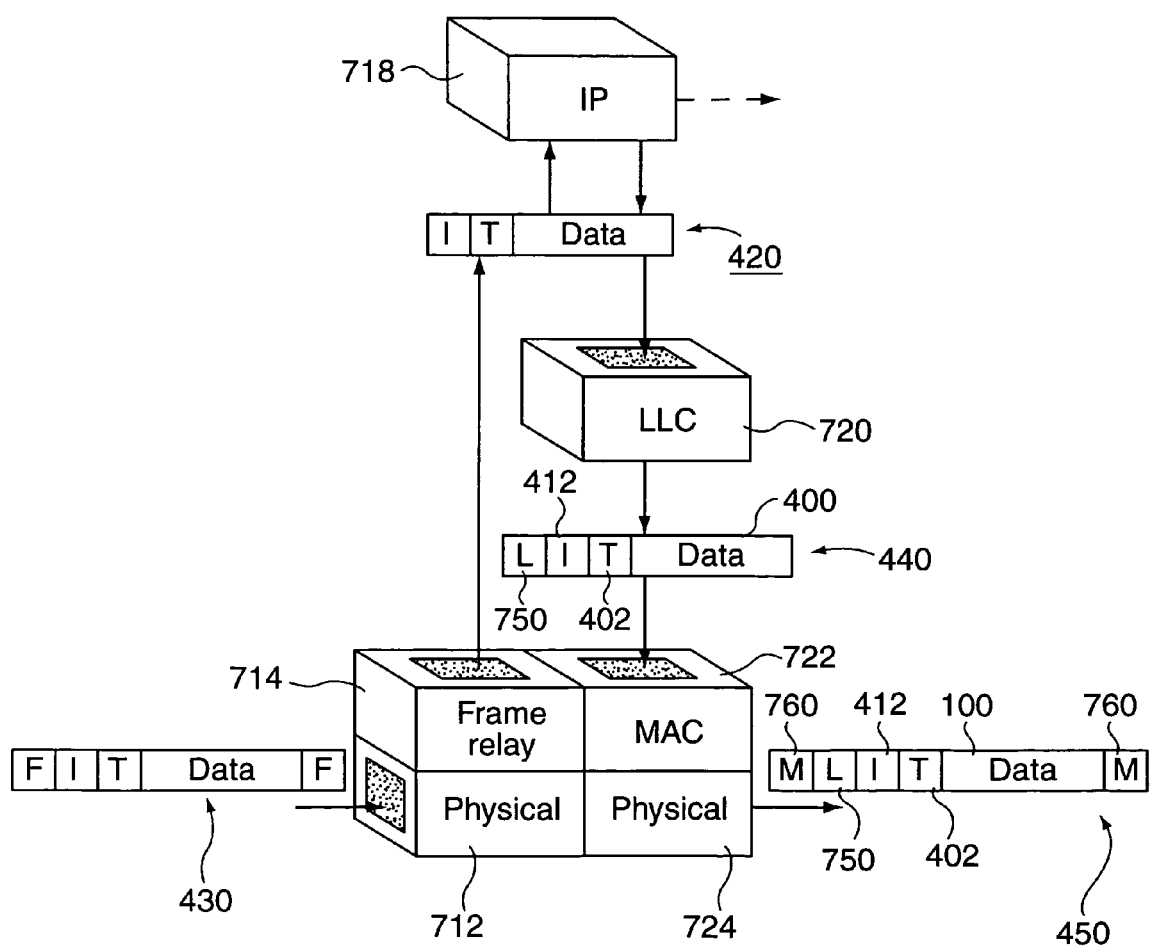
Figure 7C:
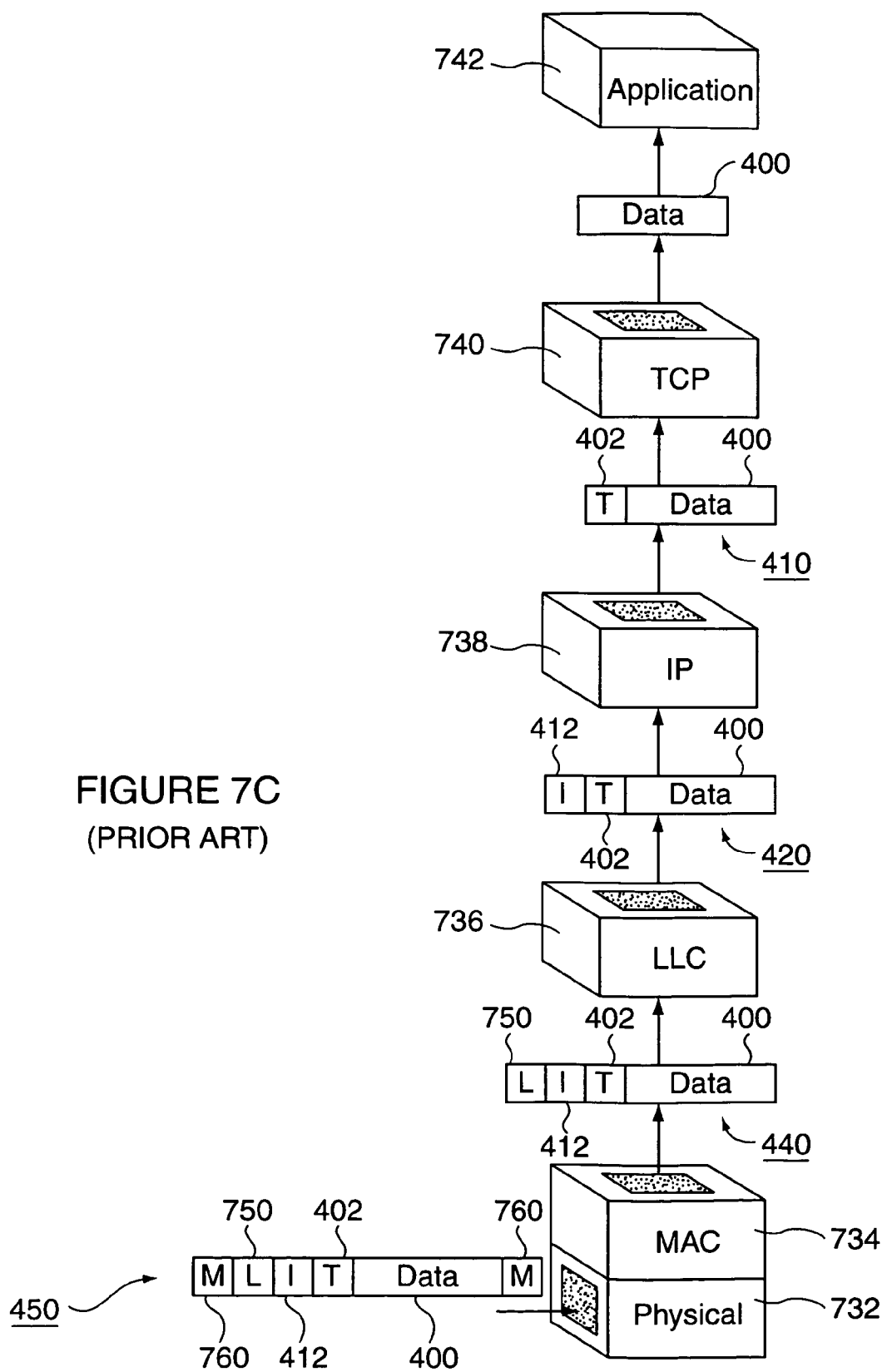
Figure 8:
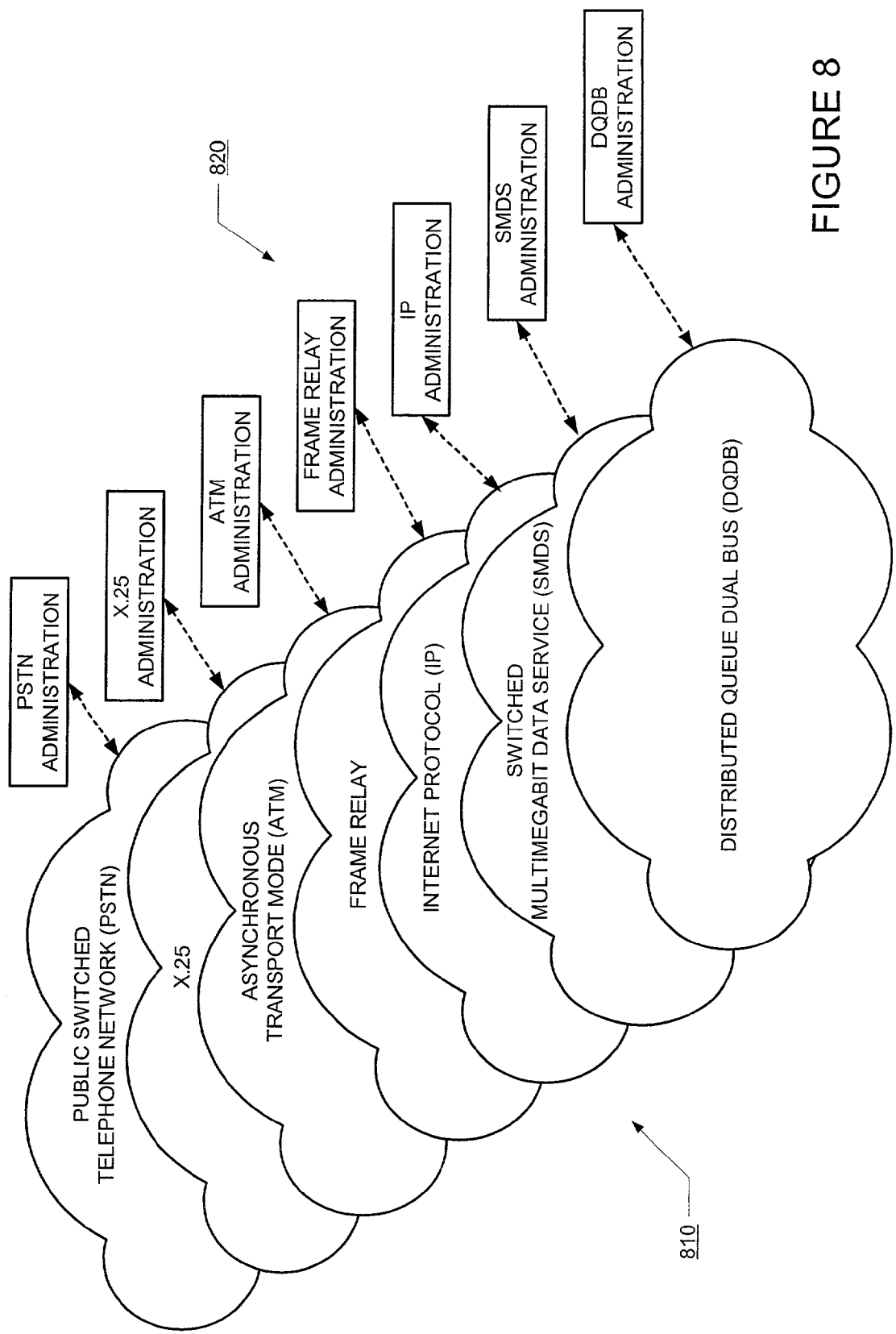
FIG. 8 is a high-level diagram which illustrates the problem for communications companies, such as RBOCs, of providing and administering multiple public transport networks based on different, incompatible technologies.
Figure 9:
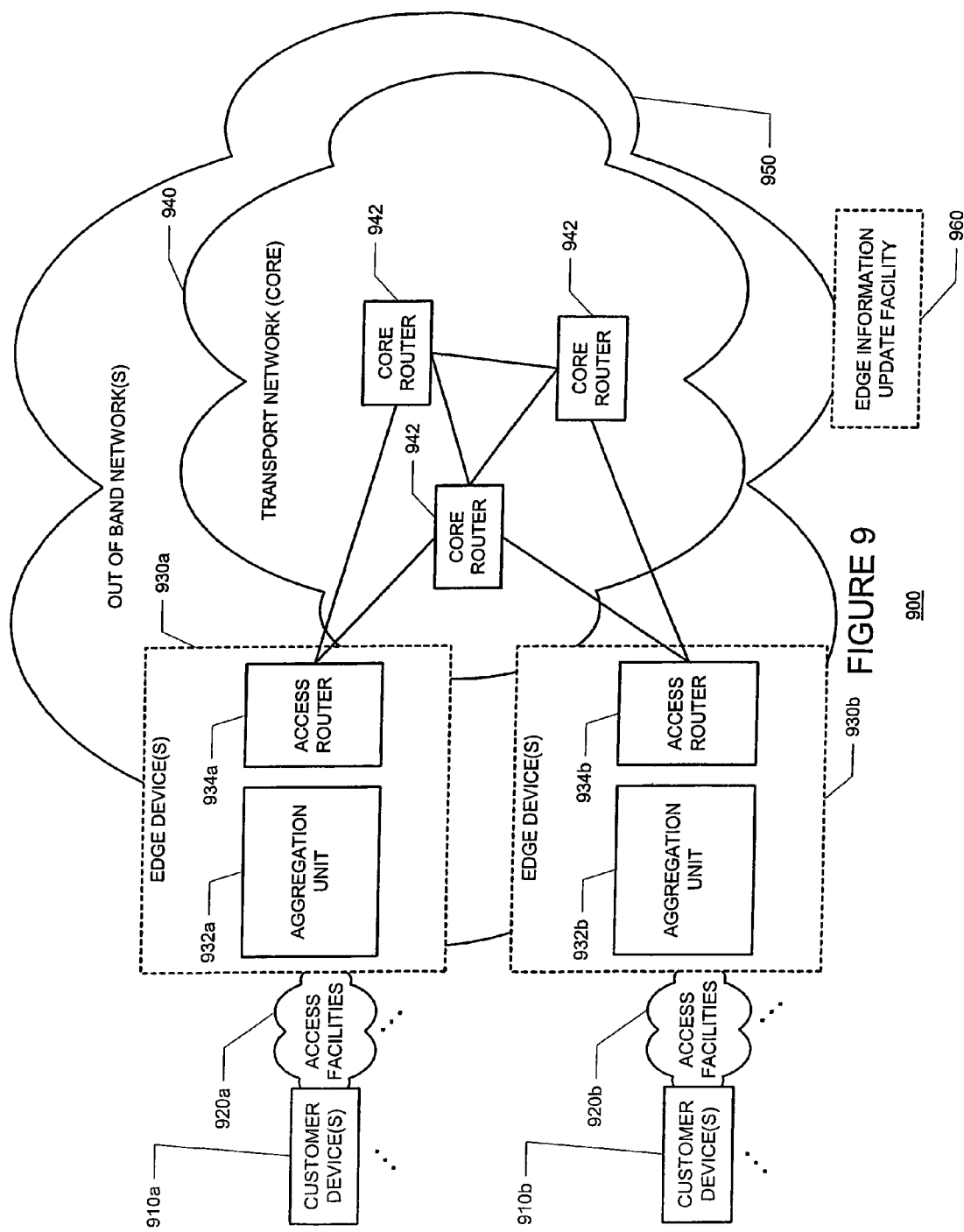
FIG. 9 is a high-level diagram of an environment in which various aspects of the present invention may be performed.

FIG. 9 is a high-level diagram of an environment 900 in which various aspects of the present invention may be performed. Various customer devices 910 may send data over a public transport network 940. Such customer devices 910 may access the public transport network 940 via access facilities 920 and edge devices 930.

The customer devices 910 may be hosts including, or coupled with, hubs, switches, routers, terminal adapters, etc. It may be assumed that many customers may use Ethernet since Ethernet is widely used in local area networks.

The access facilities 920 may use any type of layer 1 and layer 2 access (e.g., point-to-point) technology, such as digital subscriber line (or "DSL"), ISDN, ATM, frame relay, transparent LAN service (or "TLS"), fiber to the home, packet-over-SONET (or "PoS") channelized T3, etc.

The edge devices 930 may include an aggregation unit 932 and an access router 934. These devices, collectively, 930 may function to process data received from a customer device 910, heading towards the transport network 940, as well as data received from the transport network 940, destined for a customer device 910. Regarding customer-to-transport network flowing data, the edge devices 940 may (i) remove layer 2 access facility transport information, (ii) add context information (which may include addressing, customer identification, and/or service level and service type information), and (iii) encapsulate the resulting data in a "carrier" which will carry the resulting data across the transport network 940 to an appropriate egress edge device 930. Regarding transport network-to-customer flowing data, the edge devices 930 may (i) de-encapsulate data to remove the "carrier", and (ii) forward the data to the appropriate customer device 910 based on a destination address and at least a part of the context information.

The edge device(s) 930 may receive route advertisement data from a customer device 910. The edge device(s) 930 may forward such data, (through the core) via an out-of-band network(s) 950, to an edge information update facility 960. The edge information update facility may function to (i) determine carrier information used within the transport network based on network edge information included in received advertisements, and (ii) disseminate such determined carrier information to the access routers 934 at the edge of the public transport network 940.

Having introduced an environment 900 in which various aspects of the present invention may be performed, functions that may be performed by the present invention are now introduced in § 4.2 below.

§ 4.2 Functions that may be Performed by the Invention

Higher level functions that may be performed by the system of the present invention as a whole are first introduced in § 4.2.1. Then, functions that may be performed by system components, some of which may be related to the system level functions introduced in § 4.2.1, are introduced in § 4.2.2 below.

§ 4.2.1 System Level Functions

Various system level functions that may be performed by the present invention are introduced in §§ 4.2.1.1 through 4.2.1.4 below. The reader will notice that many of these functions were described in § 1.2.4 above as objects or goals of the invention.

§ 4.2.1.1 Transport Technology Independence

As introduced in § 1.2.3 above, presently, communications companies, such as RBOCs for example, provide and maintain multiple public transport networks 810 based on a number of different, incompatible technologies. Thus, communications companies are now forced to maintain multiple public transport networks. Further, such companies presently require their customers to choose an access technology compatible with one of the public transport networks. Furthermore, since some public transport networks are well suited for only certain applications, a given customer may be required to use more than one different type of access technologies in some instances.

The present invention may function to permit the technology used in the public transport network to be independent of technologies used by customers to access the public transport network. In this way, communications companies can now use a single technology for its public transport network(s) 940 (provided that that the technology supports all the applications offered to its customers). This relieves the burden on the transport network 940, freeing communications companies to pursue low cost, easy to manage technologies, such as TCP/IP. The present invention may accomplish this function by providing edge devices 930 which may encapsulate incoming data in so-called "carrier" information used to move the data across the public transport network. The edge devices 930 may have first (i) removed layer 2 information related to the technology used in access facilities 920 used by the customer device 910 to access the public transport network 940, (ii) normalized (e.g., the frame or format of) the data, and (iii) added context information.

§ 4.2.1.2 Data (Packet) Transport

As just described, the present invention may use "carrier" information to move data across the public transport network. However, the data must ultimately get from the edge of the public transport network 940 to the customer device 910 to which it was addressed. To this end the present invention may use a combination of snooping and/or using an address resolution protocol (or "ARP") to populate aggregation unit 932 address resolution tables (used to get data from a logical interface to a customer device), and context-based routing or ARPing via a proxy to populate access router 934 address resolution tables (used to get data from an access router to a logical interface).

For data transport across the public transport network, the present invent may send address advertisements and context information to an edge information update facility and disseminate updated carrier information to access routers 934 at the edge of the public transport network 940. This carrier information is used to forward data through the public transport network 940, from an ingress edge device 930 to an egress edge device 930.

§ 4.2.1.3 Support Various Service Levels and Types

As described above, there are numerous applications in which data will need to be moved across a public transport network 940. To reiterate, different applications will have different requirements (e.g., regarding data loss, latency, delay jitter, bandwidth, network security, etc.). Although a public transport network 940 could, at least theoretically, be engineered to provide every customer with network facilities able to support every application, it is not economically feasible to do so.

Accordingly, the present invention may function to support various service level agreements to its customers. The present invention may do so by adding context information, including at least some service level information, to incoming data. Since a customer device 910 will be associated with a unique logical interface (or logical port), the communications company can configure each of the logical interfaces of its edge devices 930 to include context information associated with particular customer device 910. The present invention may also use application layer information included in the data itself, to determine an appropriate service level. For example, a given customer device may be using the public transport network 940 for e-mail one minute, and video conferencing the next. As this example illustrates, the network resources needed may change from customer to customer, and from application to application for a given customer as well.

The present invention may further function to limit access to certain locations or types of services based on at least a part of the context information.

§ 4.2.1.4 Support Virtual Private Networks

The present invention may also function to support virtual private networks. As alluded to in § 1.2.3 above, private dedicated WANs are beyond the financial reach of most entities. Accordingly, public transport networks have become quite popular. Virtual private networks can provide customers with most or all of the features of private networks, at a greatly reduced cost. However, addressing and security challenges arise when providing virtual private network services.

First, regarding addressing, a communications company cannot ensure that layer 3 addresses are globally unique. That is, different customers may use overlapping layer 3 addresses—this is simply beyond the control of the communications company. The present invention may function to provide a virtual private network service with globally unique addressing, notwithstanding the fact that different customers may have overlapping addresses. The present invention may perform this function by using at least some of the context information (e.g., to identify a customer's virtual private network), in conjunction with (layer 3) destination address information, for defining a globally unique destination address (or for defining a globally unique logical interface). It is left to each particular customer to ensure that it uses unique addressing within its network.

Second, regarding security, the present invention may use at least a part of the context information to control access as stated above, and may further use at least a part of the content information to strictly limit membership to groups, such as multicast groups for example. The present invention may also function to prevent snooping and other potential invasions of privacy, at least within the public transport network 940 (though not within the access facilities), by controlling all aspects of the public transport network 940.

Having introduced higher level functions that may be performed by the system of the present invention as a whole in § 4.2.1 above, functions that may be performed by system components, some of which may be related to such system level functions, are introduced in § 4.2.2 below.

§ 4.2.2 System Component Level Functions

Referring once again to FIG. 9, functions that may be performed by an aggregation unit 932 are introduced in § 4.2.2.1 below, and functions that may be performed by an access router 934 are introduced in § 4.2.2.2 below. Finally, functions that may be performed by a route (or path) update facility 960 are introduced in § 4.2.2.3 below.

§ 4.2.2.1 Aggregation Unit Functions

The aggregation units 932 may perform a number of functions, at least some of which are introduced in §§ 4.2.2.1.1 through 4.2.2.1.4 below.

§ 4.2.2.1.1 Aggregating a Large Number of Physical Links

Recall from § 1.2.4 above that a communications company, such as an RBOC for example, may choose to base its public transport network on the internet protocol (or "IP"). An RBOC may chose to do so because a number of commodity products support IP, there is a large labor base with knowledge of IP, and there are a large number of IP tools available. However, using IP in a public transport network introduces a number of challenges.

First, many IP commodity products, such as routers for example, have large bandwidth capacity, but limited numbers of physical ports. For example, standards-based routers that can handle 128 Gbps bandwidth are currently available. However, such routers cannot accommodate the physical connections of the tens or hundreds of thousands of individual services that they could otherwise accommodate. For example, assuming that customers had a very high end 10 or 100 Mbps service (or communications access links capable of such service levels), such routers could process the data flow from 12,800 or 1,280 customers, respectively, but could not accommodate those numbers of physical connections. Naturally, a larger number of physical connections (e.g., for lower end service(s)) could not be accommodated.

In this regard, the aggregation unit 932 of the present invention may function to aggregate a large number of physical connections, for presentation to a small number of high bandwidth ports. The present invention may do so by trunking traffic entering the network, while using at least a part of the context information to preserve information needed to properly forward the data. For example, the present invention may (e.g., temporally, spatially, statistically) multiplex customer traffic onto a smaller number of high bandwidth ports for presentation to access routers 934.

§ 4.2.2.1.2 Normalize Data for Transport Network

As described in § 4.2.1.1 above, the present invention may function to make the technology used in the public transport network 940 independent of technologies used in access facilities 920 used by customers to access the public transport network 940. This relieves or removes many constraints on the public transport network 940, freeing communications companies to pursue low cost, easy to manage technologies such as TCP/IP. The aggregation unit 932 may support such independence by removing (layer 2) information related to the access technology used by the customer to access the transport network 940. The remaining data may be framed or formatted in a normalized manner for easier processing within the public transport network 940. Since much of the customer traffic may originate from local area networks (LANs), and since Ethernet has been, and is expected to continue to be, the most popular protocol for LANs, the "normalized" frame may correspond to an Ethernet frame. Using Ethernet framing is also advantageous because the edge router can operate in the "promiscuous mode", thereby permitting layer 2 destination address information in the header to be overwritten with context information.

§ 4.2.2.1.3 Support Various Service Levels, Service Types and Virtual Private Networks As introduced in § 4.2.1.3 above, the present invention may function to support various service level agreements to its customers, by adding context information, including at least some service level information, to incoming data. The aggregation unit 932 may function to add such context information based on a logical interface associated with the incoming data, and/or an application(s) present in the incoming data. At least some of the context information can be used for queuing control and access control.

§ 4.2.2.1.4 Data (Packet) Forwarding (To Customer Devices)

As described in § 4.2.1.2 above, the present invention may use a combination of snooping and/or an address resolution protocol (or "ARP") to populate aggregation unit 932 address resolution tables (used to get data from a logical interface to a customer device). The aggregation units 932 may function to perform such snooping and/or ARPing, and may store the address resolution table populated based on such snooping and/or ARPing.

§ 4.2.2.2 Access Router Functions

The access routers 934 may perform a number of functions, at least some of which are introduced in §§ 4.2.2.2.1 and 4.2.2.2.2 below.

§ 4.2.2.2.1 Support Various Service Levels, Service Types and Virtual Private Networks (Preserve Context Information)

As stated in § 4.2.1.3 the present invention may function to support various service level and type agreements with its customers. Further, as just stated in § 4.2.2.1.3 above, aggregation units may add context information, including at least some service level information, to incoming data. The access routers 934 may use at least a part of the context information to limit access to certain locations or service types based on at least a part of the content information. The access routers 934 may also use at least a part of the context information to support various service levels, such as by applying various queuing and scheduling policies, for example.

§ 4.2.2.2.2 Data (Packet) Forwarding

As stated in § 4.2.1.2 above, the present invention may use "carrier" information to move data across the transport network. This "carrier" information may include egress edge device 930 destination address information. The access routers 934 may store such carrier information for forwarding data through the public transport network 940, from an ingress edge device 930 to an egress edge device 930. For data received from the core of the public transport network 940, the access routers 934 may store a context-based address resolution table and may use a destination (layer 3) address and at least some context information to look up an effective (layer 2) destination address associated with the logical interface assigned to the destination customer device 910.

§ 4.2.2.3 Edge Information Update Facility Functions

The edge information update facility 960 may function to accept customer device address update information (also referred to as "address advertisements" or "advertisements"), update a network edge information based on such update information, update carrier information based on the network edge information, and disseminate such updated carrier information to access routers 934 at the edge of the public transport network 940.

The edge information update facility 960 may function to accept address advertisements by receiving copies of such address advertisements, via an out-of-band network 950, from, in each case, the access router 934 first receiving the address advertisement. The edge information update facility 960 may also function to disseminate updated carrier information to access routers 934 of the public transport network 940 by using the out-of-band network 950.

Using the out-of-band network relieves the core of the public transport network 940 of the burden of carrying certain address advertisement and route (or path) signaling, which might otherwise become unacceptable as the number of customer devices 910 increases. Further, the out-of-band network 950 itself may include a hierarchy of nodes for forwarding address advertisement information. In this way, the transport network 940 and the number of devices at its edge are scalable.

Having introduced various functions that may be performed by the present invention, exemplary apparatus, processes, methods and data structure, both at the system level and at the component level, are described in § 4.3 below.

§ 4.3 Exemplary Apparatus, Processes, Methods and Data Structures

Exemplary apparatus, processes, methods and data structures, at the system level, are described in § 4.3.1 below. Then, details of exemplary aggregation units, access routers, and routing update facilities are described in §§ 4.3.2, 4.3.3 and 4.3.4, respectively.

§ 4.3.1 System Level

The present invention concerns the edge of a public transport network 940, as well as a edge information update facility 960 which interacts with components (e.g., nodes, such as routers) of the public transport network 940 via an out-of-band network 950. The edge of the public transport network 940 may be defined by edge devices 930. These edge devices 930 may include aggregation units 932 and access routers 934. Exemplary aggregation units 932' are described in § 4.3.2. Exemplary access routers 934' are described in § 4.3.3. Then, an exemplary edge information update facility 960' is described in § 4.3.4.

§ 4.3.2 Aggregation Unit

Figure 10:
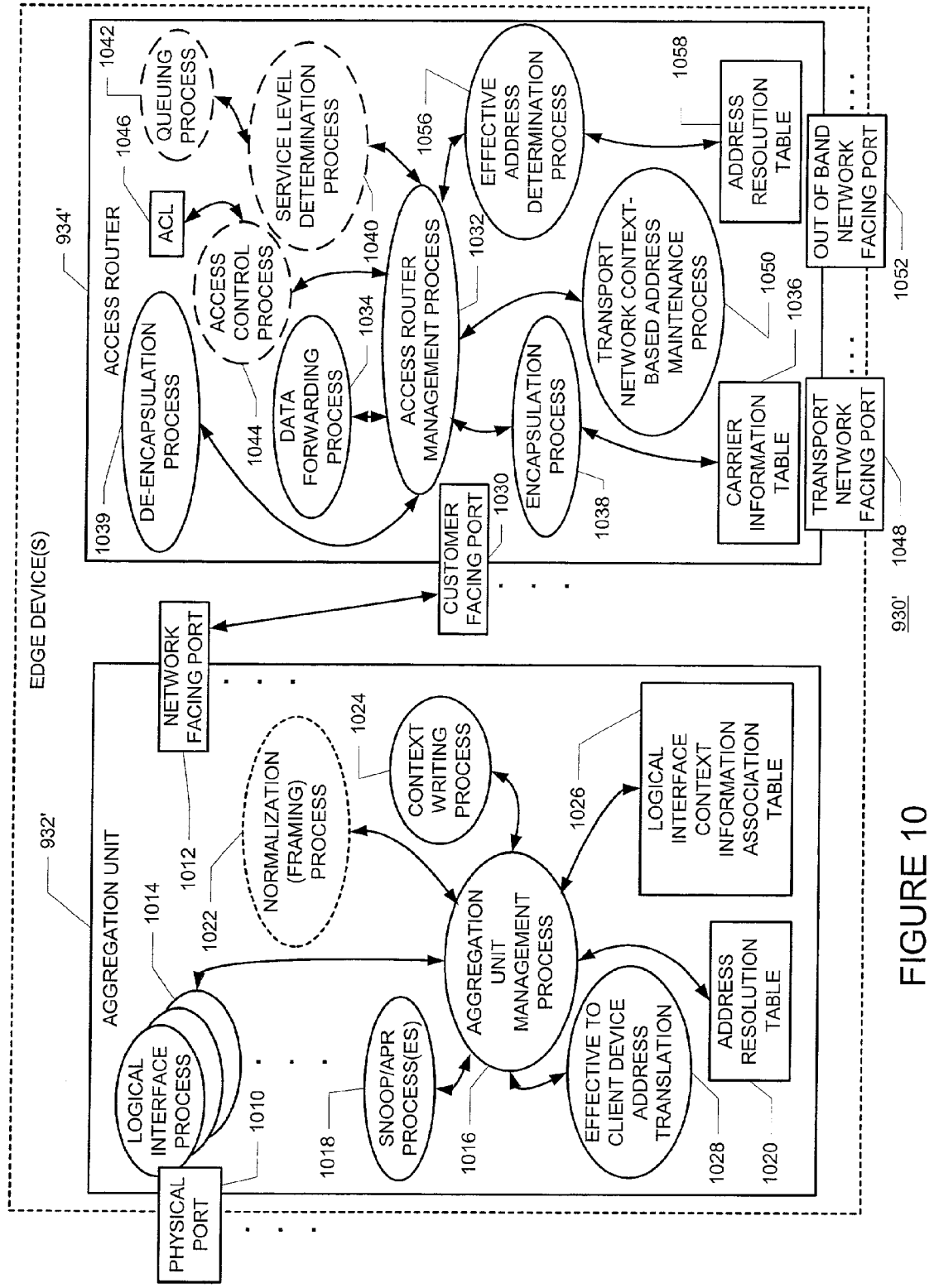
FIG. 10 illustrates exemplary edge devices that may be used in the environment of FIG. 9.

FIG. 10 illustrates an exemplary edge device 930' that may be used in the environment of FIG. 9. As shown, the exemplary edge device 930' may include an exemplary aggregation unit 932'. Many of the structural aspects of an exemplary aggregation unit are described in U.S. patent application Ser. No. 09/652,822, entitled "METHODS, APPARATUS AND DATA STRUCTURES FOR PROVIDING ACCESS TO AN EDGE ROUTER OF A NETWORK", by Robert T. Baum and Eric A. Voit filed on Aug. 31, 2000. It should suffice to note that the aggregation unit 932' includes a relatively large number of customer-facing physical ports 1010 and a smaller number of network-facing ports 1012.

Each customer-facing physical port 1010 may have one or more associated logical interface process 1014 (also referred to as "logical interfaces" or "logical ports"), but a logical interface process 1014 may only be associated with one physical port 1010. Each logical interface process 1014 may be thought of as terminating a virtual channel (or "VC"). Thus, if the access facility 920 technology supports virtual channels (e.g., ATM), then one physical interface 1010 can have multiple associated logical interface processes 1014, each supporting a virtual channel. If, on the other hand, the access facility 920 technology does not support virtual channels (e.g., standard Ethernet), then the physical interface 1010 will have only one associated logical interface process 1014. The number of logical interface processes 1014 that a given aggregation unit 932' can have may depend upon the design of context information, which is described below.

Figure 16:
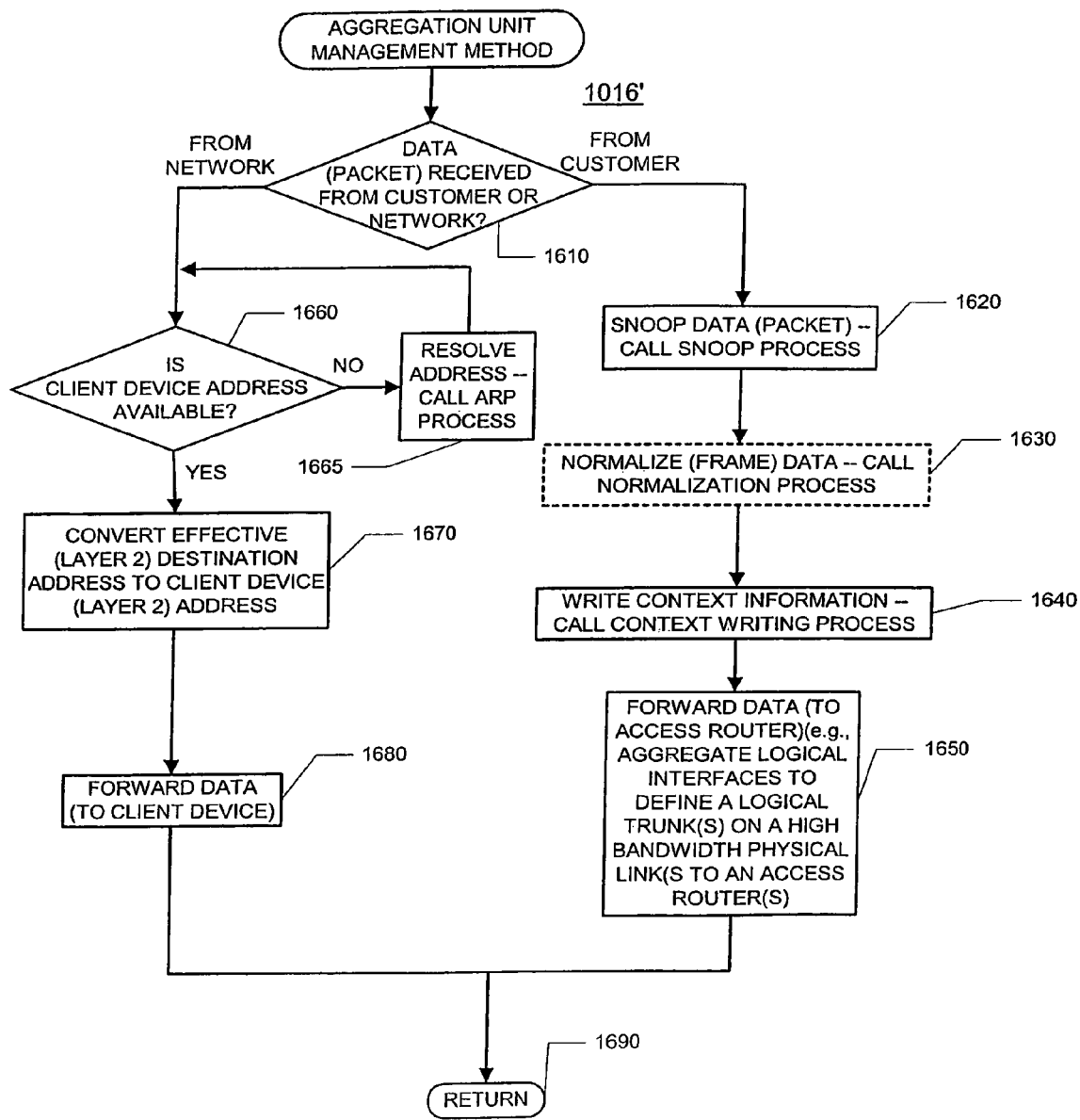
FIG. 16 is a high-level flow diagram of an exemplary method that may be used to manage various processes of an exemplary aggregation unit.
Figure 17:
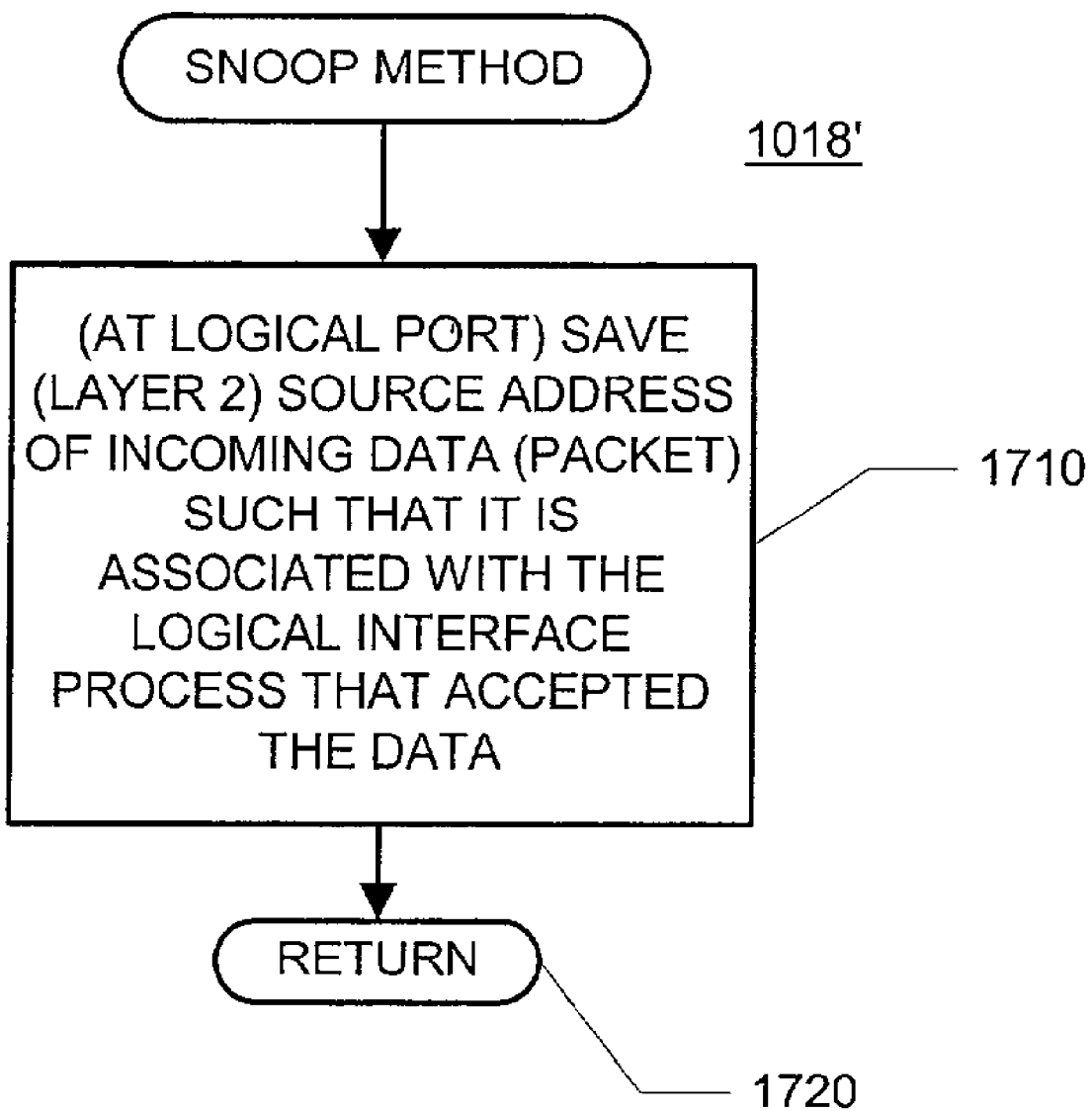
FIG. 17 is a high-level flow diagram of an exemplary method that may be used to effect a snoop process in an exemplary aggregation unit.

The various processes of the aggregation unit 932' may be managed by an aggregation unit management process 1016. FIG. 16 is a high level flow diagram of an exemplary method 1016' that may be used to effect that process 1016. First, as indicated by conditional branch point 1610, it is determined whether data, which will typically be a packet, is received from a customer device 910 (i.e., at a customer-facing port) or from the public transport network 940 (i.e., at a network-facing port). If the data is received from a customer device 910, the data may be snooped to determine the (layer 2) source address of the data (e.g., a snoop process 1018 is called) as indicated by step 1620. FIG. 17 is a high level flow diagram of an exemplary method 1018' that may be used to effect the snoop process 1018. As indicated in step 1710, the source address of the incoming data, as well as the associated logical interface process 1014 which received the data, are saved (e.g., in an address resolution table 1020, or simply in association with (e.g., a register of) the logical interface 1014). Referring to FIG. 12, an exemplary address resolution table 1020' may include a number of entries 1210, each of the entries including a logical interface 1014 identifier 1212 and a (layer 2) address 1214 of the customer device 910 associated with the logical interface 1014. As will be described later, this customer device 910 address—logical interface process 1014 association is used to forward data from a logical interface process 1014 to the associated customer device 910.

Figure 18:
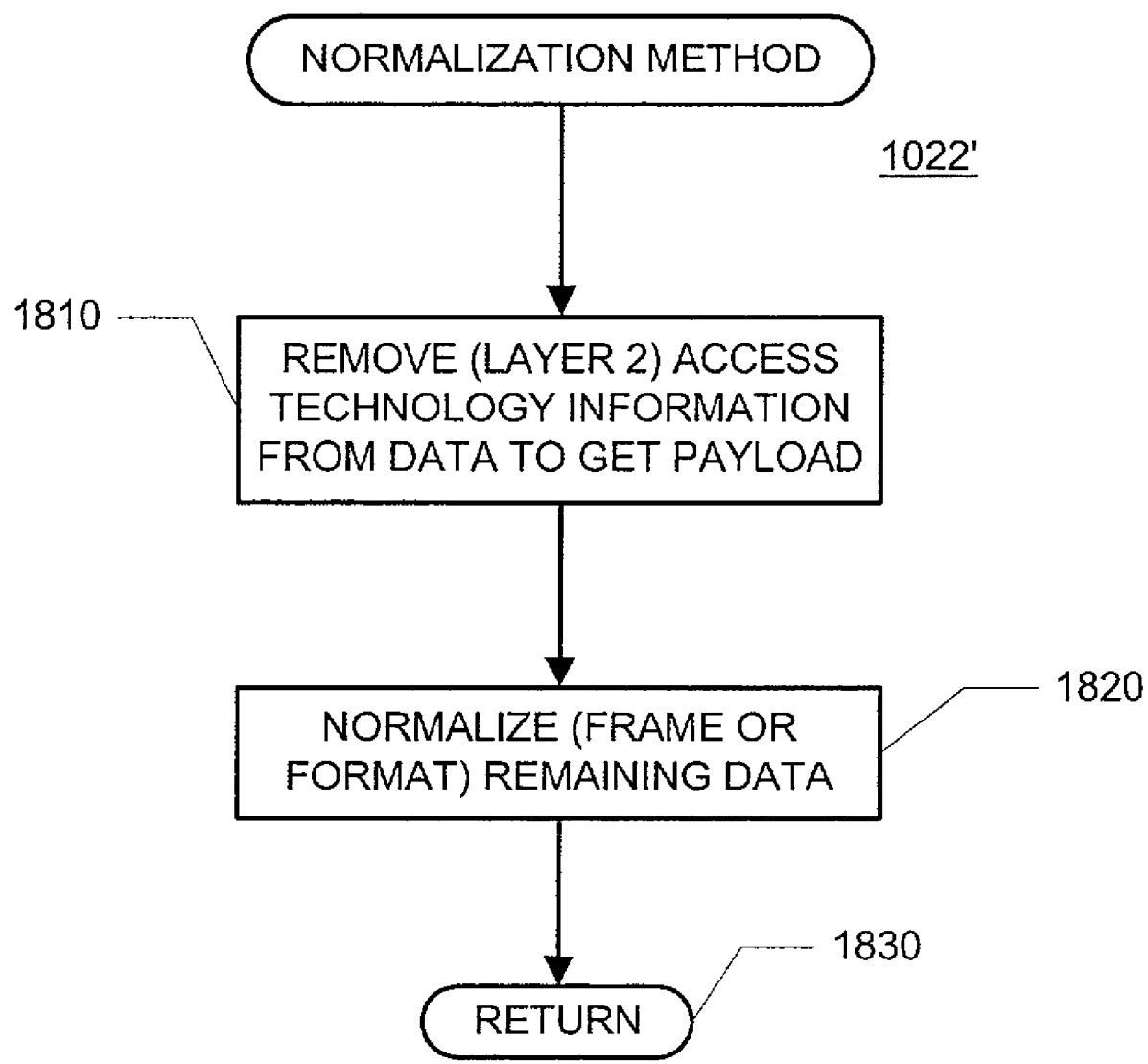
FIG. 18 is a high-level flow diagram of an exemplary method that may be used to effect a data normalizing process in an exemplary aggregation unit.

Referring once again to FIG. 16, the data may be normalized (e.g., formatted or framed) (e.g., the normalization process 1022 may be called) as indicated by optional step 1630. FIG. 18 is a high level flow diagram of an exemplary method 1022' that may be used to effect the normalization process 1022. As indicated in step 1810, the (layer 2) access technology information may be removed from the data—it is no longer needed. Then, as indicated in step 1820, the remaining data is normalized, for example, via framing or packetizing. In this way, the public transport network 940 can use simple, commodity products to forward the data since it does not depend on the technology used by the access facilities 920. As stated in § 4.2.2.1.2 above, since much of the customer traffic may originate from local area networks (LANs), and since Ethernet has been, and is expected to continue to be, the most popular protocol for LANs, the "normalized" frame may correspond to an Ethernet frame.

Figure 19:
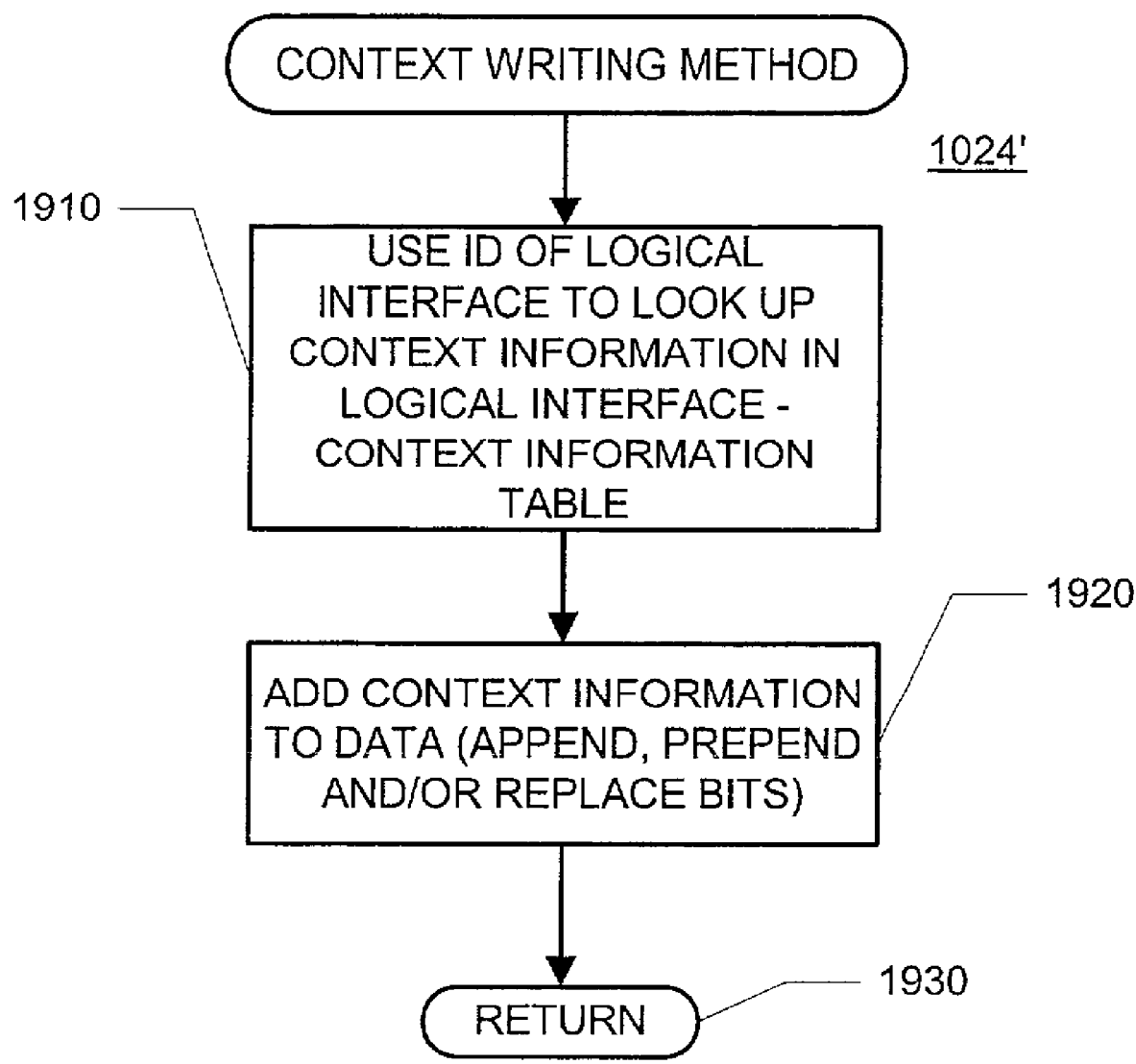
FIG. 19 is a high-level flow diagram of an exemplary method that may be used to effect a context writing process in an exemplary aggregation unit.

Referring once again to FIG. 16, context information may be added to the data (e.g., the context writing process 1024 may be called) as indicated by step 1640. FIG. 19 is a high level flow diagram of an exemplary method 1024' that may be used to effect the context writing process 1024. As indicated in step 1910, the identity of the logical interface 1014 that received the data may be used to look up context information in a logical interface ID-context information association table 1026. This table 1026 is populated during a configuration of the edge device 930'. The entity that administers and manages the public transport network 940 may control these associations. Referring to FIG. 13, an exemplary logical interface ID-context information association table 1026' may include a number of entries 1310, each of the entries including a logical interface identification 1312 and context information 1314 associated with the logical interface (e.g., during a configuration). Referring, once again, to FIG. 19, as indicated in step 1920, the context information is appended and/or prepended to the data, and/or the context information replaces bits (e.g., bits that may have been removed by the normalization process 1022) of the data. An exemplary design for context information is described below. First, however, referring back to FIG. 16, the data is forwarded to an access router 934. For example, data from logical interfaces 1014 may be aggregated to define a logical trunk(s) on a high bandwidth link(s) to an access router 934. The aggregation unit management method 1016' is then left via RETURN node 1690.

As introduced in § 4.2.1.2 above, after the data has traversed the public transport network 940, it must get from the edge of the transport network 940 to the customer device to which it was addressed. To this end, the context information may include (i) information to identify, uniquely, a customer, and (ii) information to identify, uniquely, an ingress logical interface. Further, as introduced in § 4.2.1.3 above, the present invention may function to support various service level and service type agreements with its customers. To this end, the context information may further include (iii) information to identify a service level and/or a service type.

Figure 20:
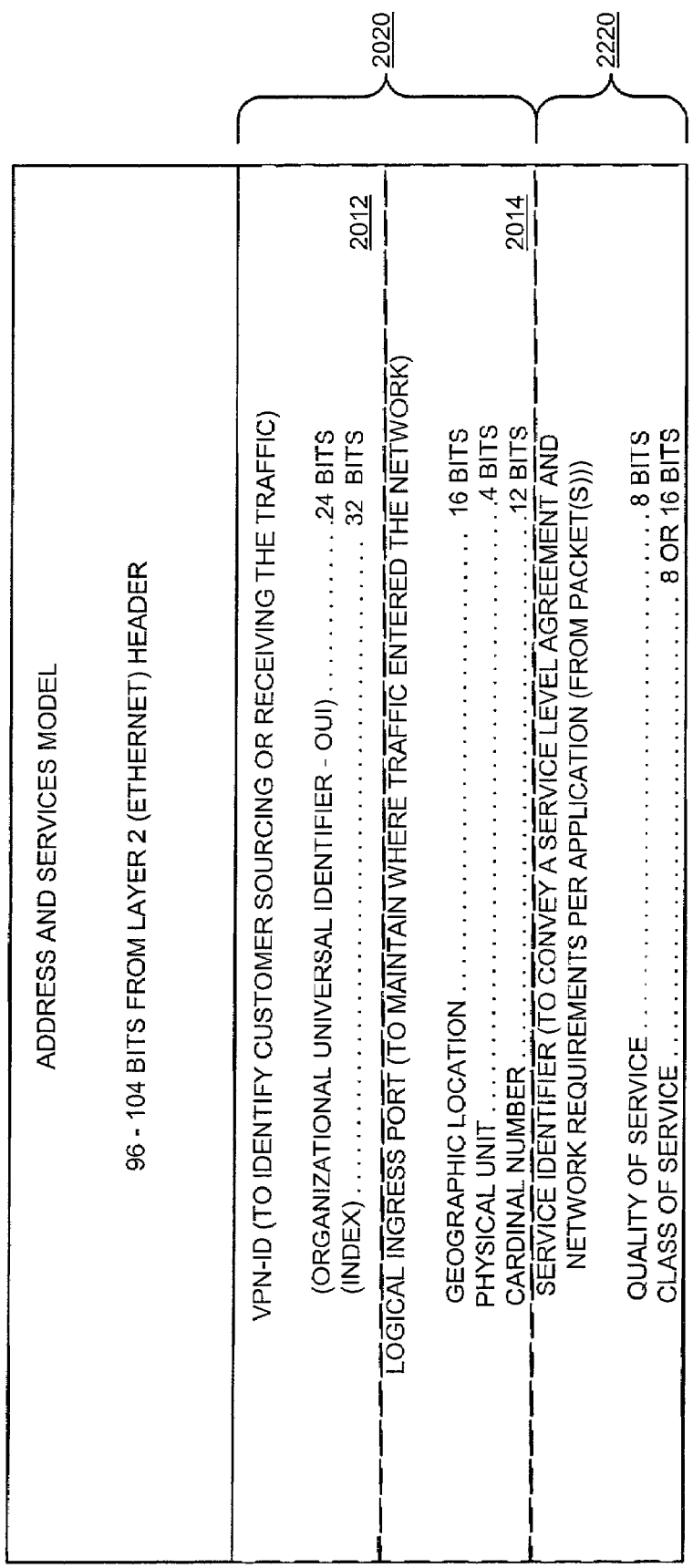
FIG. 20 illustrates an exemplary data structure specification of a unique bit string (also referred to as context information) that may be used in the present invention and that may be administered in accordance with a network-wide plan.

Referring to FIG. 20, the information to identify, uniquely, a customer may include a 24-bit organizational universal identifier (or "OUI") for the customer (or "VPN-OUI"), which may identify 16,777,216 customers, and a 32-bit VPN identifier (or VPN-Index), which may identify 4,294,967,296 VPNs per VPN-OUI as indicated by label 2012. The VPN-OUI can be thought of as an autonomous system identifier, is unique throughout all transport networks, and can be assigned to many logical ports. The VPN-Index defines a group serviced by a VPN-OUI, is unique within the domain of a given VPN-OUI, and can be assigned to many logical ports.

The information to identify, uniquely, an ingress logical interface 1014 may include a 32-bit logical interface identifier (or address), which may identify 4,294,967,296 logical interfaces as indicated by label 2014. The 32-bit logical interface identifier (or address) may comprise 16 bits that define one of 65,536 geographic locations, 4 bits that identify one of sixteen (16) physical units to which the logical interface is associated, and 12 bits that assign one of 4096 cardinal numbers to the logical interface within its physical unit. Naturally, the bits of the logical interface identifier may be provisioned based on ingress points, or expected future ingress points, to the public transport network 940. A logical ingress interface ID will be unique with the domain of a given client (e.g., either VPN-OUI, or VPN-OUI and VPN-Index), and serves to distinguish traffic with the same client (e.g., either VPN-OUI, or VPN-OUI and VPN-Index).

The customer identification information 2012 and the ingress logical interface identification information 2014 may be referred to collectively, as "customer addressing information". Since the customer addressing information 2010 does not depend on the contents of a received data (e.g., packet(s)), but rather only on the logical interface, this part 2010 of the context information can be thought of as a data (or packet)-independent part.

To reiterate, the present invention may provide a mechanism to support various levels of service. In the example disclosed, two kinds of service levels are provided: i) quality of service; and ii) class of service. Quality of service (or "QoS") defines the network requirements necessary to satisfy certain performance requirements associated with an application, for example voice over IP. Quality of service may be derived from layer 3 and/or 4 information in a received packet(s) and can therefore be thought of as a data (or packet)-dependent part of the context information. Class of service (or "CoS") defines the priority that a customer's IP traffic has within the public transport network 940. Class of service levels may be customer-selected and can be thought of as a service bundle or service level/type agreement (which may be ordered and, optionally, modified by the customer). Since class of service does not depend on information in received data, it can be thought of as a data (or packet)-independent part of the context information. Classes of service may include "optimal", "preferred", or "minimal" performance, and may be applied per customer and among application flows of a given customer.

Referring to FIG. 20, an exemplary set of QoS levels may include 256 levels, each of which corresponds to a type of (e.g., IP) application. Upon receipt of customer traffic, the aggregation unit may determine an 8-bit QoS type by examining the layer 3 protocol field and/or the layer 4 port field. Since CoS may be customer-selected, it may be part of the customer information set associated with a logical interface. The CoS for a logical port may use an 8-bit or 16-bit designation, which may serve to distinguish up to 256 or 65,536 possible CoS levels, respectively. The QoS and CoS information may be referred to, collectively, as a service identifier 2020. Thus, prioritization may take place among a customer's own traffic, and among all network traffic. Customers can modify their service levels (e.g., via a Web interface).

Thus, the context information can provide a lightweight, stateless signaling mechanism that describes the origin of data, a network (e.g., VPRN) instance, an application class of the flow, and network resources to be allocated.

Referring back to FIG. 16, the foregoing described exemplary processing of data received from a customer device 910. Referring back to conditional branch point 1610, if the data is instead received from the network, the method 1016 has to forward the data to the destination customer device 910. In this regard, referring to conditional branch point 1660, it is determined whether or not a customer device address, associated with a given logical interface 1014, is available (e.g., at the logical interface 1014 or within the address resolution table 1020). (As will be described in § 4.3.3 below, the access router associates the data with the correct logical interface 1014 using an effective address determination process 1056.) If not, the address of the customer device 910 is resolved (e.g., an ARP process is called) as indicated by step 1665. More specifically, a request may be broadcast by the logical interface 1014 and the associated customer device 910 may respond (along with any other customer devices sharing the physical port 1010 with which the logical interface 1014 is associated). The (layer 2 and layer 3) address(es) of the customer device(s) 910 is included in its response. The method 1016' then branches back to conditional branch point 1660.

Figure 21:
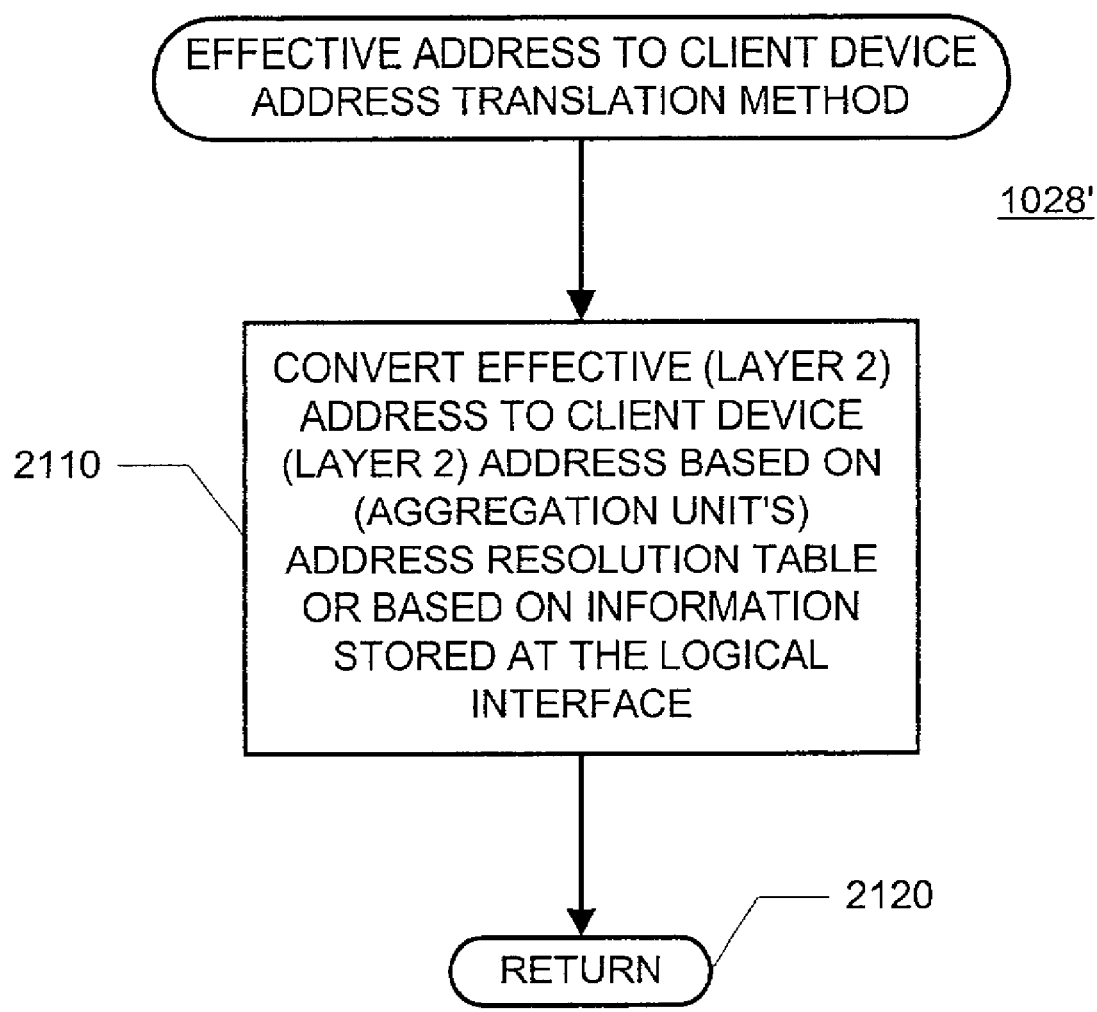
FIG. 21 is a high-level flow diagram of an exemplary method that may be used to effect an effective address to client device address translation process in an exemplary aggregation unit.

Referring, once again, to conditional branch point 1660, if the customer device 910 address (associated with the logical interface 1014) is available, the effective (layer 2) destination address is changed to the (layer 2) address of the client device 910 (e.g., an effective address to client device address translation process 1028 is called) as indicated by step 1670. FIG. 21 is a high level flow diagram of an exemplary method 1028' that may be used to effect the effective address to client device address translation process 1028. As indicated in step 2110, the effective (layer 2) address is converted to the client device 910 (layer 2) address based on the address resolution table 1020 (or based on information stored at the logical interface 1014). The data is then forwarded to the client device 910 as indicated by step 1680, before the method 1016' is left via RETURN node 1690.

Although the processes were described with reference to the aggregation unit 932' as a whole, all processes (except egress queuing) are preferably distributed and performed per logical interface 1014.

Figure 11:
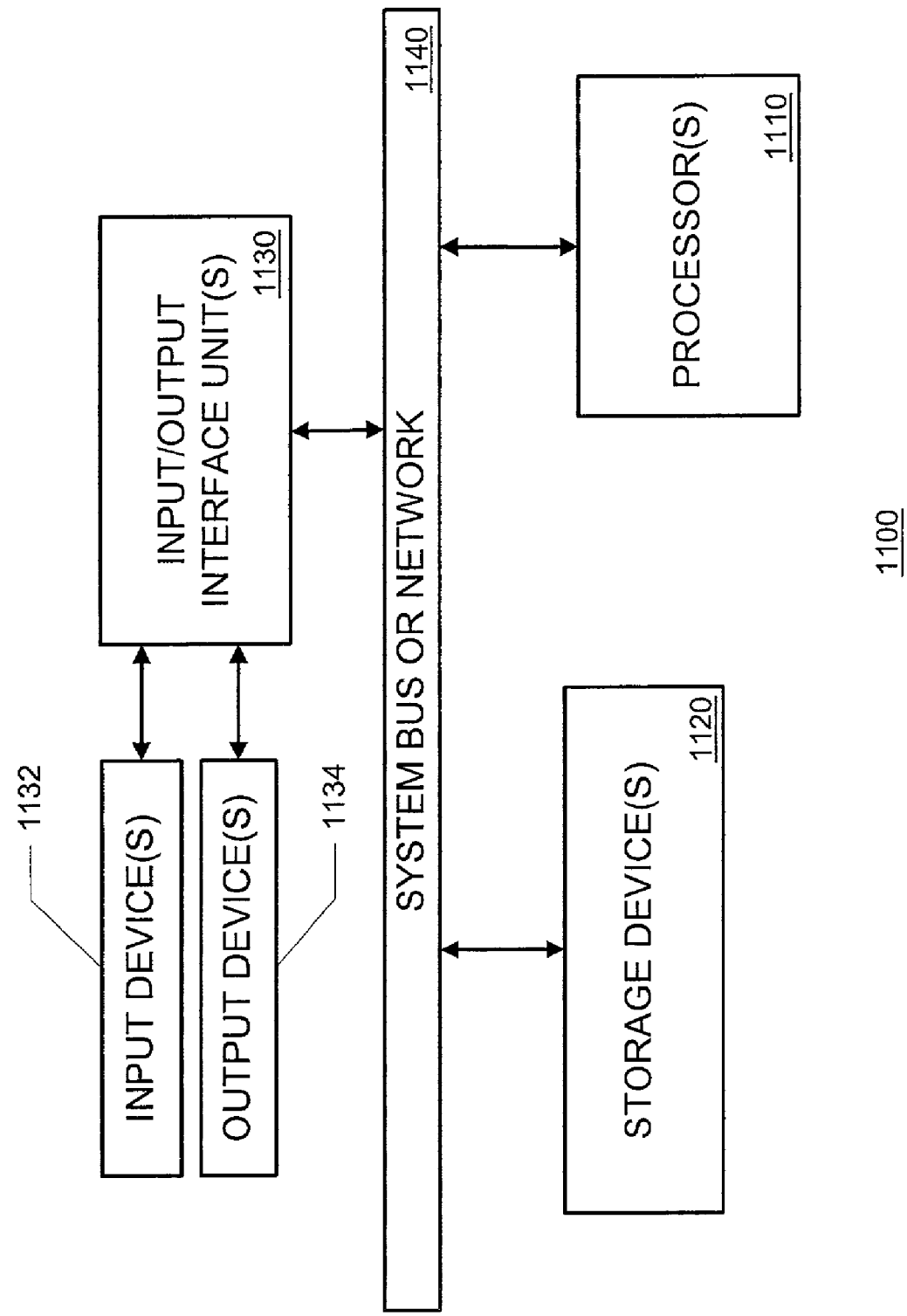
FIG. 11 is a high-level block diagram of a machine that may be used to effect various processes of the present invention.

FIG. 11 is high-level block diagram of a machine 1100 that may effect one or more of the processes, described above, that may be performed by an aggregation unit 932'. The machine 1100 basically includes a processor(s) 1110, an input/output interface unit(s) 1130, a storage device(s) 1120, and a system bus(es) and/or a network(s) 1140 for facilitating the communication of information among the coupled elements. An input device(s) 1132 and an output device(s) 1134 may be coupled with the input/output interface(s) 1130.

The processor(s) (such as a microprocessor(s), an ASIC(s), etc.) 1110 may execute machine executable instructions. Such machine executable instructions (as well as operands and table entries) may be stored on the storage device(s) 1120 and/or received via an input device 1136 and an input interface unit 1130.

Having described an exemplary aggregation unit 932', an exemplary access router 934' is now described in § 4.3.3 below.

§ 4.3.3 Access Router

FIG. 10 illustrates an exemplary edge device 930' that may be used in the environment of FIG. 9. As shown, the exemplary edge device 930' may include an exemplary access router 934'. The exemplary access router 934' may include customer-facing ports 1030 having links to aggregation unit(s) 932, network-facing ports 1048 having links to components or nodes of the public transport network 940 (e.g., core routers 942), and ports 1052 having links to components of an out-of-band network 950.

Figure 22:
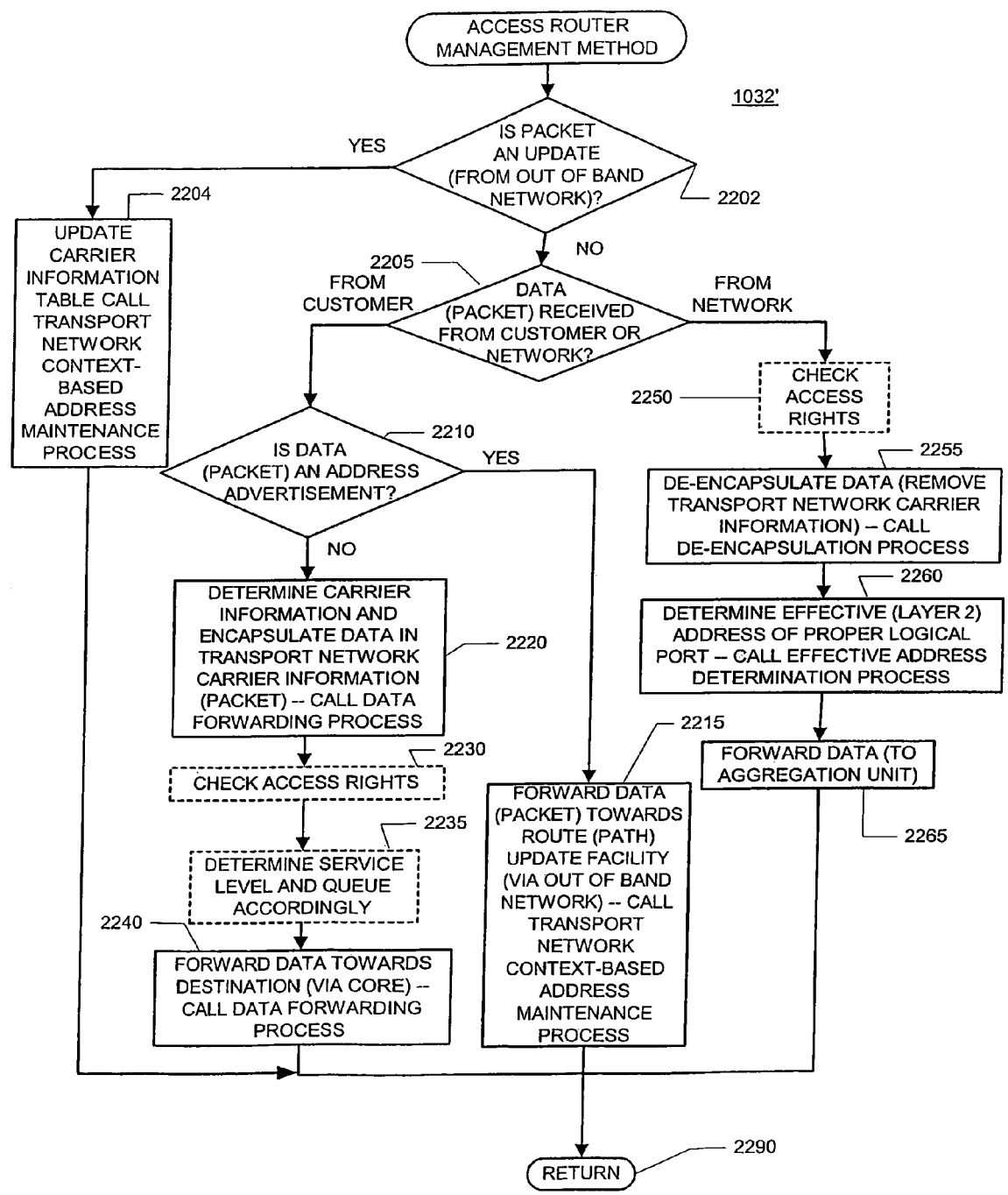
FIG. 22 is a high-level flow diagram of an exemplary method that may be used to manage various processes of an exemplary access router.

The various processes of the access router 934' may be managed by an access router management process 1032. FIG. 22 is a high level flow diagram of an exemplary method 1032' that may be used to effect that process 1032. First, as indicated by conditional branch point 2202, it is determined whether the data (packet) is an update (received from the out-of-band network). If so, the carrier information table 1036 is updated (e.g., the transport network context-based address maintenance process 1050 is called) as indicated in step 2204, before the method 1032' is left via RETURN node 2290. Referring back to conditional branch point 2202, if the data (packet) is not an update, then the method proceeds to decision branch point 2205.

At decision branch point 2205, it is determined whether or not the data (packet) is received from the public transport network 940 (on a network-facing port 1048) or from a customer device 910 (on a customer-facing port 1030) (e.g., via the aggregation unit 932). If the data (packet) is received from a customer device 910, at decision branch point 2210, it is determined whether or not the data (packet) is an address advertisement. If so, the data (packet) is forwarded towards the edge information update facility 960 (e.g., via the out-of-band network 950). This may be done by a call to the transport network context-based address maintenance process 1050.

Figure 23:
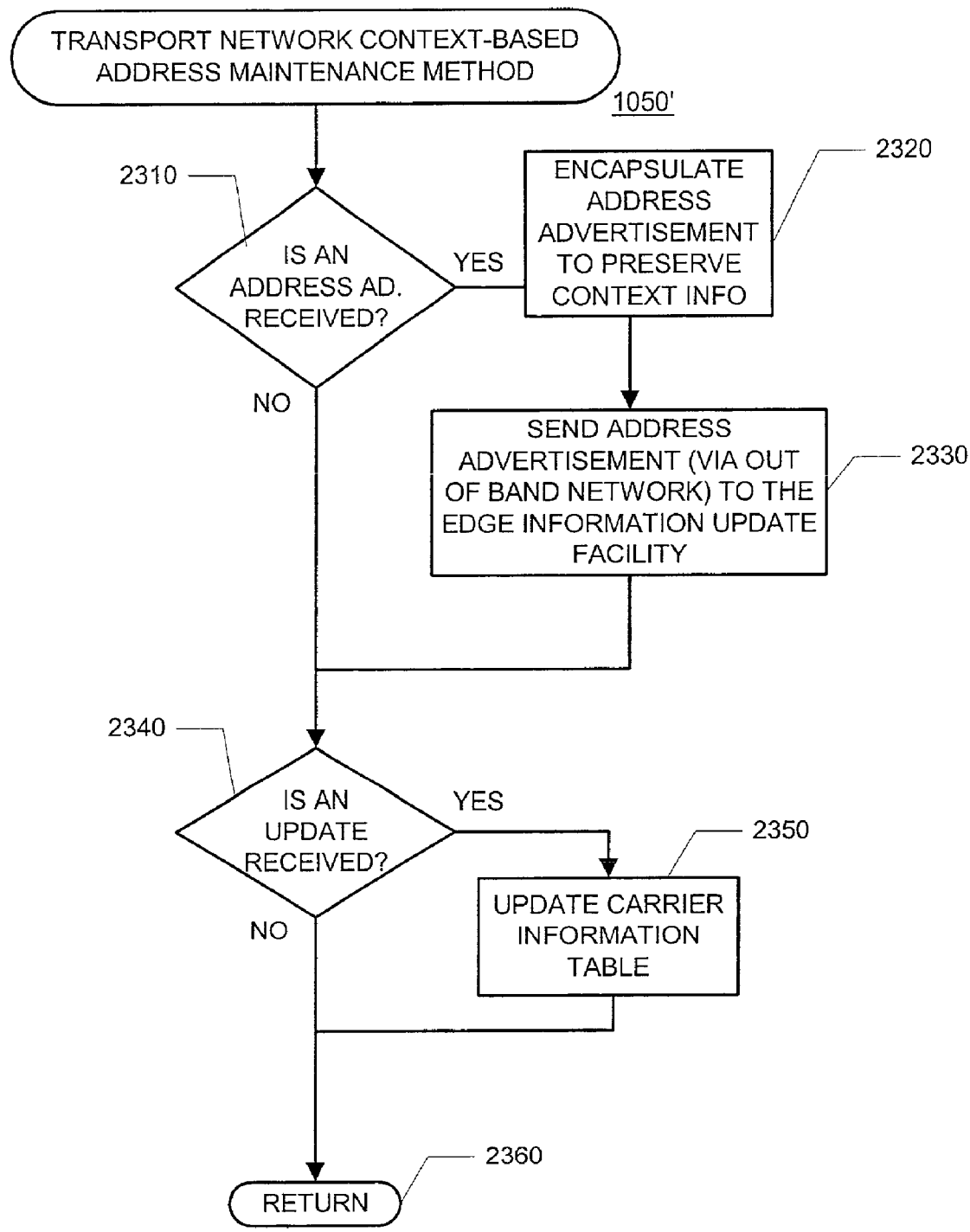
FIG. 23 is a high-level flow diagram of an exemplary method that may be used to effect a transport network context-based address maintenance process in an exemplary access router.

FIG. 23 is a high level flow diagram of an exemplary method 1050' that may be used to perform the transport network context-based address maintenance process 1050. As shown in conditional branch point 2310, if an address advertisement is received, the access router 934' may encapsulate the address advertisement (to preserve the added context information) as indicated by step 2320, and the encapsulated address advertisement may be sent, via an out-of-band network 950, to the edge information update facility 960. As shown in conditional branch point 2340, if an update is received (e.g., from the edge information update facility 960 via the out-of-band network 950), then, as shown in step 2350, the carrier information table 1036 is updated to reflect the new route (or path). FIG. 14 illustrates an exemplary carrier information table 1036'. As shown, the table 1036' may include a number of entries 1410, each of the entries including at least a part of the context information (e.g., a VPN-Index and/or VPN-OUI) and a (layer 3) destination address 1412, and an associated egress access router (layer 3) address 1414.

Figure 24:
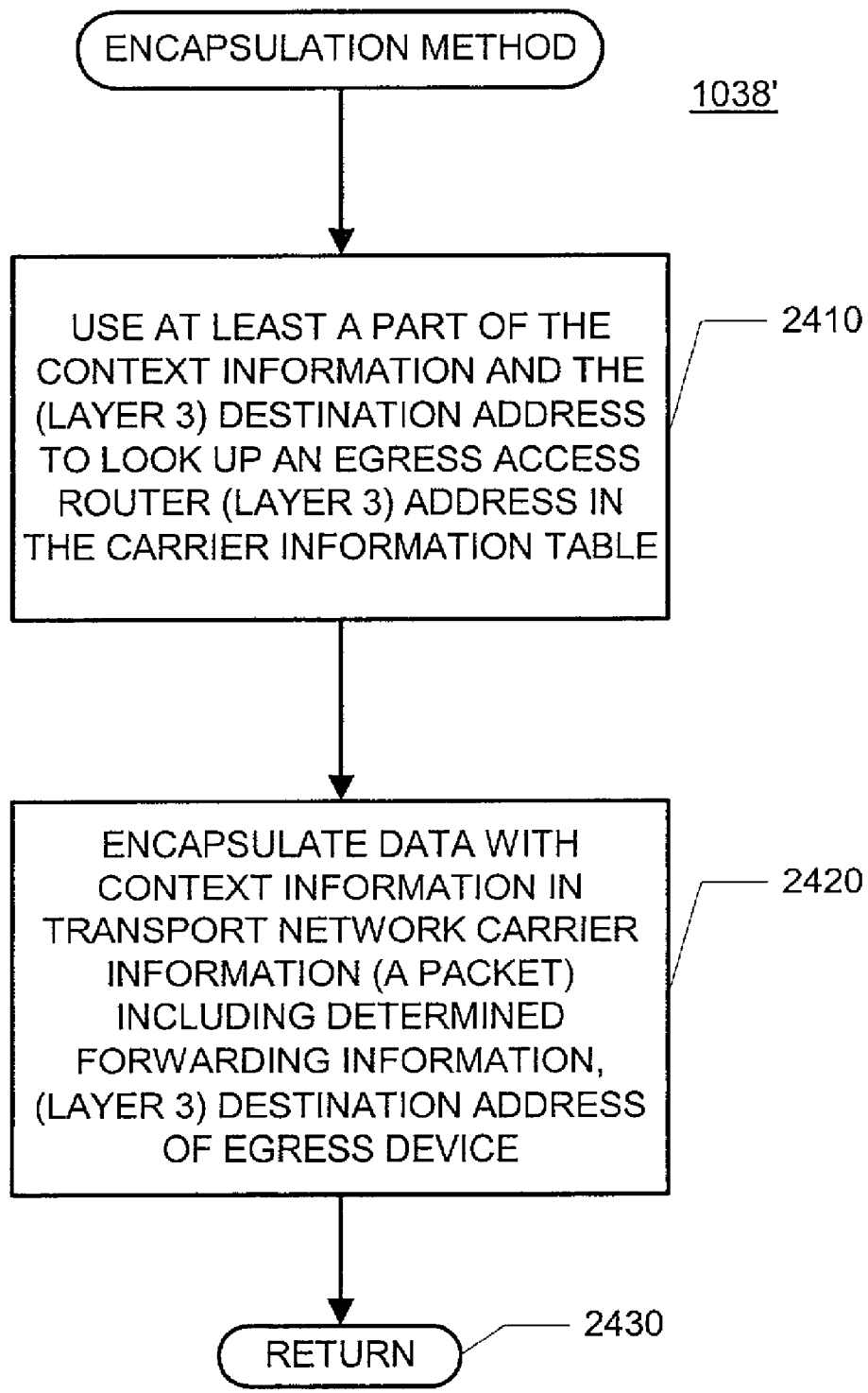
FIG. 24 is a high-level flow diagram of an exemplary method that may be used to effect an encapsulation process in an exemplary access router.

Referring back to FIG. 22, at decision branch point 2210, if it is determined that the data (packet) is not an address advertisement, then carrier information is determined and the data is encapsulated in transport network carrier information (e.g., an encapsulation process 1038 is called) as indicated by step 2220. FIG. 24 is a high level flow diagram of an exemplary method 1038' that may be used to effect the encapsulation process 1038. As shown in step 2410, at least a part of the context-information and the (layer 3) destination address are used to look up an egress access router (layer 3) address in the carrier information table. Then, as shown in step 2420, the data (with the added context information) is encapsulated in a transport network carrier. The transport network carrier may include the (layer 3) destination address information of an egress edge device 930 and service level information (e.g., based on QoS and CoS values). See FIG. 14. The method 1038' is then left via RETURN node 2430.

Referring back to FIG. 22, access rights may be checked as shown in optional step 2230. More specifically, an access control process 1044 may use at least a part of the context information, in conjunction with an access control list 1046, to determine whether or not the data is permitted to go where it wants, at the rate it wants, and/or with the service type it wants. Access control may also be applied based on the particular application. If access is denied, the data (packet) is not sent and may be sent to a security port for monitoring. Exemplary access control processes are described in U.S. patent application Ser. No. 09/652,750, entitled "METHODS, APPARATUS AND DATA STRUCTURES FOR SEGMENTING CUSTOMERS USING AT LEAST A PORTION OF A LAYER 2 ADDRESS HEADER OR BITS IN THE PLACE OF A LAYER 2 ADDRESS HEADER", by Robert T. Baum and Eric A. Voit filed on Aug. 31, 2000.

As shown in optional step 2235, a service level may be determined and the data may be queued accordingly. More specifically, optional processes 1040 and 1042 may function to examine any bit(s) of the context information and/or any bit(s) of layer 2, 3, and/or 4 addresses that are relevant to service level (Recall, e.g., part 2020 of FIG. 20.). (Actually, the quality of service part of the context information may have already accounted for layer 3 and/or layer 4 information in the packet(s). If so, only those bits of the context information relevant to service level need be examined.) If the bit(s) indicate a particular service level, the packet may be written to a particular queue associated with the level of priority appropriate for that service level. Exemplary service level processes are described in U.S. patent application Ser. No. 09/652,750, entitled "METHODS, APPARATUS AND DATA STRUCTURES FOR SEGMENTING CUSTOMERS USING AT LEAST A PORTION OF A LAYER 2 ADDRESS HEADER OR BITS IN THE PLACE OF A LAYER 2 ADDRESS HEADER", by Robert T. Baum and Eric A. Voit filed on Aug. 31, 2000. The service level may be based on the QoS and CoS values of the context information, and may be a standards compatible (e.g., DiffServ) field to be provided with the carrier information.

Figure 25:
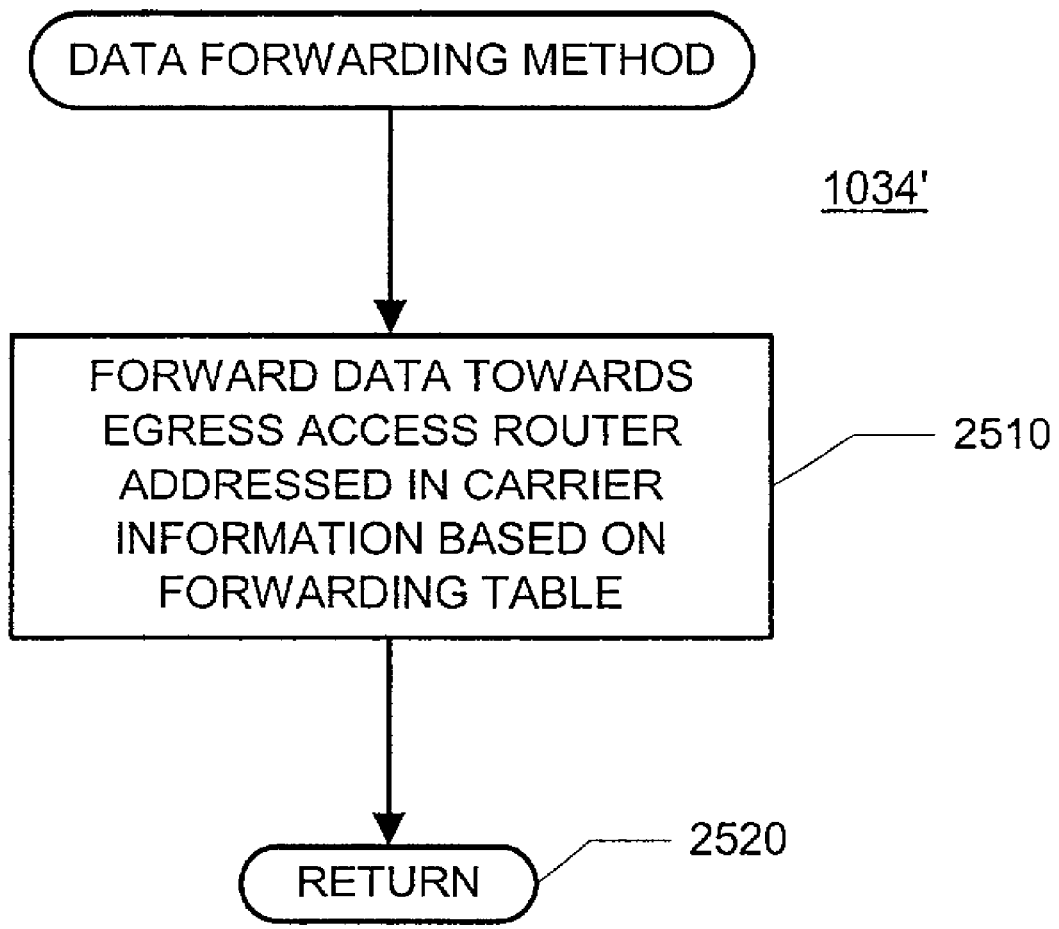
FIG. 25 is a high-level flow diagram of an exemplary method that may be used to effect a data forwarding process in an exemplary access router.

Referring back to FIG. 22, the encapsulated data is then forwarded towards its destination as indicated by step 2240 (e.g., via a node in the public transport network 940). Within the public transport network 940, nodes, such as core routers 942 for example, may forward the encapsulated data, based on information in the carrier. The encapsulated data will ultimately arrive at an egress edge of the public transport network 940. The data forwarding process 1034 may be called to effect this step 2240. FIG. 25 is a high-level flow diagram of an exemplary method 1034' that may be used to effect the data forwarding process 1034. As shown in step 2510, the carrier information may be used to look up next-hop information in a forwarding table (not shown) to forward the data towards the egress access router addressed in the carrier.

Referring back to decision branch point 2205, if data (packet) is received from the public transport network 940, the method 1032' branches to optional step 2250. Like optional step 2230, optional step 2250 may be used to check access rights.

Figure 26:
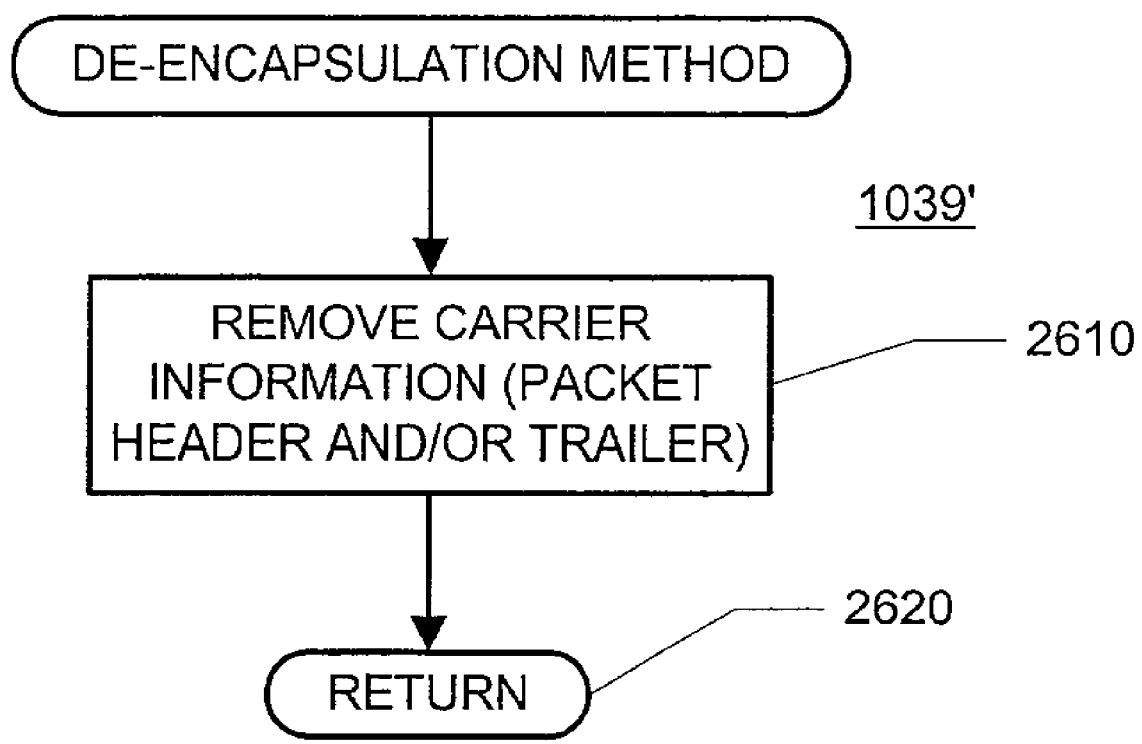
FIG. 26 is a high-level flow diagram of an exemplary method that may be used to effect a de-encapsulation process in an exemplary access router.

As shown in step 2255, the data may be de-encapsulated (e.g., a de-encapsulation process 1039 may be called). This effectively removes the carrier information—such information is no longer needed since the data has already traversed the public transport network 940. FIG. 26 is a high level flow diagram of an exemplary method 1039' for performing this process 1039. As stated simply in step 2610, the carrier information (e.g., header and/or trailer) is removed.

Figure 27:
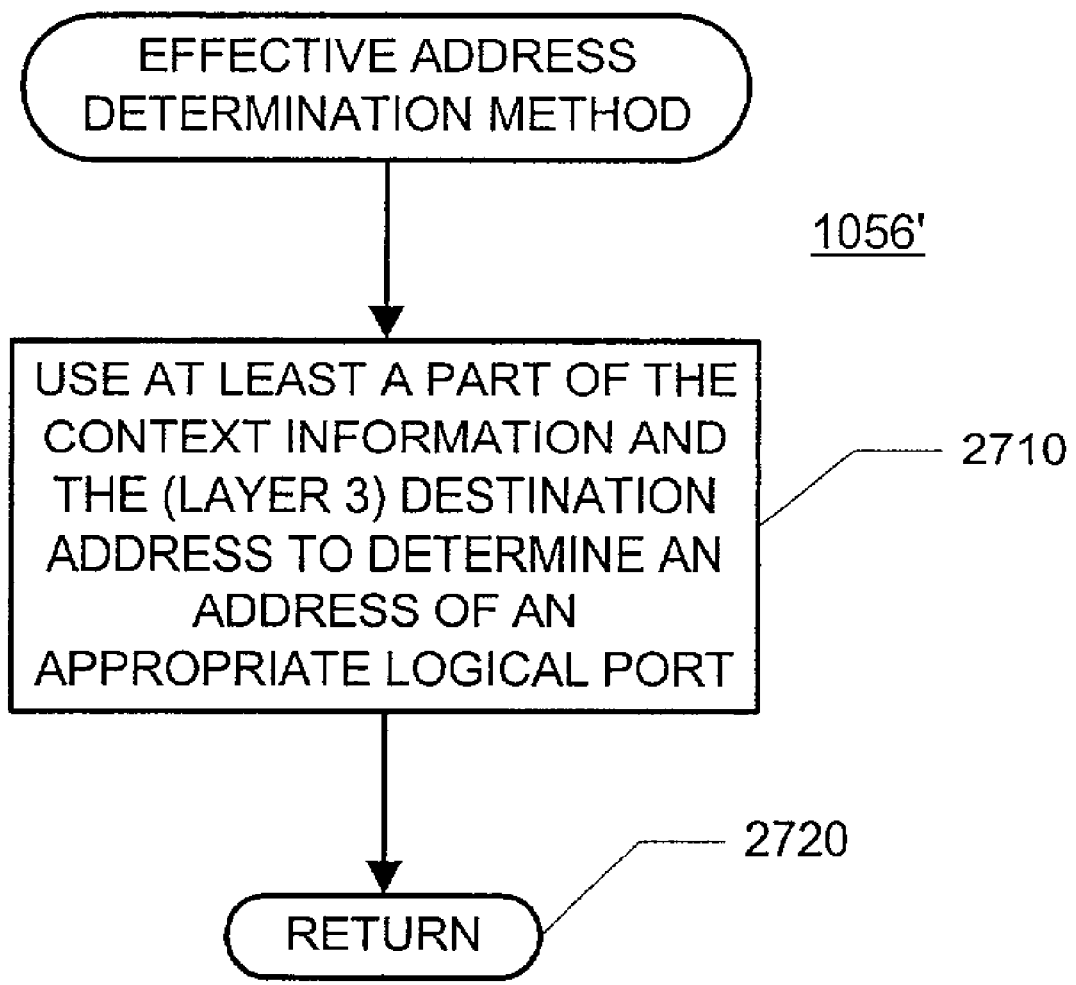
FIG. 27 is a high-level flow diagram of an exemplary method that may be used to effect an effective address determination process in an exemplary access router.

Referring once again to FIG. 22, as shown in step 2260, an effective (layer 2) address of the proper logical interface 1014 is determined (e.g., an effective address determination process 1056 is called). FIG. 27 is a high level flow diagram of an exemplary method 1056' that may be used to effect the effective address determination process 1056. In this exemplary method 1056', at least a part of the context information (e.g., the VPN-OUI and/or VPN-Index) and the (layer 3) destination address is used to lookup an effective address of an appropriate logical interface 1014 in address resolution table 1058. FIG. 15 illustrates an exemplary address resolution table 1058'. As shown, the table 1058 may include a number of entries 1510, each of the entries including at least a part of the context information and a (layer 3) destination address 1512, and an associated effective (layer 2) logical interface 1014 address 1514. The effective logical interface address 1514 may be defined as the 16 least significant bits of the VPN-OUI, prepended to the 32-bit egress logical interface identifier. The address resolution table 1058 may be populated based on updates from the edge information update facility 960, assuming that the customer device 910 has a routed interface (e.g., a router, a PC, etc.). If, on the other hand, the customer device 910 has a non-routed interface (e.g., switch, hub, etc.), the access router 934 may use the aggregation device 932 as a proxy for an ARP request. Referring back to FIG. 22, as shown in step 2265, the data is forwarded to the aggregation unit 932 based on the effective (layer 2) logical interface 1014 address. Recall from § 4.3.2 above that the aggregation unit converts this effective address to the (layer 2) address of the customer device 910 associated with the logical interface 1014.

Referring to FIG. 11, a machine 1100 may also be used to effect one or more of the processes, described above, that may be performed by an access router 934'. The processor(s) 1110 may execute machine executable instructions. Such machine executable instructions may be stored on the storage device(s) 1120 and/or received via an input device 1136 and an input interface unit 1130.

§ 4.3.4 Edge Information Update Facility

Figure 28:
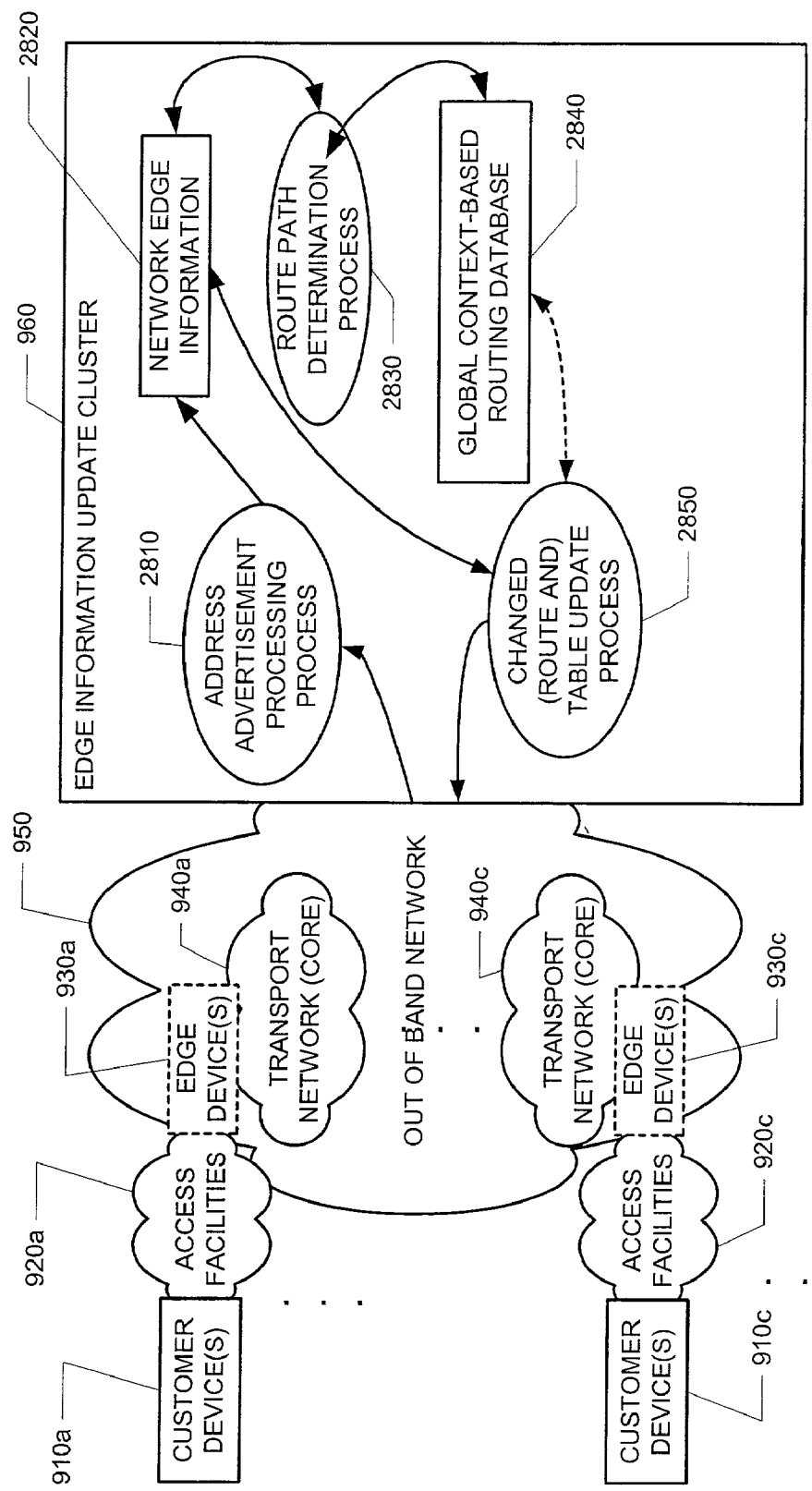
FIG. 28 illustrates an exemplary edge information update facility that may be used in the environment of FIG. 9.

FIG. 28 is a high-level diagram of an exemplary edge information update facility 960'. The present invention may use an out-of-band network 950 (which may use at least some components of the transport network 940) to advertise state changes (outside of the transport network 940) to a centralized facility and to carry updates from the centralized facility to the access nodes (e.g., routers) 934' of the public transport network 940. (State and route signaling within the core of the public transport network 940 may take place in accordance with known protocols.) FIG. 28 illustrates such a centralized facility 960' which can communicate with one or more public transport networks 940 via one or more out-of-band networks 950.

The centralized facility 960' may employ an event-driven, stateless technique for distributing updates about customer interfaces among all of the access routers 934' in the public transport network 940. For example, the RIP—version 2 protocol may be used for such signaling. More specifically, when a customer device 910' is connected with the network, it will advertise (e.g., every minute or so) an address update (e.g., using RIP—version 2). The ingress aggregation device 932' may process the update like any other data. Namely, it may strip the transport (layer 2) information, normalize the data, and add context information, before forwarding the revised data to an ingress access router 934'. The ingress access router 934' will recognize the address advertisement and will encapsulate the update as it does with any other incoming traffic. (Technically, it is not necessary to preserve quality of service or service level information since the update is traveling via an out-of-band network.) However, rather than forwarding the encapsulated and updated data through the public transport network 940, it forwards the encapsulated and updated data to the edge information update facility 960' via the out-of-band network 950.

Still referring to FIG. 28, at the edge information update facility 960', an address advertisement processing process 2810 may use the update to bring update entries stored in a database 2820 of network edge information up to date. A changed table update process 2850 may then be used to batch updated tables based on changed customer address information for distribution, via the out-of-band network 950, to the access routers 934' at the edge of the public transport network 940. Further, a route determination process 2830 may use known protocols to update a global context-based routing database 2840.

Figure 29:
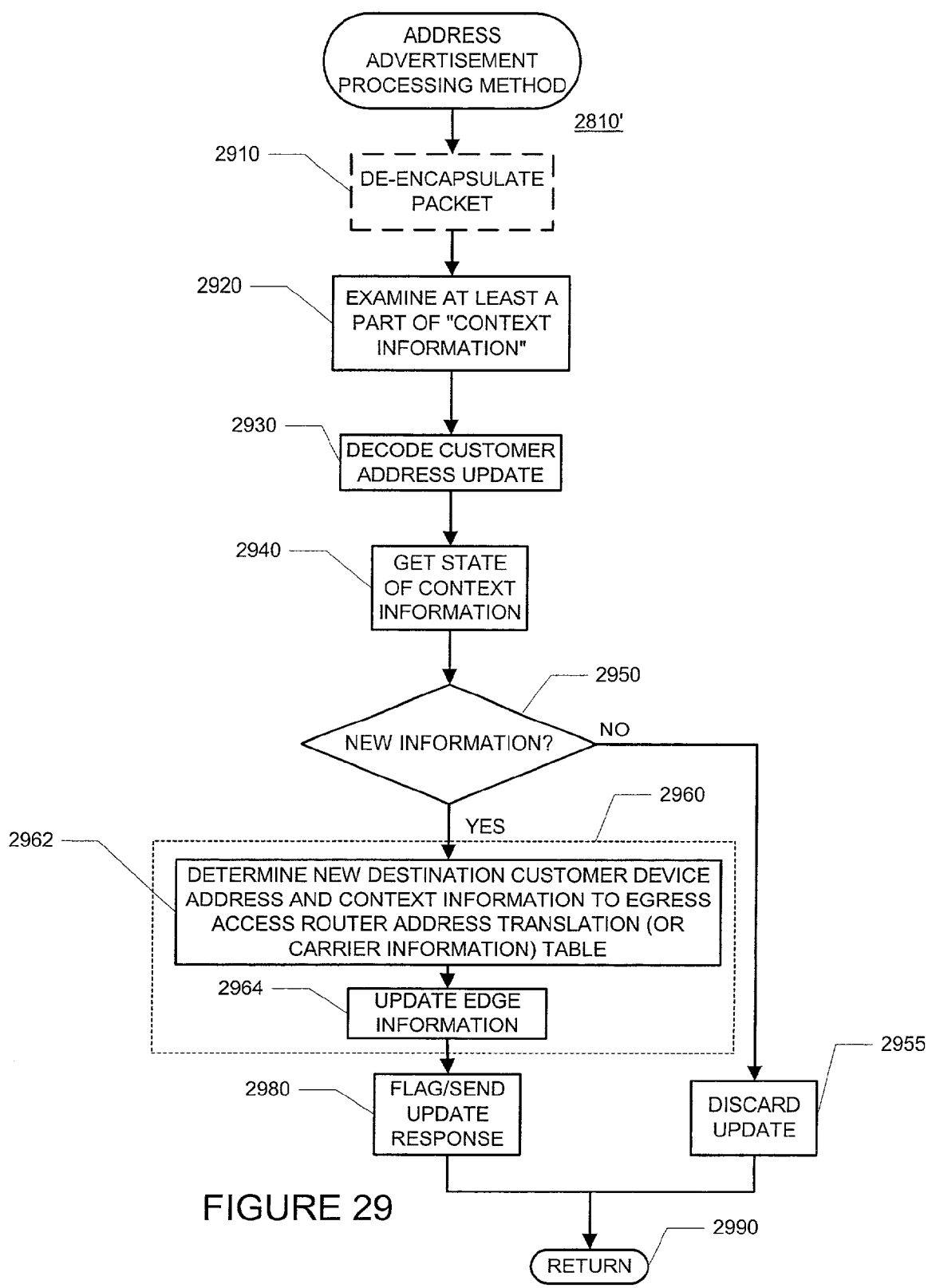
FIG. 29 is a high-level flow diagram of an exemplary method that may be used to effect an address advertisement processing process in an exemplary edge information update facility.

FIG. 29 is a high-level flow diagram of an exemplary method 2810' that may be used to effect the address advertisement processing process 2810. First, in optional step 2910, the received advertisement may be de-encapsulated. That is, the carrier information may be removed. Next, as shown in step 2920, at least a part of the "context information" (e.g., the virtual private network identifier information 2012) may be examined. Then, as indicated by steps 2930 and 2940, the address update may be decoded and the state (e.g., old or new) of the context information may be examined. Next, it is determined whether or not the advertisement carries new information, as indicated by conditional branch point 2950. If the advertisement represents new information, as indicated by steps 2962 and 2964, the method 2810' updates the edge information 2820 with the new customer device address to egress access router association. Then, as indicated by step 2980, the update may be flagged to indicate that the update was performed, before the method 2810' is left via RETURN node 2990. Referring back to conditional branch point 2950, if the advertisement does not carry new information, the advertised update is discarded, as indicated by step 2955, before the method 2810' is left via RETURN node 2990. In an alternative embodiment, old advertisements may be discarded before they reach the edge information update cluster 960, (e.g., at the access router 934).

Figure 30:
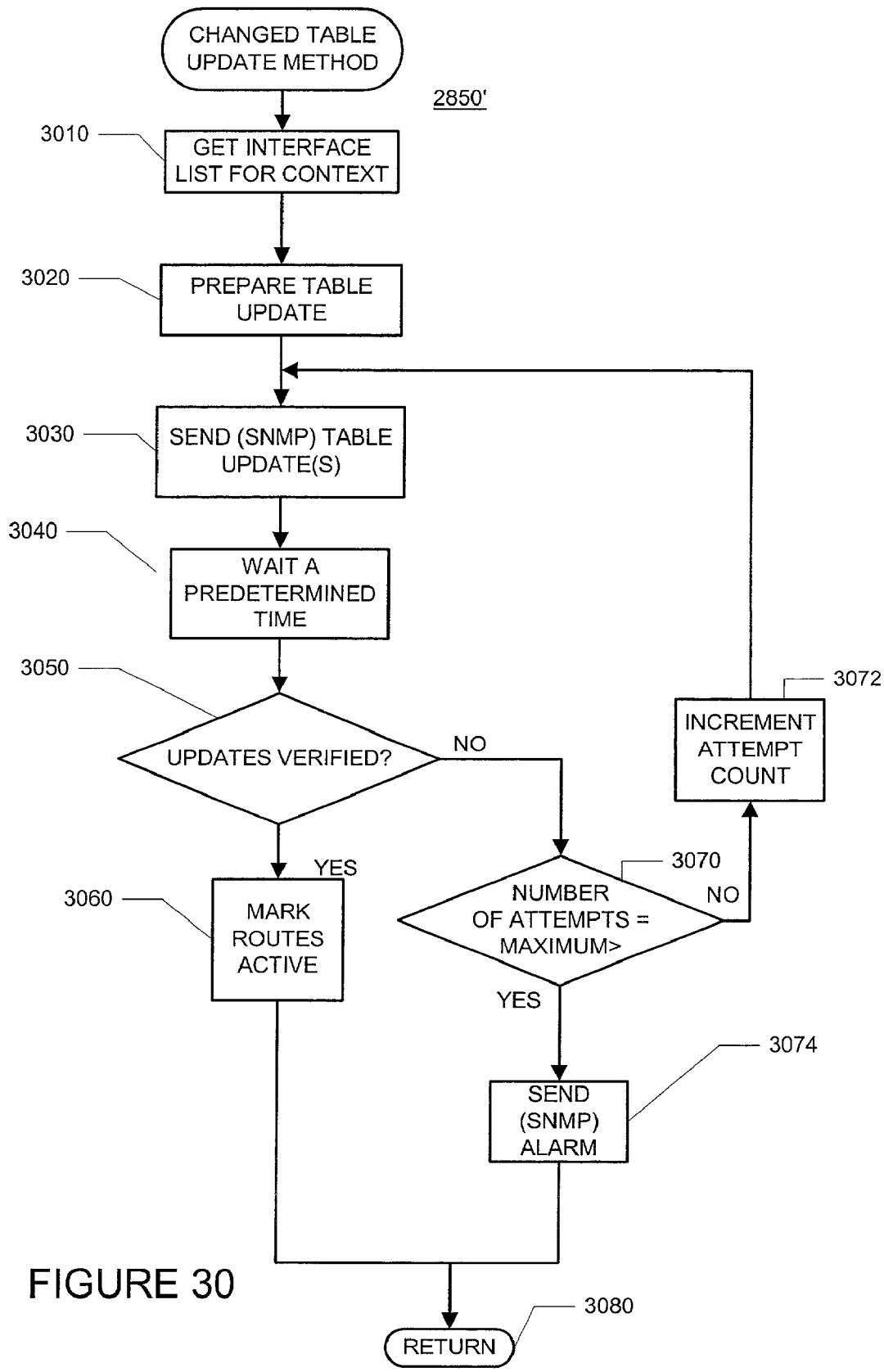
FIG. 30 is a high-level flow diagram of an exemplary method that may be used to effect a carrier information update process in an exemplary edge information update facility.

FIG. 30 is a high-level flow diagram of an exemplary method 2850' that may be used to effect the changed table update process 2850. First, as shown in step 3010, an interface list for the context is obtained. For example, only those access routers having logical interfaces with the same VPN-Index, VPN-OUI information as the advertisement need to be updated. Then, a (batch) table update is prepared as indicated by step 3020. Then, the update(s) are sent, via the out-of-band network, to the access routers 934', as indicated by step 3030. These updates may use the simple network management protocol (or "SNMP") for example. The remaining steps may be used to verify the receipt of the updates. More specifically, as indicated by step 3040 and conditional branch point 3050, after a predetermined period of time, it is determined whether or not the updates were verified (e.g., by the access routers using SNMP). If so, the information is marked as active in the database 2820, as indicated by step 3060, before the method 2850' is left via RETURN node 3080. Otherwise, it is determined whether or not a maximum number of update attempts has been exceeded, as indicated by conditional branch point 3070. If not, an update attempt count 3072 is incremented and the method 2850' branches back to step 3030. If, on the other hand, it has been determined that the maximum number of update attempts has been exceeded, an alarm message may be sent as indicated by step 3074, before the method 2850' is left via RETURN node 3080.

Figure 31:
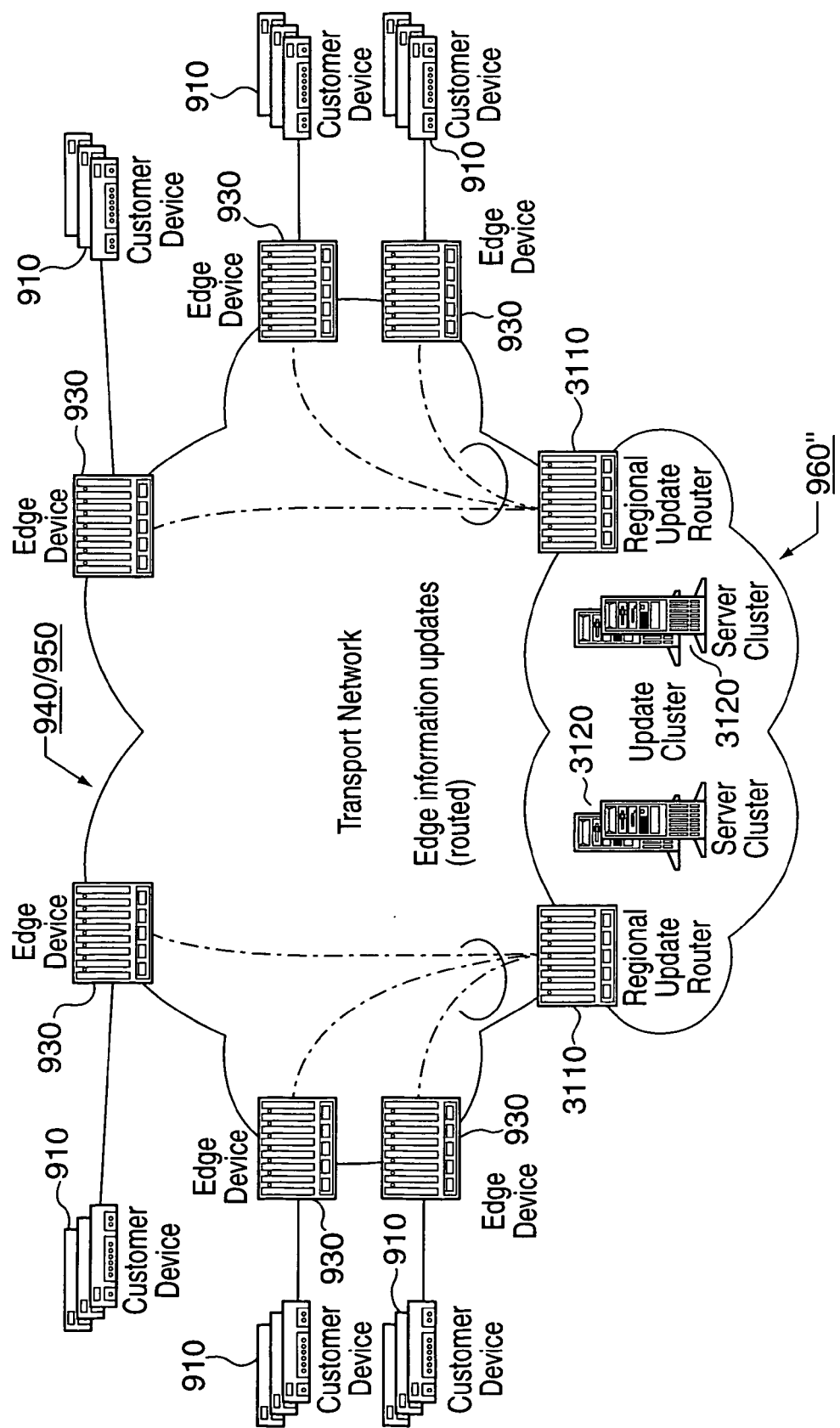
FIG. 31 is a high-level block diagram of an exemplary architecture of an edge information update facility.

FIG. 31 is a high-level block diagram of an exemplary architecture 960" that may be used as the edge information update facility 960. This exemplary edge information update facility 960" may be an out-of-band network 950 that helps to collect and distribute information about customer devices 910 used to access the transport network 940. The out-of-band network 950 may include at least some of the physical components of the transport network 940, but is logically different in that it may use different routes and a different set of resources than that used by end-to-end payload traffic. The exemplary edge information update facility 960" may include geographically dispersed routers 3110, servers 3120, etc. supporting routing, storage, load balancing, etc. for effecting the address advertisement process 2810, the route path determination process 2830, and the changed table update process, as well as for storing network edge information 2820 and context-based routing information 2840.

The clustered database 3120 may maintain a context-based carrier information table 3200, a context-based address resolution table 3300, and a network edge information table 3400. Referring to FIG. 32, a context-based carrier information table 3200 may include VPN-ID-OUI information (from the context information) as indicated by column 3210, VPN-ID-Index information (from the context information) as indicated by column 3220, client network address information (layer 3 address of customer device sourcing the advertisement) as indicated by column 3230, subnet masks as indicated by column 3240, core (layer 3) destination address information as indicated by column 3250, information regarding an ingress access router as indicated by column 3260, and status (e.g., active, inactive, or update) information as indicated by column 3270. Recall that this information may be used to populate a carrier information table 1036 of the access router 934'.

Referring to FIG. 33, a context-based address resolution table 3300 may include VPN-ID-OUI information as indicated by column 3310, VPN-ID-Index information as indicated by column 3320, network (layer 3) address information as indicated by column 3330, network subnet masks as indicated by column 3340, and an egress logical port (layer 2, e.g., MAC) address information as indicated by column 3350. Recall that this information may be used to populate the address resolution table 1058 of the access router 934'. Such population of the address resolution table 1058 is possible if the customer device 910 has a routed interface. Recall that if, on the other hand, the customer device 910 has a switched interface, the access router 934' may populate the table 1058 by means of an ARP using the aggregation unit 932' as a proxy.

Finally, referring to FIG. 34, a network edge information table 3400 may include an ingress access router address information 3410 (from the layer 3 source address), VPN-OUI information 3420 (from the encapsulated context information), VPN-Index information 3430 (from the encapsulated context information), client device layer 3 address information 3440 (from the encapsulated layer 3 source address), quality of service 3450 and class of service 3460 information (from the encapsulated context information), and logical ingress port information 3470 (from the encapsulated context information). Basically the network edge information 2820' may be used to generate at least a part of the context-based carrier information 3200 and the context-based address resolution table 3300.

Having described an example of processes that may be performed by the present invention, as well as methods, devices and data structures that may be used to effect such processes, exemplary operations of exemplary embodiments of the present invention are now described in § 4.4. below.

§ 4.4 Exemplary Operations

In the following examples, it is assumed that a customer device 910 uses Ethernet framing, it is assumed that the public transport network 940 uses the TCP/IP protocol, it is assumed that context information takes the form of that illustrated in FIG. 20, and it is assumed that RIPv2 is used for route signaling. First, exemplary customer device address advertisement signaling operations are described in § 4.4.1. Then, exemplary data forwarding operations are described in § 4.4.2.

§ 4.4.1 Exemplary Customer Device Address Advertisement Signaling Operations Recall that the address advertisement signaling operations are used to distribute updated context-based carrier information and context-based address resolution information based on customer device address advertisements (e.g., RIPv2). FIG. 40 illustrates a frame 4000 from which the values of tables 32, 33 and 34 can be populated. The frame 4000 may include a RIP packet 4010, (which includes a layer 3 client device source address), context information 4020, and encapsulation information 4030. The context information 4020 may include a VPN-Index field 4022, a QoS field 4024, a VPN-OUI field 4026, a logical ingress port field 4028, and a CoS field 4029. The encapsulation information 4030 may include a layer 3 source (i.e., ingress access router) address field 4032, a layer 3 destination (update facility) address field 4034, and an optional service level field 4036.

§ 4.4.2 Exemplary Data (Packet) Forwarding Operations

Figure 35:
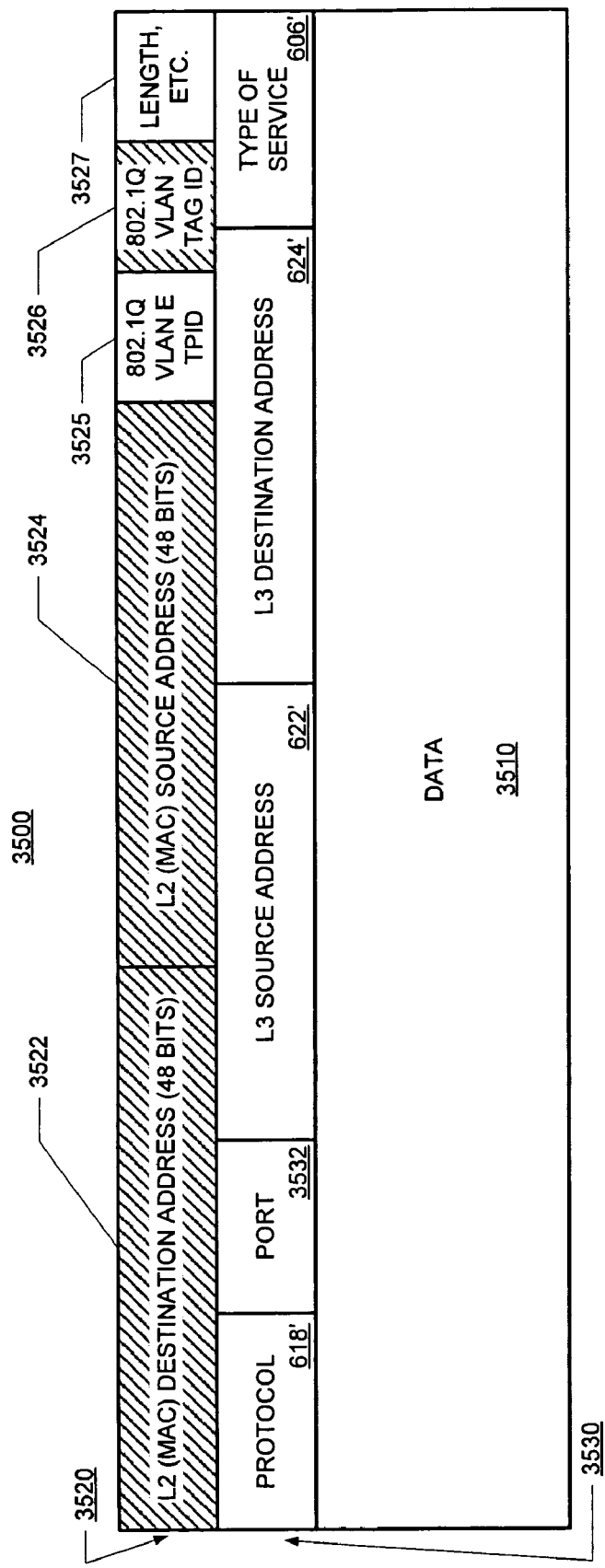
FIG. 35 illustrates an IP-in-Ethernet packet that may be received from a customer device by an edge device of the present invention.

An end-to-end example which illustrates various operations of an exemplary embodiment of the present invention is now described with reference to FIGS. 35 through 39. Referring first to FIG. 35, an IP-in-Ethernet frame 3500 includes data 3510, an IP header 3530, and a Ethernet header 3520. It is important to note that the IP header 3530 includes a layer 3 source address 622' and a layer 3 destination address 624'. These are network layer addresses. However, recall that it cannot be assumed that layer 3 addresses are globally unique (the communications provider cannot regulate layer 3 addresses), particularly in the context of virtual private networks. The Ethernet header 3520 includes 48-bit data link layer (layer 2, or media access control) source and destination addresses 3524 and 3522, respectively.

The access facilities 920 should preserve original layer 2 information. Thus, the access facilities 920 may act as an Ethernet bridge. The access facilities 920 should use circuit-based or channelized technology. If the access facility 920 uses a technology that does not support virtual channels or the like, then, at the aggregation unit 932, the physical interface 1010 should have only one logical interface 1014. For example, if the customer device 910 presents a native Ethernet connection, the access facilities 920 preserves the (information in) the original Ethernet header. If the customer device 910 presents IP over ATM, the access facilities should use a bridged virtual circuit (See RFC 1483.).

At the aggregation unit 932', the snooping process 1018 may associate the layer 2 (e.g., MAC) source address with the logical port 1014 with which the customer device 910 is associated. The normalization method 1022' may be used to remove any (e.g., layer 2) access technology information and the payload may be framed. In this example, the Ethernet frame footprint is used as the frame to which all information is normalized. This is preferred since it is assumed that most customer traffic will originate from an Ethernet LAN.

Figure 36:
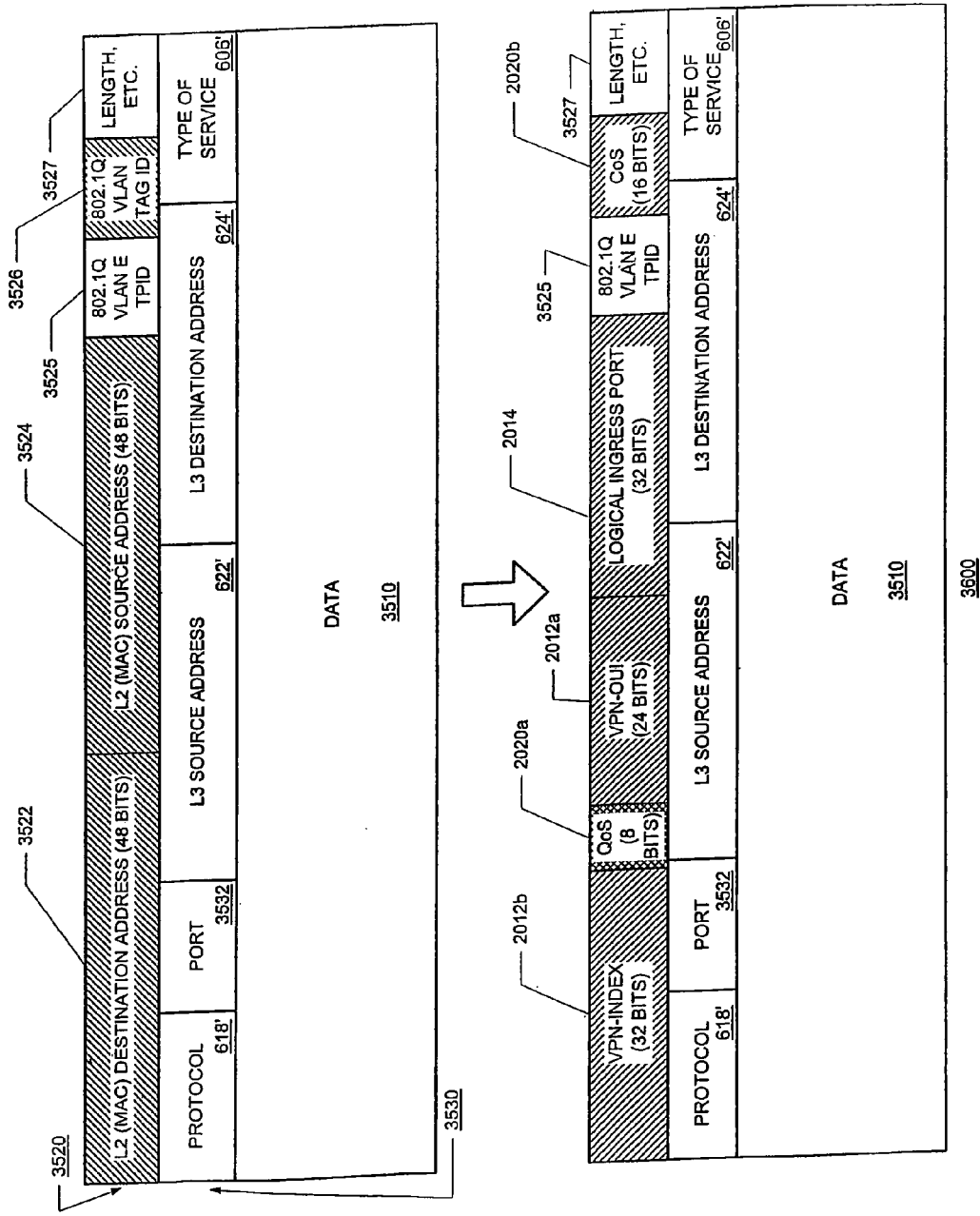
FIG. 36 illustrates an example of writing context information in the IP-in-Ethernet packet of FIG. 35.

Note that once the data 3500 is received at the aggregation unit 932', the layer 2 (MAC) source address information 3524 will no longer be needed. Further note that since the access routers 934' may be set to operate in the promiscuous mode, the destination layer 2 (MAC) destination address information 3522 will no longer be needed. The context information (Recall FIG. 20.) may be placed in these 96-bits of the Ethernet frame, since they are no longer needed. The 802.1Q VLAN TAG ID field 3526 may also be used. For example, as illustrated in FIG. 36, a 32-bit VPN-INDEX value 2012b, an 8-bit quality of service value 2020a, a 24-bit VPN-OUI value 2012a, and a logical ingress port values 2014 may replace values in the layer 2 source and destination address fields 3524 and 2533, respectively. An 8-bit class of service value 2020b may replace a value in the 802.1Q VLAN TAG ID field 3156. These operations may be performed by the context writing process 1024 of the aggregation unit 932'. Maintaining the footprint of the IP-in-Ethernet frame simplifies forwarding by nodes (e.g., routers) of the public transport network 940. Further, since the context information doesn't affect the data field 2510, checksum sensitive protocols (e.g., IPSec) won't generate unintended errors.

The aggregation unit 932', may include 100 10 Mbps full duplex customer-facing ports 1010 per 1 Gbe network-facing port or 10 100 Mbps full duplex ports 1010 per Gbe port. The aggregation unit 932' may use time division multiplexing, space division multiplexing (or channelizing), statistical multiplexing, or another type of multiplexing to aggregate traffic from all of the logical interfaces 1014 on to one or more high bandwidth physical links to an access router 934'. The aggregation unit 1010' may be a line speed, non-blocking, unit. In this case, assuming sufficient bandwidth on the link(s) 1020', 12,000 half-duplex (or 6,000 full-duplex) 10 Mbps customers or 1,200 half-duplex (or 600 full-duplex) 100 Mbps customers could be accommodated by a 120 GBE access router. Alternatively, the aggregation unit 1010' may concentrate traffic. By providing access facilities capable of providing bandwidth that should meet the demands of most foreseeable applications, the present invention will allow service levels provided to the customer to be changed without changing the access facilities. Thus, for example, a customer could request changes in available bandwidth in real time (e.g., via a web interface) that change the configuration of the logical interface with which the customer device is associated.

Figure 37:
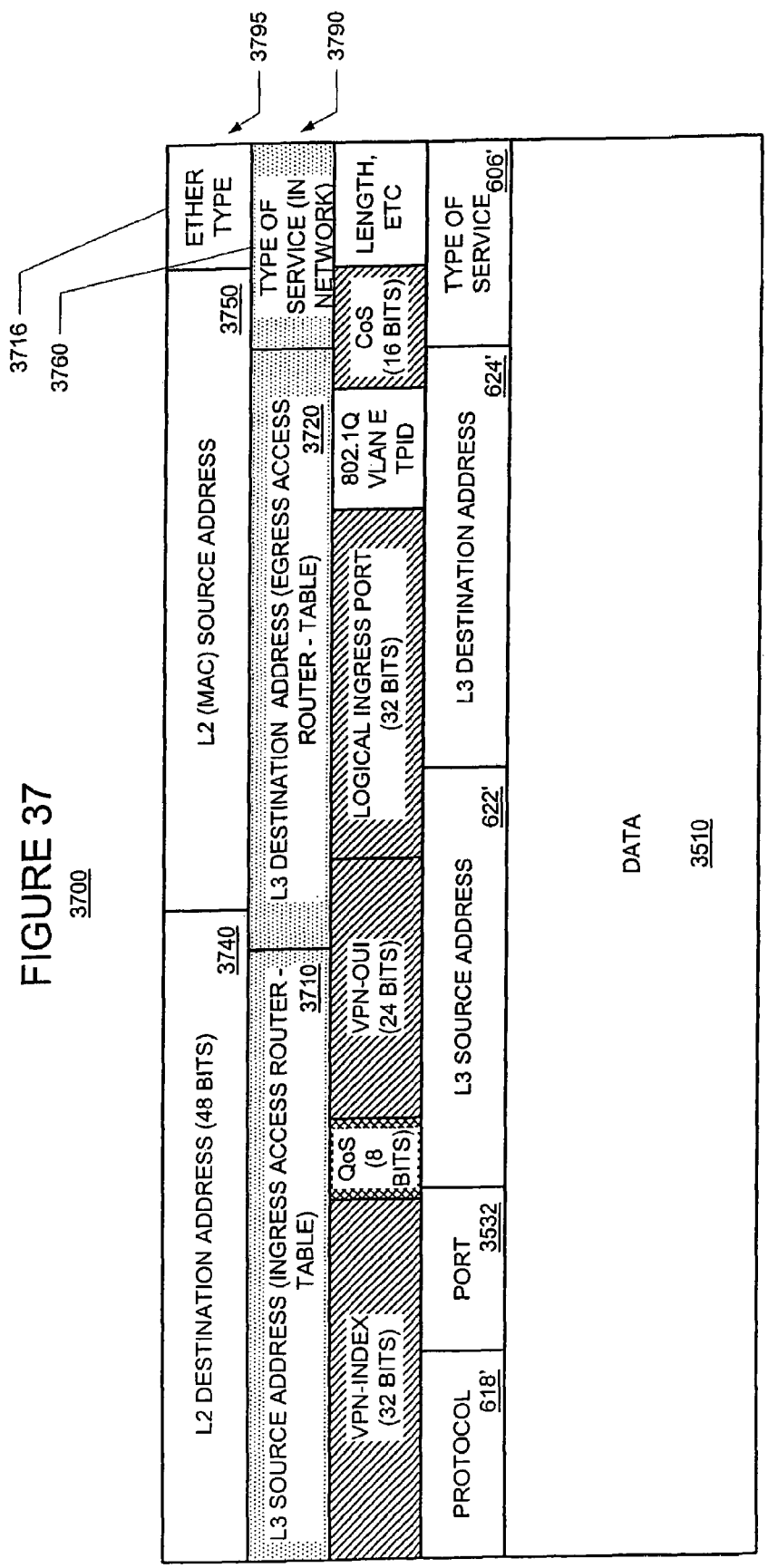
FIG. 37 illustrates the encapsulation of the data of FIG. 36 with carrier information, as well as next hop layer 2 information added over such carrier information.

Referring to FIG. 37, at the access router 934', a data forwarding process 1034 may use the layer 3 destination address 624' and at least some of the context information (e.g., the VPN-OUI 2012a and/or the VPN-Index 2012b) to look up information in the carrier information table 1036. Such carrier information may be used to encapsulate the packet 3600 (Recall encapsulation process 1038.), and may include a (layer 3) destination address 3720 of an appropriate egress access router 934', as well as a (layer 2) destination address 3740. Then, forwarding (e.g., next hop) information can be determined from a forwarding process 1034 based on a forwarding table (not shown). Note that the forwarding table may be determined in the transport network 940 using known routing protocols. Such forwarding information may be a (layer 2) address of a next hop node within the public transport network 940.

The carrier may also include a service level 3760 to be associated with the data as it is sent across the public transport network 940. The service level 3760 may be derived from the QoS value 2020a and the CoS value 2020b. The service level 3760 may correspond to a standards-compatible (e.g., DiffServ) value. FIG. 37 illustrates the packet 3600 as encapsulated with carrier information 3790 which will be used to carry the packet 3600 over the public transport network 950. Next hop information 3795 is also shown.

Within the ingress access router 934', an access control process 1044 may use at least a part of the context information, in conjunction with an access control table 1046 to determine whether or not the customer device and/or customer application is permitted to send data to its desired destination at the rate received and/or use a specified service type. Also, quality of service and queuing processes 1040 and 1043, respectively, may be used to determine a priority with which to serve the data at output ports 1048 of the access router 934', to the public transport network 940.

At this point, the ingress access router 934' may forward the information across the transport network 940 towards the egress access router 934' specified by the layer 3 destination address 3720. The core routers 942 may merely use the carrier information for forwarding (layer 3 destination address of the egress access router 3720) and for queuing (service level (e.g., DiffServ) value 3760). At the egress access router 934', an access control process 1044 may use at least a part of the context information, in conjunction with an access control table 1046 to determine whether or not the customer device is permitted to send data to its desired destination at the rate received and/or use a specified service. Then, a de-encapsulation process 1039 may be used to remove the carrier information 3790. As a result, the data 3600, in the form originally received by the ingress access router 934', is available at the egress access router 934'.

Figure 38:
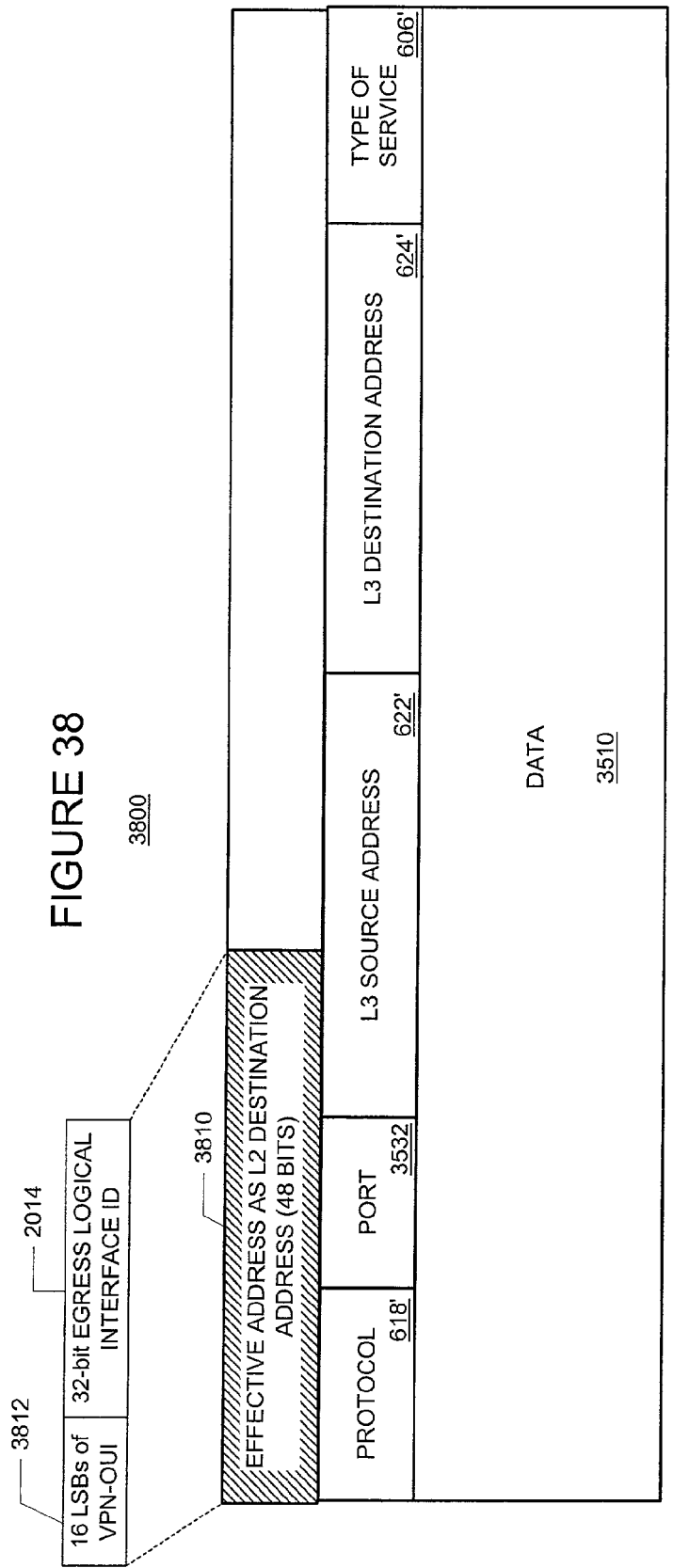
FIG. 38 illustrates the data of FIG. 37 de-encapsulated and provided with an effective (layer 2) destination address in the place of, and based on, at least some of the context information.

At this point, the data needs to be forwarded to the appropriate logical interface process 1014 of a coupled aggregation unit 932'. An effective address determination process 1056 may use at least a part of the context information, in conjunction with the (layer 3) destination address to look up an effective logical interface address in the address resolution table 1058 of the egress access router 934'. As shown in FIG. 38, the resulting packet 3800 may include an effective address value 3810 as a layer 2 destination address 3810. If the logical interface 1014 is provided as a device on an Ethernet LAN, the layer 2 destination address 3810 may be a 48-bit MAC address. The effective address value 3810 may include the 32-bit egress logical interface identifier 2014, stuffed (e.g., prepended) with the 16 least significant bits of the VPN-OUI. Thus, the packet 3800 will reach (e.g., using standard LAN switching and/or bridging technologies) the appropriate logical interface 1014 of the appropriate aggregation device 932'.

Figure 39:
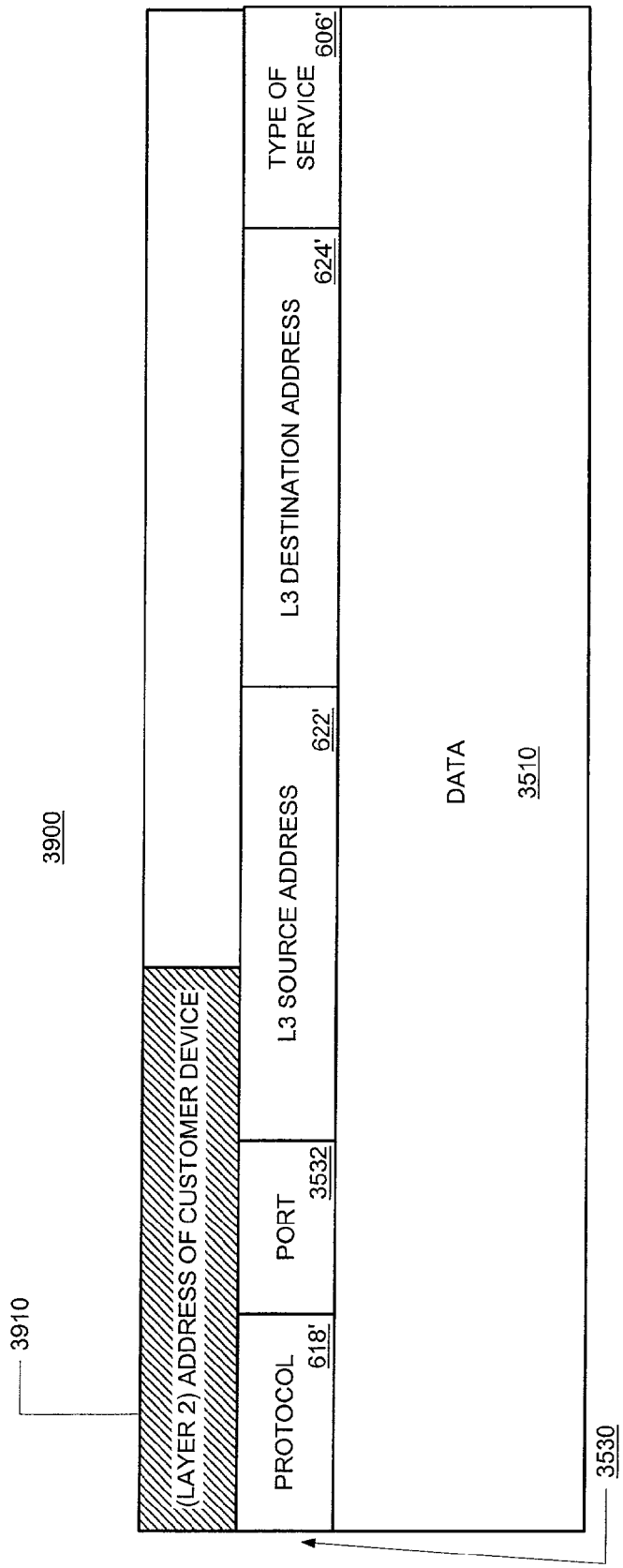
FIG. 39 illustrates the data of FIG. 38 where the effective address has been replaced with a (layer 2) address of a customer device.

At the egress aggregation device 932', as can be appreciated by comparing FIGS. 38 and 39, the effective address to client device address translation process 1028 may convert the effective (layer 2) destination address to the (layer 2) destination address of the customer device 910. This may be done by using a logical interface identifier 1212 to look up an associated (layer 2) address 1214 of the customer device 910 in the address resolution table 1020. Recall that the address resolution table 1020 may have been populated by the snoop process 1018. If there is no client device address associated with the logical interface 1014, then an address resolution process may be used to broadcast request for address information. (Recall steps 1660 and 1665 of FIG. 16.) The address information returned in response may be used to populate the address resolution table 1020. Although not shown, each of the entries in the address resolution table 1020 may include some sort of time stamp which may be used to determine whether or not the associated address information is "fresh" enough to be used.

The data 3900 is then forwarded, via a physical port 1010 associated with the given logical interface 1014, to the customer device 910.

§ 4.5 Conclusions

As can be appreciated from the foregoing detailed description, the present invention supports the provision of various levels of service. By supporting various levels of service, various applications, such as video-on-demand, audio-on-demand, voice communications, data communications, e-mail, voice-mail, Internet access, billing, AAA, video conferencing, multicasting, broadcasting, virtual private networks, etc. may be offered. Further, the present invention provides a public transport network that is not dependent on the technology of access facilities used to access the public transport network. In this way, communications companies, such as RBOCs for example, are free to use any transport technology they choose. Further, in this way, network management is simplified since only a single technology is needed to support the public transport network. Advantageously, this also simplifies the process of providing various service levels by the communications companies. That is, different service levels/types can be provided among a given customer's various applications, as well as among different customers.

The present invention enables the deployment of a public transport network that is robust, scalable, and based on proven technology.

The present invention supports VPN services by preserving customer address space, with no impact to the transport network or to other customers. Further, addressing within the transport network is independent of that in other networks. Advantageously, this permits the size of forwarding tables to be minimized.

Thus, the present invention enables a communications company, such as an RBOC for example, to choose to base its public transport network on any one of a number of transport technologies, such as the internet protocol (or "IP"). The present invention allows a large number of physical connections to be aggregated for presentation to a small number of high bandwidth ports. Thus, the present invention can be said to support "channelized IP". The present invention also permits proper data (e.g., packet) forwarding even when layer 3 (e.g., IP) addresses are not necessarily globally unique, such as may occur when supporting virtual private networks.

The present invention also permits customers to dynamically update routing information, using any standard address advertisement protocol such as RIPv2 for example, in a secure and transparent manner. Such updates do not require the customer to have extensive network expertise, such as knowledge of exterior gateway protocols like BGP-4. Indeed, "plug-n-play" customer interfaces are supported.

What is claimed is:

1. For use in an edge device of a transport network, a method for processing data, received from a first customer device via access facilities, addressed to a second customer device, the method comprising:
   a) terminating, with a physical interface, a link of the access facilities;
   b) associating at least one logical interface with the physical interface;
   c) associating customer context information with the logical interface;
   d) upon receiving the data,
      i) removing at least a part of layer 2 address information from the data to generate resulting data, and
      ii) adding the customer context information to the resulting data to generate modified data;
   e) aggregating the modified data at the logical interface with other modified data at other logical interfaces, for trunking on a shared, network-facing, communications link;
   f) receiving the modified data from the shared, network-facing, communications link;
   g) encapsulating the modified data with carrier information, used to forward the modified data across the transport network to a second edge device with which the second customer device has access, wherein the data includes a layer 3 destination address corresponding to a layer 3 address of the second customer device;

h) at the second edge device, removing the carrier information to obtain the modified data; and i) advancing the data to a logical interface associated with the second customer device, wherein the logical interface associated with the second customer device is determined based on the layer 3 address of the second customer device and at least a part of the customer context information.

2. The method of claim 1 wherein the customer context information added to the resulting data is added in the place of the at least a part of the layer 2 address information removed.

3. The method of claim 1 further comprising:

j) saving, in association with the logical interface, layer 2 source address information of the data.

4. The method of claim 1 wherein at least a portion of the customer context information identifies a unique virtual private network customer.

5. The method of claim 4 wherein at least a portion of the customer context information identifies a unique host of the unique virtual private network.

6. The method of claim 4 wherein at least a portion of the customer context information uniquely identifies the logical interface within a given virtual private network customer.

7. The method of claim 1 wherein at least a portion of the customer context information uniquely identifies the logical interface.

8. The method of claim 1 wherein at least a portion of the customer context information identifies a class of service level.

9. The method of claim 1 wherein at least a portion of the customer context information identifies a quality of service level.

10. The method of claim 1 wherein the carrier information includes an address of the second edge device.

11. The method of claim 1 wherein the data includes a layer 3 destination address corresponding to a layer 3 address of the second customer device, and wherein the address of the second edge device is derived from a layer 3destination address of the data and at least a part of the customer context information.

12. The method of claim 1 wherein the carrier information includes service level information.

13. The method of claim 1 wherein the data is advanced to the logical interface associated with the second customer device by generating an effective address of the logical interface associated with the second customer device, based on at the layer 3 address of the second customer device and at least a part of the customer context information.

14. The method of claim 13 further comprising:

j) replacing as a destination address, the effective address with a layer 2 address of the second customer device.

15. The method of claim 14 wherein the layer 2 address of the second customer device was previously associated with its corresponding logical interface and stored.

16. The method of claim 1 wherein the layer 2 address information of the data is part of an Ethernet header, and wherein the customer context information replaces a value in a layer 2 source address field of the Ethernet header.

17. The method of claim 1 wherein the layer 2 address information of the data is an Ethernet header.

wherein the customer context information replaces a value in a layer 2 destination address field of the Ethernet header, and wherein a node terminating the shared, network-facing, communications link operates in the promiscuous mode.

18. The method of claim 1 wherein the first customer device has a layer 2 address.

19. The method of claim 1 wherein the first customer device has a layer 3 address.

20. The method of claim 1 wherein the first customer device and the second customer device are provided outside of the edge device of the transport network.

21. The method of claim 1 wherein each of the at least one logical interfaces may be associated with only one physical interface, and may not be associated with more than one physical interface.

22. For use at an edge device of a transport network, the edge device serving customer devices coupled via access facilities, a method for maintaining carrier information tables, the method comprising:

a) terminating, with a physical interface, a link of the access facilities;

b) associating at least one logical interface with the physical interface;

c) associating customer context information with the logical interface;

d) upon receiving data from a customer device, adding the customer context information to generate modified data;

e) if the data received from the customer device is an address advertisement, then forwarding the modified data to an edge information update facility; and f) if a table update is received from the edge information update facility, then updating a carrier information table, wherein the modified data is forwarded to the edge information update facility via a network other than the transport network.

23. For use at an edge device of a transport network, the edge device serving customer devices coupled via access facilities, a method for maintaining carrier information tables, the method comprising:

a) terminating with a physical interface, a link of the access facilities;

b) associating at least one logical interface with the physical interface;

c) associating customer context information with the logical interface;

d) upon receiving data from a customer device, adding the customer context information to generate modified data;

e) if the data received from the customer device is an address advertisement, then forwarding the modified data to an edge information update facility; and f) if a table update is received from the edge information update facility, then updating a carrier information table, wherein if the data received from the customer device is an address advertisement, first encapsulating the modified data in carrier information before forwarding the modified data to an edge information update facility.

24. The method of claim 23 wherein the carrier information table associates carrier information with a layer 3 destination address and at least a part of customer context information.

* * * * *